United States Patent
Imamura

(10) Patent No.: US 8,432,621 B2
(45) Date of Patent: Apr. 30, 2013

(54) IMAGE FORMING OPTICAL SYSTEM AND ELECTRONIC IMAGE PICKUP APPARATUS USING THE SAME

(75) Inventor: Ayami Imamura, Hachioji (JP)

(73) Assignee: Olympus Corporation, Tokyo (JP)

(*) Notice: Subject to any disclaimer, the term of this patent is extended or adjusted under 35 U.S.C. 154(b) by 50 days.

(21) Appl. No.: 13/134,563

(22) Filed: Jun. 9, 2011

(65) Prior Publication Data

US 2011/0317284 A1    Dec. 29, 2011

(30) Foreign Application Priority Data

Jun. 23, 2010  (JP) .................................. 2010-142390

(51) Int. Cl.
G02B 9/36    (2006.01)
G02B 3/02    (2006.01)
G02B 15/14   (2006.01)
G02B 9/60    (2006.01)

(52) U.S. Cl.
USPC ........... 359/775; 359/686; 359/688; 359/715; 359/754; 359/763

(58) Field of Classification Search ............... 359/676, 359/677, 678, 683, 684, 686, 688, 708, 713–715, 359/754–757, 763–765, 771, 772, 775
See application file for complete search history.

(56) References Cited

U.S. PATENT DOCUMENTS

| 5,898,525 A * | 4/1999 | Suzuki ..................... 359/684 |
| 6,055,114 A * | 4/2000 | Ohtake .................... 359/676 |
| 6,301,063 B1 * | 10/2001 | Mori ....................... 359/764 |
| 2005/0041305 A1 * | 2/2005 | Ishii ....................... 359/688 |

FOREIGN PATENT DOCUMENTS

JP    08-068941    3/1996

* cited by examiner

*Primary Examiner* — Darryl J Collins
(74) *Attorney, Agent, or Firm* — Kenyon & Kenyon LLP

(57) ABSTRACT

It is preferable that an image forming optical system includes in order from an object side, a first lens group having a positive refractive power, a second lens group having a negative refractive power, a third lens group having a negative refractive power, and a subsequent lens group having a positive refractive power as a whole, and that the third lens group includes only a cemented lens having a negative refractive power, which includes a positive lens and a negative lens in order from the object side. Moreover, it is preferable that a cemented surface of the cemented lens in the third lens group has a shape which is convex toward an image side.

17 Claims, 27 Drawing Sheets

435.84 —·—·—
656.27 — — —
587.56 ———

435.84 —··—··—
656.27 — — — —
587.56 ————

435.84 —··—··—
656.27 — — — —
587.56 ————

435.84 —·—·—
656.27 — — —
587.56 ———

435.84 —·—·—
656.27 — — —
587.56 ———

435.84 —·—·—
656.27 — — —
587.56 ———

FIG. 27A
FIG. 27B
FIG. 27C
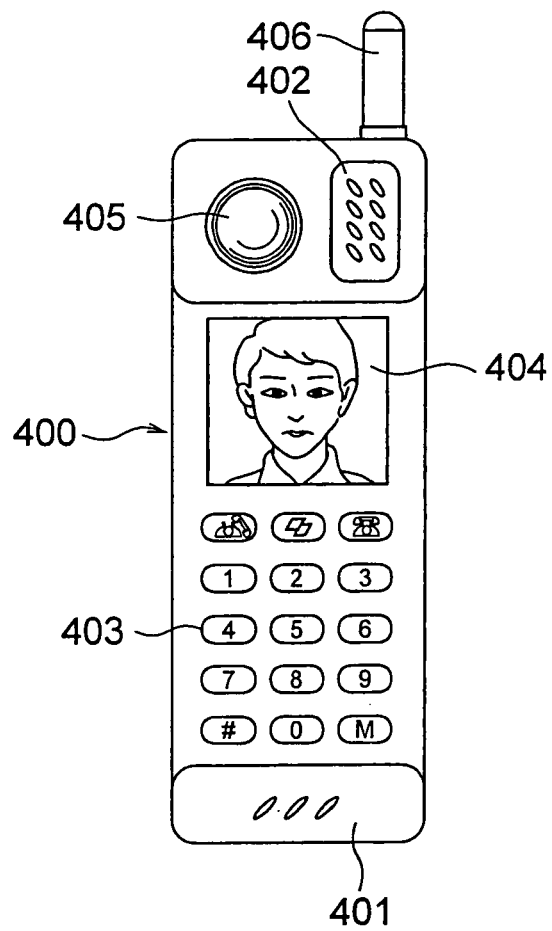
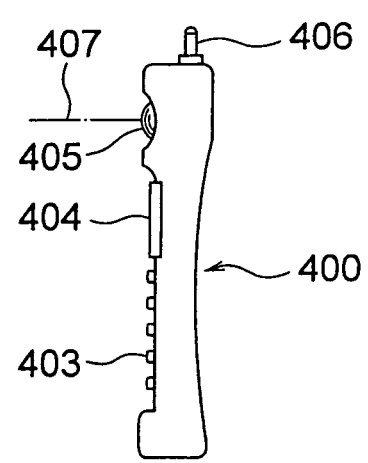
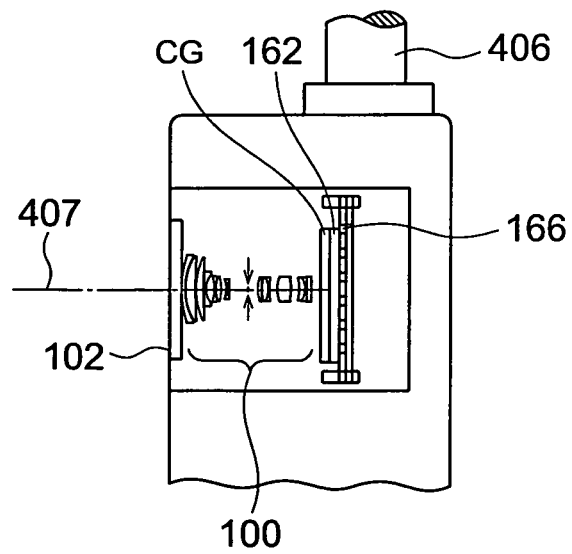

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2010-142390 filed on Jun. 23, 2010; the entire contents of which are incorporated herein by reference.

BACKGROUND OF THE INVENTION

1. Field of the Invention

The present invention relates to an image forming optical system and an electronic image pickup apparatus using the same.

2. Description of the Related Art

In recent years, there has been a progress in achieving high magnification and slimming of a compact camera. For achieving high magnification, it is necessary to make strong a refractive power of each lens group, and to increase an amount of movement at the time of zooming. However, when the refractive power of each lens group is made strong or when the amount of movement at the time of zooming is increased, an aberration and an increase in a length of an optical system are susceptible to occur.

Meanwhile, in a compact camera, when the camera is not being used for capturing an image, in a large number of cases, an optical system is made to collapse and is accommodated inside a camera casing, and for slimming of the camera, it is necessary to reduce a thickness of the optical system when collapsed. Here, for making the optical system collapse, a lens frame of the optical system is to be let to expand and contract by dividing into a plurality of stages. At this time, when the thickness of the optical system when collapsed becomes thin, a length of each lens frame which has been divided is to be shortened. Consequently, the number of stages at the time of making the optical system collapse increases. Accordingly, when the optical system is elongated to be longer, the overall lens frame is susceptible to deform due to gravitational force, and decentering of the optical system is susceptible to occur. Therefore, for reducing the number of stages to a small number while shortening an interval of dividing the lens frame, it is necessary to shorten the overall length of the optical system.

For fulfilling these requirements, it is preferable to shorten the overall length of the optical system while achieving high magnification without allowing degradation of an image forming performance. As an example of such optical system, an optical system described in Japanese Patent Application Laid-open Publication No. Hei 8-68941, is available. The optical system described in Japanese Patent Application Laid-open Publication No. Hei 8-68941, is an optical system which includes in order from an object side a lens group having a positive refractive power, a lens group having a negative refractive power, a lens group having a negative refractive power, a lens group having a positive refractive power, and a lens group having a positive refractive power. By making an arrangement such that there are two lens groups having a negative refractive power, and that a refractive power of the negative lens groups is formed to be weak, a high-magnification image forming optical system having a superior optical performance while shortening the overall length of lenses has been realized.

SUMMARY OF THE INVENTION

An image forming optical system according to the present invention includes in order from an object side
 a first lens group having a positive refractive power,
 a second lens group having a negative refractive power,
 a third lens group having a negative refractive power, and
 a subsequent lens group having a positive refractive power as a whole, and
 the third lens group includes only a cemented lens having a negative refractive power, which includes a positive lens and a negative lens, in order from the object side.

An electronic image pickup apparatus according to the present invention includes an image forming optical system according to the above-mentioned present invention.

BRIEF DESCRIPTION OF THE DRAWINGS

FIG. 1A shows a state at a wide angle end, FIG. 1B shows an intermediate focal length state, and FIG. 1C shows a state at a telephoto end;

FIG. 2A shows a state at the wide angle end, FIG. 2B shows an intermediate focal length state, and FIG. 2C shows a state at the telephoto end;

FIG. 3A shows a state at a wide angle end, FIG. 3B shows an intermediate focal length state, and FIG. 3C shows a state at a telephoto end;

FIG. 4A shows a state at the wide angle end, FIG. 4B shows an intermediate focal length state, and FIG. 4C shows a state at the telephoto end;

FIG. 5A shows a state at a wide angle end, FIG. 5B shows an intermediate focal length state, and FIG. 5C shows a state at a telephoto end;

FIG. 6A shows a state at the wide angle end, FIG. 6B shows an intermediate focal length state, and FIG. 6C shows a state at the telephoto end;

FIG. 7A shows a state at a wide angle end, FIG. 7B shows an intermediate focal length state, and FIG. 7C shows a state at a telephoto end;

FIG. 8A shows a state at the wide angle end, FIG. 8B shows an intermediate focal length state, and FIG. 8C shows a state at the telephoto end;

FIG. 9A shows a state at a wide angle end, FIG. 9B shows an intermediate focal length state, and FIG. 9C shows a state at a telephoto end;

FIG. 10A shows a state at the wide angle end, FIG. 10B shows an intermediate focal length state, and FIG. 100 shows a state at the telephoto end;

FIG. 11A shows a state at a wide angle end, FIG. 11B shows an intermediate focal length state, and FIG. 11C shows a state at a telephoto end;

FIG. 12A shows a state at the wide angle end, FIG. 12B shows an intermediate focal length state, and FIG. 12C shows a state at the telephoto end;

FIG. 13A shows a state at a wide angle end, FIG. 13B shows an intermediate focal length state, and FIG. 13C shows a state at a telephoto end;

FIG. 14A shows a state at the wide angle end, FIG. 14B shows an intermediate focal length state, and FIG. 14C shows a state at the telephoto end;

FIG. 15A shows a state at a wide angle end, FIG. 15B shows an intermediate focal length state, and FIG. 15C shows a state at a telephoto end;

FIG. 16A shows a state at the wide angle end, FIG. 16B shows an intermediate focal length state, and FIG. 16C shows a state at the telephoto end;

FIG. 17A shows a state at a wide angle end, FIG. 17B shows an intermediate focal length state, and FIG. 17C shows a state at a telephoto end;

FIG. 18A shows a state at the wide angle end, FIG. 18B shows an intermediate focal length state, and FIG. 18C shows a state at the telephoto end;

FIG. 19A shows a state at a wide angle end, FIG. 19B shows an intermediate focal length state, and FIG. 19C shows a state at a telephoto end;

FIG. 20A shows a state at the wide angle end, FIG. 20B shows an intermediate focal length state, and FIG. 20C shows a state at the telephoto end;

FIG. 27A, FIG. 27B, and FIG. 27C are diagrams showing a mobile telephone which is an example of the information processing apparatus in which, the image forming optical system of the present invention is built-in as a photographic optical system, where, FIG. 27A shows a front view of a mobile telephone 400, FIG. 27B is a side view of the mobile telephone 400, and FIG. 27C is a cross-sectional view of a photographic optical system 405.

DETAILED DESCRIPTION OF THE INVENTION

Figure 1A:
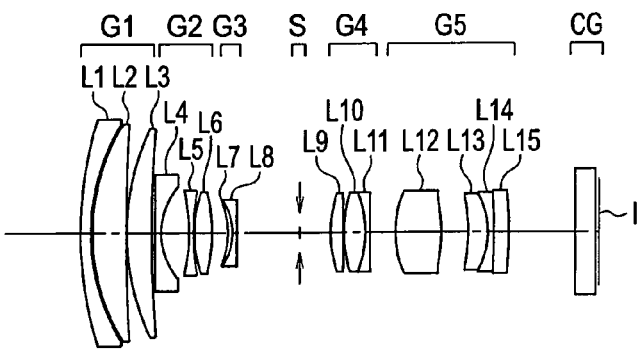
FIG. 1A, FIG. 1B, and FIG. 1C are cross-sectional views along an optical axis showing an optical arrangement at the time of infinite object point focusing of an image forming optical system according to a first embodiment of the present invention, where.

Firstly, prior to the description of the embodiments, an action and an effect of an image forming optical system according to the embodiments will be described below.

An image forming optical system according to the present invention includes in order from an object side a first lens group having a positive refractive power, a second lens group having a negative refractive power, a third lens group having a negative refractive power, and a subsequent lens group having a positive refractive power as a whole, and the third lens group includes only a cemented lens having a negative refractive power, which includes a positive lens and a negative lens, in order from the object side.

Since the third lens group includes only the cemented lens having a negative refractive power, of the positive lens and the negative lens in order from the object side, as compared to a case in which the negative lens is on the object side, a negative principal point of the third lens group lies on the image side. As the negative principal point come near the image side, it is possible to bring a principal point of the third lens group and a principal point of the subsequent lens group positioned at the image side of the third lens group further closer, and it is possible to make a zoom factor even higher by making a focal length at the telephoto end further longer. At this time, since high magnification is achieved by making a distance between the third lens group and a lens group on the image side thereof further closer, it is possible to prevent the overall length of the optical system from becoming long, and to prevent an occurrence of substantial aberration by the refractive power of each lens group becoming strong.

Consequently, as it has been described above, when the image forming optical system includes in order from the object side, the first lens group having a positive refractive power, the second lens group having a negative refractive power, the third lens group having a negative refractive power, and the subsequent lens group having a positive refractive power as a whole, and the third lens group includes only the cemented lens having a negative refractive power, of the positive lens and the negative lens, in order from the object side, the overall length of the optical system is comparatively shorter, and it is possible to achieve high magnification by having a higher zoom factor without letting a substantial aberration to occur. Moreover, it is possible to achieve a slim camera with high magnification which is capable of achieving a high quality image.

In the image forming optical system according to the present invention, it is preferable that a cemented surface of the cemented lens in the third lens group has a shape which is convex toward an image side.

Both the second lens group and the third lens group being lens groups having a negative refractive power, a light beam spreads at the third lens group, and each light ray advances in a direction away from an optical axis. At this time, when the cemented surface of the cemented lens in the third lens group has a convex shape toward the image side, an angle made by a normal of the cemented surface and a light ray which intersects the cemented surface becomes small, and an occurrence of various aberrations at the cemented surface is suppressed to be small.

Consequently, when the cemented surface of the cemented lens in the third lens group has a convex shape toward the image side as described above, various aberrations at the cemented surface are suppressed to be small, and it is possible to achieve a camera which can achieve an image of a high quality.

In the image forming optical system according to the present invention, it is preferable that the positive lens in the cemented lens of the third lens group is a meniscus lens having a convex surface directed toward the image side.

Both the second lens group and the third lens group being the lens groups having a negative refractive power, a light beam spreads at the third lens group, and each light ray advances in a direction away from an optical axis. At this time, when the positive lens in the cemented lens of the third lens group is a meniscus lens having the convex surface directed toward the image side, a surface on the object side of the positive lens as well as a surface on the image side of the positive lens have a convex shape toward the image side. Therefore, at any of the surface on the object side of the positive lens and the surface on the image side of the positive lens, an angle made by a normal of each surface and a light ray which intersects each surface becomes smaller, and an occurrence of various aberrations at the cemented surface is suppressed to be small.

Consequently, the positive lens in the cemented lens of the third lens group being a meniscus lens having the convex surface directed toward the image side as described above, various aberrations which occur at the positive lens of the cemented surface are suppressed to be small, and it is possible to achieve a camera which can achieve an image of a high quality.

In the image forming optical system according to the present invention, it is preferable that a shaping factor $SF_{3p}$ of the positive lens in the cemented lens of the third lens group satisfies conditional expression (1)

$$2 \leq SF_{3p} \leq 12 \qquad (1)$$

where, $$SF_{3p}=(r1_{3p}+r2_{3p})/(r1_{3p}-r2_{3p}),$$

where, $r1_{3p}$ denotes a radius of curvature of a surface on the object side of the positive lens in the cemented lens of the third lens group, and $r2_{3p}$ denotes a radius of curvature of a surface on the image side of the positive lens in the cemented lens of the third lens group.

When the shaping factor $SF_{3p}$ of the positive lens satisfies conditional expression (1), the surface on the object side of the positive lens as well as the surface on the image side of the positive lens become a convex shape toward the image side, and a radius of curvature of the surface on the image side of the positive lens becomes smaller than a radius of curvature of the surface on the object side of the positive lens. As the radius of curvature of the surface on the image side of the positive lens becomes smaller, both the second lens group and the third lens group being lens group having a negative refractive power, the light beam is spread in the third lens group and each light ray advances in a direction away from the optical axis. However, in both the surface on the object side and the surface on the image side of the positive lens, an angle made by a normal of each surface and a light ray intersecting each surface becomes small. Therefore, it is possible to suppress various aberrations occurring at the positive lens to be small.

When an upper limit value of conditional expression (1) is surpassed, the curvature of field of the surface on the image side of the positive lens becomes excessively small and therefore, an aberration occurs substantially at the surface on the image side of the positive lens.

When a lower limit value of conditional expression (1) is surpassed, the curvature of field of the surface on the object side of the positive lens becomes large, and an angle made by a ray incident on the surface on the object side of the positive lens and a normal of the surface on the object side becomes large, and an aberration occurs substantially at the surface on the object side of the positive lens.

Consequently, when the shaping factor $SF_{3p}$ of the positive lens in the cemented lens of the third lens group satisfies conditional expression (1) as described above, various aberrations which occur at the positive lens in the cemented lens are suppressed to be small, and it is possible to achieve a camera which is capable of achieving an image of even higher quality.

It is more preferable that the shaping factor $SF_{3p}$ of the positive lens satisfies conditional expression (1-1) instead of conditional expression (1).

$$3 \leq SF_{3p} \leq 10 \tag{1-1}$$

When the shaping factor $SF_{3p}$ of the positive lens satisfies conditional expression (1-1), it is possible to prevent further the refractive power of the surface on the image side from becoming excessively large, and to suppress further an aberration which occurs at the surface on the image side. Moreover, it is possible to prevent further the angle made by the light ray incident on the surface on the object side of the positive lens and the normal of the surface on the object side of the positive lens from becoming excessively small, and to suppress further the aberration at the surface on the object side of the positive lens.

Consequently, when the shaping factor $SF_{3p}$ of the positive lens satisfies conditional expression (1-1) as described above, it is possible to achieve a camera which is capable of achieving an image of even higher quality.

In the image forming optical system according to the present invention, it is preferable that the negative lens in the cemented lens of the third lens group is a meniscus lens having a convex surface directed toward the image side.

Both the second lens group and the third lens group being lens groups having a negative refractive power, a light beam spreads at the third lens group, and each light ray advances in a direction away from the optical axis. At this time, when the negative lens in the cemented lens of the third lens group is a meniscus lens having a convex surface directed toward the object side, both the surface on the object side of the negative lens and the surface on the image side of the negative lens become a convex shape toward the image side. Therefore, at any of the two surfaces, an angle made by a normal of each surface and a light ray intersecting each surface becomes small, and occurrence of various aberrations at both surfaces namely, a surface of incidence and an output surface of the negative lens is suppressed to be small.

Consequently, the negative lens in the cemented lens of the third lens group being the meniscus lens having a convex surface directed toward the object side as described above, various aberrations which occur at the negative lens of the cemented lens are suppressed to be small, and it is possible to achieve a camera which is capable of achieving an image of even higher quality.

In the image forming optical system according to the present invention, it is preferable that a shaping factor $SF_{3n}$ of the negative lens in the cemented lens of the third lens group satisfies conditional expression (2).

$$-5 \leq SF_{3n} < -1 \tag{2}$$

where, $$SF_{3n} = (r1_{3n} + r2_{3n})/(r1_{3n} - r2_{3n}),$$

where, $r1_{3n}$ denotes a radius of curvature of a surface on the object side of the negative lens in the cemented lens of the third lens group, and $r2_{3n}$ denotes a radius of curvature of a surface on the image side of the negative lens in the cemented lens of the third lens group.

When the shaping factor $SF_{3n}$ of the negative lens satisfies conditional expression (2), the surface on the object side of the negative lens as well as the surface on the image side of the negative lens become a convex shape toward the image side, and a radius of curvature of the surface on the object side of the negative lens becomes smaller than a radius of curvature of the surface on the image side of the negative lens. As the radius of curvature of the surface on the object side of the negative lens becomes smaller than the radius of curvature of the surface on the image side of the negative lens, both the second lens group and the third lens group being lens groups having a negative refractive power, the light beam is spread in the third lens group, and each light ray advances in a direction away from the optical axis. However, in both the surface on the object side and the surface on the image side of the negative lens, an angle made by a normal of each surface and a light ray intersecting each surface becomes small. Therefore, it is possible to suppress various aberrations occurring at the positive lens, to be small.

When an upper limit value of conditional expression (2) is surpassed, a surface on the image side of the negative lens becomes a flat or a convex toward the image side. As the surface on the image side of the negative lens becomes flat or convex toward the image side, an angle made by a light ray incident on the surface on the image side and the normal of the surface on the image side becomes large, and an aberration occurs substantially at the surface on the image side.

When a lower limit of conditional expression (2) is surpassed, the radius of curvature of the surface on the object side of the negative lens becomes excessively small, and a refractive power of the surface on the object side of the negative lens becomes excessively large. Therefore, an aberration at the surface on the object side occurs substantially.

Consequently, when the shaping factor $SF_{3n}$ of the negative lens in the cemented lens of the third lens group satisfies conditional expression (2) as described above, various aberrations which occur at the negative lens of the cemented lens are suppressed to be small, and it is possible to achieve a camera which is capable of achieving an image of even higher quality.

It is more preferable that the shaping factor $SF_{3n}$ satisfies conditional expression (2-1) instead of conditional expression (2).

$$-3 \leq SF_{3n} < -1 \tag{2-1}$$

When the shaping factor $SF_{3n}$ of the negative lens satisfies conditional expression (2-1), it is possible to prevent further the refractive power of the surface on the object side from becoming excessively large, and to suppress further an aberration which occurs at the surface on the object side.

Consequently, when the shaping factor $SF_{3n}$ of the negative lens satisfies conditional expression (2-1) as described above, it is possible to achieve a camera which is capable of achieving an image of further higher quality.

In the image forming optical system according to the present invention, it is preferable that all surfaces of the cemented lens in the third lens group are convex toward the image side. Both the second lens group and the third lens group being lens groups having a negative refractive power, a light beam spreads at the third lens group, and each light ray advances in a direction away from the optical axis. At this time, when all the surfaces of the cemented lens in the third lens group are convex toward the image side, at all the surfaces of the cemented lens, an angle made by a normal of each surface and a light ray which intersects each surface becomes small, and an occurrence of various aberrations at the cemented surface is suppressed to be small.

Consequently, all the surfaces of the cemented lens of the third lens group being convex toward the image side as described above, various aberrations at the cemented surface are suppressed to be small, and it is possible to achieve a camera which is capable of achieving an image of a higher quality.

In the image forming optical system according to the present invention, it is preferable that a refractive index of the positive lens in the cemented lens of the third lens group is lower than a refractive index of the negative lens in the cemented lens of the third lens group.

When the refractive index of the positive lens in the cemented lens is lower than the refractive index of the negative lens in the cemented lens, Petzval's sum for the positive lens becomes larger on a positive side. Therefore, negative Petzval's sum of the third lens group which has a negative refractive power comes closer to zero. Therefore, Petzval's sum of the overall optical system also comes closer to zero, and occurrence of a curvature of field is suppressed.

Consequently, the refractive index of the positive lens in the cemented lens of the third lens group being lower than the refractive index of the negative lens in the cemented lens of the third lens group, the occurrence of the curvature of field is suppressed to be small, and it is possible to achieve a camera which is capable of achieving an image of a higher quality.

In the image forming optical system according to the present invention, it is preferable that focusing to an object at a close distance is carried out by moving the third lens group along the optical axis.

In the third lens group, a height of image rays in the entire area from a wide angle end up to a telephoto end is low, and it is possible to make an outer diameter of the lens to be the minimum as compared to the other lens groups. Therefore, when the third lens group is moved at the time of focusing, small-sizing of a drive system for focusing, such as a motor, is possible.

Moreover, when only one of the positive lens and the negative lens is moved at the time of focusing, further small-sizing of a drive system for focusing is possible, but, correction of a chromatic aberration in the group is not possible by only one lens, and when moved for focusing, the chromatic aberration fluctuates substantially. In the present invention, since the third lens group includes only the cemented lens of the positive lens and the negative lens, it is possible to correct the chromatic aberration in the third lens group, and to suppress the fluctuation of the chromatic aberration at the time of focusing to be small.

Consequently, since the focusing to the object at the close distance is carried out by moving the third lens group along the optical axis as described above, it is possible to make the drive system for focusing small, and small-sizing of the camera is also possible. Moreover, since it is possible to suppress the fluctuation of the chromatic aberration at the time of focusing to be small, it is possible to achieve an image of a high quality even at the time of focusing, and to achieve a camera which with a small size and a high image quality.

In the image forming optical system according to the present invention, it is preferable that a surface nearest to the object side of the cemented lens in the third lens group is an aspheric surface.

In the third lens group, at the wide angle end, a diameter of an axial light beam as well as of an off-axis light beam is small. Moreover, positions at which, respective principal light ray are incident differ substantially, and higher an image height, farther away is a position from the optical axis at which the principal light ray of the off-axis light beam is incident. Whereas, at the telephoto end, the diameter of the axial light beam as well as of the off-axis light beam is large, and respective principal light rays are incident at positions near the optical axis.

Therefore, when the surface nearest to the object side of the cemented lens in the third lens group is an aspheric surface, off-axis aberrations such as a coma aberration, an astigmatism, and the curvature of field at the wide angle end can be corrected favorably. Moreover, at the telephoto end, an aspheric aberration can be corrected favorably.

Consequently, the surface nearest to the object side of the cemented lens in the third lens group being an aspheric surface, an occurrence of aberration at the wide angle end as well as at the telephoto end is suppressed to be small, and it is possible to achieve a camera with a higher image quality.

In the image forming optical system according to the present invention, it is preferable that the surface nearest to the object side of the cemented lens satisfies conditional expression (3).

$$0.0001 < ASP31/ER < 0.003 \qquad (3)$$

where, $ASP31$ denotes an aspheric-surface amount in an effective diameter of the aspheric surface, and $ER$ denotes the effective radius of the aspheric surface.

Here, the 'aspheric-surface amount' means an amount of deviation in a direction along the optical axis, from a spherical surface having a curvature on the optical axis, with respect to a shape of the aspheric surface, and a direction from the object side toward the image side on the optical axis is let to be positive.

When the surface nearest to the object side of the cemented lens satisfies conditional expression (3), the aspheric-surface amount at an effective diameter of the aspheric surface becomes a positive value, and is extremely small as compared to the effective diameter. In other words, the aspheric-surface amount of the aspheric surface becomes large around the lens, and assumes a shape in which, the surface is slightly shifted toward the image side than a surface shape when an original spherical surface, or in other words, the entire aspherical coefficient of the aspheric surface is let to be zero. When the shape becomes such a shape, a positive refractive power becomes strong in an area around the aspheric surface.

An angle of field being small at the telephoto end, regarding the light beam which is to be incident on the third lens group, a diameter of both an axial light beam as well as an off-axis light beam having a high image height becomes large, and a principal light ray of each of the light beams is incident at a position near the optical axis. Therefore, when the positive refractive power is made stronger in the around the aspheric surface, it is possible to suppress the spherical aberration which occurs due to the negative refractive power in the area around the third lens group having a negative refractive power becoming strong.

Moreover, in a case of moving the third lens group at the time of focusing, particularly at the telephoto end at which, an amount of movement for focusing becomes large, since the spherical aberration is suppressed to be small, it is possible to suppress the fluctuation due to focusing, to be small.

When an upper limit value of conditional expression (3) is surpassed, the aspheric-surface amount in the area around the aspheric surface becomes excessively large, and a fluctuation in the aberration at the time of magnification and at the time of focusing becomes large.

When a lower limit value of conditional expression (3) is surpassed, the aspheric-surface amount in the area around the aspheric surface becomes excessively small, and an effect of aberration correction cannot be achieved sufficiently.

Consequently, since the surface nearest to the object side of the cemented lens in the third lens group is an aspheric surface and the shape thereof satisfies conditional expression (3), the occurrence of aberration both at the wide angle side and the telephoto side is suppressed to be small, and even when an object-point position changes, the occurrence of aberration is suppressed to be small, and it is possible to achieve a camera with a higher image quality.

In the image forming optical system according to the present invention, it is preferable that the cemented surface of the cemented lens in the third lens group is an aspheric surface.

In the third lens group, at the wide angle side, the diameter of both the axial light beam and the off-axis light beam is small. Moreover, positions at which the principal light ray of the respective light beams are incident are different, and higher the image height of the principal light ray of the off-axis light beam, farther away is the position from the optical axis at which the principal light ray is incident. Whereas, at the telephoto side, the diameter of both the axial light beam and the off-axis light beam is large, and the principal light rays of the respective light beams are incident at positions near the optical axis.

Therefore, when the cemented surface of the cemented lens in the third lens group is an aspheric surface, it is possible to suppress to be small a chromatic aberration of magnification which is an off-axis chromatic aberration at the wide angle end. Moreover, it is possible to suppress the chromatic aberration of the spherical aberration at the wide angle end, particularly in an area around the axial light beam.

Consequently, the cemented surface of the cemented lens in the third lens group being the aspheric surface as described above, an occurrence of the chromatic aberration is suppressed to be small both at the wide angle side and at the telephoto side, and it is possible to achieve a camera with a higher image quality.

In the image forming optical system according to the present invention, it is preferable that the cemented surface of the cemented lens satisfies conditional expression (4).

$$0.9 < P_{er}/P_0 < 0.99 \tag{4}$$

where, $P_{er}$ denotes a local refractive power in an effective diameter of the aspheric surface, and $P_0$ denotes a refractive power on an optical axis of the aspheric surface.

A refractive power $P_0$ on the optical axis is same as a refractive power of a surface when the original spherical surface, or in other words, the entire aspherical coefficient of the aspheric surface is let to be zero.

When the cemented surface of the cemented lens satisfies conditional expression (4), the refractive power $P_{er}$ of the local aspheric surface in an effective diameter has a same sign as of the refractive power $P_0$, and a magnitude of the refractive power $P_{er}$ of the local aspheric surface becomes small. In other words, the refractive power of a surface in an area around the aspheric surface becomes weak. As the refractive power becomes weak, it is possible to suppress to be small an aberration which is susceptible to occur in an area of the cemented surface, in which height of light rays is high, the chromatic aberration of magnification at the wide angle side, and a chromatic aberration of the spherical aberration at the telephoto side.

When an upper limit value of conditional expression (4) is surpassed, a change in the refractive power due to the aspheric surface in the area around the cemented surface become excessively small, and an effect of aberration correction cannot be achieved sufficiently.

When a lower limit value of conditional expression (4) is surpassed, the change in the refractive power due to the aspheric surface in the area around the cemented surface becomes excessively large, and when the third lens group moves for focusing or zooming, the fluctuation in the aberration becomes excessively large.

Consequently, since the cemented surface of the cemented lens in the third lens group is an aspheric surface as described above, and the local refractive power $P_{er}$ in the effective diameter of the aspheric surface and the refractive power $P_0$ on the optical axis of the aspheric surface satisfy conditional expression (4), an occurrence of the chromatic aberration at the wide angle side as well as the telephoto side is suppressed to be small, and even when an object-point position changes, the occurrence of aberration is suppressed to be small, and it is possible to achieve a camera with a higher image quality.

In the image forming optical system according to the present invention, it is preferable that a focal length f3 of the third lens group and a focal length ft of the overall image forming optical system at the telephoto end satisfy conditional expression (5).

$$0.05 \leq |f3|/ft \leq 0.25 \tag{5}$$

where, f3 denotes a focal length of the third lens group, and ft denotes a focal length of the overall image forming optical system at the telephoto end.

When the focal length of the third lens group f3 and the focal length ft of the overall image forming optical system at the telephoto end satisfy conditional expression (5), an absolute value of the focal length of the third lens group becomes smaller as compared to the focal length of the overall image forming optical system at the telephoto end. In other words, it means that the refractive power of the third lens group is strong. Therefore, it is possible to make small the amount of movement of the third lens group at the time of zooming. Moreover, in a case of moving the third lens group at the time of focusing, it is possible to suppress the amount of movement of the third lens group by focusing, to be small. Therefore, even when the zooming ratio is let to be high, the amount of movement of the third lens group is suppressed to be small, and it is possible to prevent the overall image forming optical system from becoming long.

When an upper limit value of conditional expression (5) is surpassed, an absolute value of the focal length f3 of the third lens group becomes excessively large. As the absolute value of the focal length f3 becomes excessively large, the amount of movement of the third lens group for zooming or focusing becomes large, and the overall length of the image forming optical system becomes long.

When a lower limit value of conditional expression (5) is surpassed, the absolute value of the focal length f3 of the third lens group becomes excessively small. As the absolute value of the focal length f3 becomes excessively small, the refractive power of the third lens group becomes excessively strong, and a substantial aberration occurs at the third lens group. When the third lens group is moved for zooming or focusing, the fluctuation of aberration becomes large.

Consequently, since the focal length f3 of the third lens group and the focal length ft of the overall image forming optical system at the telephoto end satisfy conditional expression (5), it is possible to prevent the overall image forming optical system from becoming long while suppressing the fluctuation in aberration at the time of zooming and focusing, and it is possible to achieve a slim camera with even higher image quality.

An electronic image pickup apparatus according to the present invention includes one of the abovementioned image forming optical systems.

The abovementioned image forming optical system is an image forming optical system in which, it is possible to let the zoom factor to be a high of about 10 times, while the overall length of the image forming optical system is comparatively shorter, and various aberrations are corrected favorably. Therefore, when the image pickup apparatus includes such image forming optical system, it is possible to achieve an image pickup apparatus which is slimmed while an image of a high image quality is achieved, and which has a high zooming ratio with a high zoom factor.

In the image forming optical systems according to all the embodiments which will be described below, the final lens component which has been disposed nearest to the image side of the image forming optical system is a cemented lens of three lenses namely, a positive lens, a negative lens, and a positive lens, in order from the object side.

For reducing further the chromatic aberration which cannot be corrected completely only by the cemented lens of the third lens group, it is preferable to dispose a cemented lens of at least one positive lens and one negative lens in the subsequent lens group, and to correct the aberration in a balanced manner.

At this time, since the subsequent lens group has a positive refractive power, for making Petzval's sum of the subsequent lens group to be positive and small, it is preferable to make a refractive index of the positive lens small. When an attempt is made to make the refractive power of the positive lens strong with the low refractive index of the positive lens, it is necessary to reduce a radius of curvature of a lens surface of the positive lens, and an aberration occurs substantially. To prevent this, it is preferable to divide the refractive power by disposing two positive lenses. Therefore, it is more preferable to let the final lens component to be the cemented lens of the positive lens, the negative lens, and the positive lens, in order from the object side, and to correct the chromatic aberration which cannot be corrected completely only by the third lens group.

Consequently, when the final lens component is let to be the cemented lens of the positive lens, the negative lens, and the positive lens, in order from the object side, an image forming optical system in which, the chromatic aberration is corrected further and an effect of the curvature of field is suppressed is achieved, and it is possible to achieve a camera with a higher image quality.

Moreover, in all the embodiments which will be described below, all the three lenses in the cemented lens which is the final lens component are meniscus lenses which are convex on the image side.

When the final lens component is the cemented lens of the three lenses namely the positive lens, the negative lens, and the positive lens, in order from the object side, it is preferable that all these three lenses are meniscus lenses which are convex on the image side. In this case, all the lens surfaces of the cemented lens have a shape which is convex on the image side.

The final lens component is disposed at a position away from a diaphragm. Therefore, when the lens surface of the final lens component is directed such that a spherical center of the lens surface of the final lens component is on a side where the diaphragm is disposed, or in other words, when the convex shape is on the image side, an angle made by a principal light ray of a light beam for which the height of the light ray is high and a normal of each lens surface becomes small, and off-axis aberrations such as a coma aberration and astigmatic difference which occur at the lens surface of the final lens component becomes small.

Moreover, in a case in which, the final lens component is decentered, when all the lens surfaces in the final lens component are not directed in the same direction, an effect of decentering for the respective surface differs substantially, and degradation of a performance due to decentering occurs substantially. However, when all the lens surfaces of the final lens component are directed in the same direction, it is possible to suppress the effect of decentering on the degradation of performance, to be small.

Consequently, when all the three lenses in the cemented lens of the final lens component are meniscus lenses convex on the image side, off-axis aberrations such as the coma aberration and the astigmatic difference are suppressed to be small, and an image forming optical system in which, the effect of the decentering on the degradation of a performance is small, is achieved, and it is possible to achieve a camera with a higher image quality.

Furthermore, in all the embodiments, all the surfaces of the cemented lens which is the final lens component have a convex shape on the image side.

When the final lens component is a cemented lens of three lenses namely, the positive lens, the negative lens, and the positive lens, in order from the object side, it is preferable that all the lens surfaces have a shape which is convex on the image side.

The final lens component is disposed at a position away from the diaphragm. Therefore, when the lens surface of the final lens component is directed such that the spherical center of the lens surface of the final lens component is on the side where the diaphragm is disposed, or in other words, when the convex shape is on the image side, the angle made by the principal light ray of the light beam for which the height of the light ray is high and a normal of each lens surface becomes small, and off-axis aberrations such as the coma aberration and the astigmatic difference which occur at the lens surface of the final lens component becomes small.

Moreover, in a case in which, the final lens component is decentered, when all the lens surfaces in the final lens component are not directed in the same direction, the effect of decentering for the respective surface differs substantially, and degradation of the performance due to decentering occurs substantially. However, when all the lens surfaces of the final lens component are directed in the same direction, it is possible to suppress the effect of decentering on the degradation of the performance, to be small.

Consequently, when all the surfaces of the cemented lens which is the final lens component, have a shape which is convex on the image side, off-axis aberrations such as the coma aberration and the astigmatic difference are suppressed to be further smaller, and an image forming optical system in which, the effect of the decentering on degradation of the performance is small, is achieved, and it is possible to achieve a camera with a higher image quality.

Moreover, in all the embodiments, a refractive index of a negative lens in the cemented lens which is the final lens component is higher than a refractive index of the two positive lenses.

When the final lens component is a cemented lens of three lenses namely, the positive lens, the negative lens, and the positive lens in order from the object side, it is preferable that the refractive index of the negative lens is higher than the refractive index of the two positive lenses.

Since the subsequent lens group has a positive refractive power, when the refractive index of the negative lens is let to be higher than the refractive index of the two positive lenses, it is possible to make Petzval's sum of the subsequent lens group to be positive and yet small. Therefore, it is possible to make small Petzval's sum of the overall image forming optical system, and to suppress the curvature of field to be small.

Consequently, since the refractive index of the negative lens of the cemented lens which is the final lens component is higher than the refractive index of the two positive lenses, it is possible to achieve a camera with a higher image quality in which, the occurrence of the curvature of field is suppressed further.

Moreover, in all the embodiments, the image forming optical system includes a fourth lens group which is disposed adjacent to the image side of the third lens group, and the fourth lens group has a positive single lens, and a shaping factor $SF_{4p}$ of the positive single lens satisfies conditional expression (6).

$$-1 < SF_{4p} < -0.5 \quad (6)$$

where, $$SF_{4p} = (r1_{4p} + r2_{4p})/(r1_{4p} - r2_{4p}),$$

where, $r1_{4p}$ denotes a radius of curvature of a surface on the object side of the positive lens in the fourth lens group, and $r2_{4p}$ denotes a radius of curvature of a surface on the image side of the positive lens in the fourth lens group.

It is preferable that the fourth lens group is disposed adjacent to the image side of the third lens group, and that the fourth lens group has a positive single lens, and the shaping factor $SF_{4p}$ of the positive single lens satisfies conditional expression (6).

Since the shaping factor $SF_{4p}$ of the positive single lens satisfies conditional expression (6), the positive single lens takes a shape of a biconvex lens, and a positive refractive power of a surface on the object side of the positive single lens becomes strong. Therefore, a principal point of the positive single lens comes near the object side, and a distance from a principal point of the adjacent third lens group is susceptible to be narrowed, and it is possible to achieve even higher magnification.

Consequently, since the fourth lens group is disposed adjacent to the third lens group, and the fourth lens group has the positive single lens, and the shaping factor $SF_{4p}$ of the positive single lens satisfies conditional expression (6), it is possible to bring closer the principal point of the positive lens of the fourth lens group and the principal point of the third lens group, and it is possible to achieve a camera having a higher magnification.

Next, shapes of surfaces of the final lens component will be described below.

(1) Fourth Embodiment

A surface nearest to the object side of the cemented lens of the final lens component is an aspheric surface. All the lens surfaces of the cemented lens have a convex shape on the image side, and by letting all the lens surfaces of the cemented lens to be convex on the image side, off-axis aberrations such as an astigmatism and the coma aberration are suppressed to be small. However, by letting the surface nearest to the object side of the cemented lens to be an aspheric surface, it is possible to set an off-axis refractive power appropriately, and to reduce the astigmatism and the coma aberration to be further smaller.

(2) Fifth Embodiment

The surface nearest to the image side of the cemented lens in the final lens component is an aspheric surface. All the lens surfaces of the cemented lens have a convex shape on the image side, and by letting all the lens surfaces of the cemented lens to be convex on the image side, off-axis aberrations such as the astigmatism and the coma aberration are suppressed to be small. However, by letting the surface nearest to the image side of the cemented lens to be an aspheric surface, it is possible to set the off-axis refractive power appropriately, and to reduce the astigmatism and the coma aberration to be further smaller.

(3) Sixth Embodiment

A surface nearest to the object and a cemented surface on the object side of the cemented lens of the final lens component are aspheric surfaces. All the lens surfaces of the cemented lens have a convex shape on the image side, and by letting all the lens surfaces of the cemented lens to be convex on the image side, off-axis aberrations such as the astigmatism and the coma aberration are suppressed to be small. However, by letting the surface nearest to the object side of the cemented lens to be an aspheric surface, it is possible to set the off-axis refractive power appropriately, and to reduce the astigmatism and the coma aberration to be further smaller. Furthermore, out of the two cemented surfaces, the surface on the object side is also an aspheric surface. Therefore, it is possible to reduce the chromatic aberration of magnification at the wide angle side to be further smaller, and to reduce the chromatic aberration of the spherical aberration at the telephoto end to be further smaller.

In an eighth embodiment, the cemented surface of the third lens group is an aspheric surface. Therefore, it is possible to suppress the chromatic aberration of magnification which is an off-axis chromatic aberration at the wide angle side, to be small. Moreover, it is possible to suppress the chromatic aberration and the chromatic aberration of the spherical aberration at the telephoto side, to be small.

In all the embodiments which will be described below, the positive lens in the cemented lens having a negative refractive power in the third lens group may be made of a glass material or may be made of a resin material.

When the positive lens is let to be a glass material, types thereof are extremely large as compared to types of a resin material, and it is possible to select the material of the positive lens and the negative lens in the cemented lens having a negative refractive power, from a large number of combinations, and to achieve even more appropriate optical performance. Moreover, a change in optical properties with respect to a change in temperature and moisture is small, and it is possible to achieve an optical system in which, degradation of the performance due to change in the environment is difficult to occur.

Whereas, when the positive lens is let to be of a resin material, it is possible to form the positive lens by direct molding on the object side of the negative lens in the cemented lens having a negative refractive power. Such lens is called as a compound lens.

In such direct molding, one lens portion in the form of a liquid resin is coated or discharged on the other lens, and then hardened to form a lens. Therefore, as compared to a case of manufacturing the cemented lens separately, it is possible to reduce a central thickness or an edge thickness of the lens to be extremely thin. Therefore, the cemented lens which is manufactured by direct molding can be let to have a thickness of almost one lens.

Consequently, when the positive lens is made of a resin material, it is possible to shorten both, the overall length of the optical system and a thickness when collapsed.

Moreover, a resin material, as compared to a glass material, is light in weight, and has an advantage of being low cost. It is particularly effective in a case of moving the third lens group at the time of focusing.

As a resin material to be used for direct molding, it is preferable to use a resin material such as an energy curable resin. When an energy curable resin is used, after the resin is coated or discharged on one lens, the resin is pressed and elongated in a die, and just by imparting energy, it is possible to manufacture the compound lens easily.

As an energy curable resin, any type of resin material such as heat-hardening resin material and an ultraviolet-curing resin material may be used. Particularly, it is preferable to use an ultraviolet-curing resin material. When an ultraviolet-curing energy curable resin material is used, since it is possible to harden the resin without heating, it is possible to use a material having low heat-resistance such as plastic for a lens which becomes a base material. Moreover, small-sizing of a molding apparatus is possible.

EMBODIMENTS

Exemplary embodiments of the image forming optical system and the electronic image pickup apparatus according to the present invention will be described below in detail by referring to the accompanying diagrams. However, the present invention is not restricted to embodiments described below.

Figure 1B:
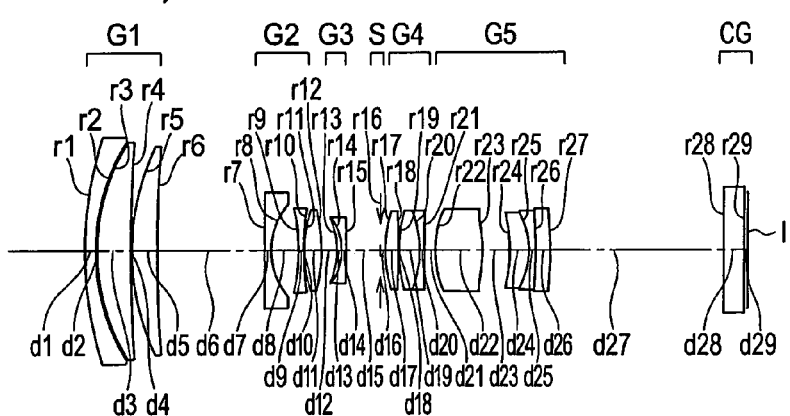
Figure 1C:
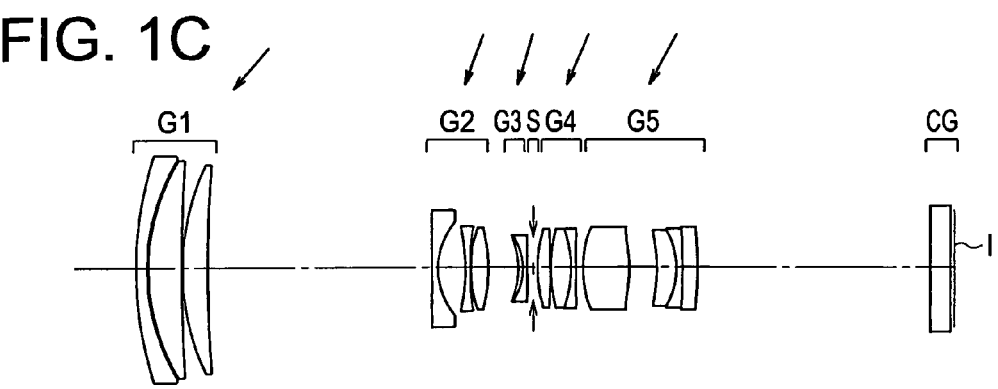

Next, an image forming optical system according to a first embodiment of the present invention will be described below. FIG. 1A, FIG. 1B, and FIG. 1C are cross-sectional views along an optical axis showing an optical arrangement at the time of infinite object point focusing of the image forming optical system according to the first embodiment of the present invention, where, FIG. 1A shows a state at a wide angle end, FIG. 1B shows an intermediate focal length state, and FIG. 1C shows a state at a telephoto end.

Figure 2A:
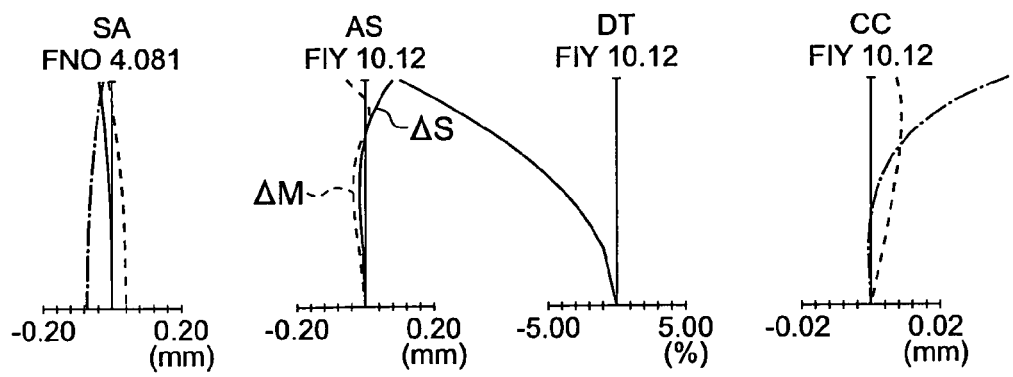
FIG. 2A, FIG. 2B, and FIG. 2C are diagrams showing a spherical aberration, an astigmatism, a distortion, and a chromatic aberration of magnification at the time of infinite object point focusing of the image forming optical system according to the first embodiment, where.
Figure 2B:
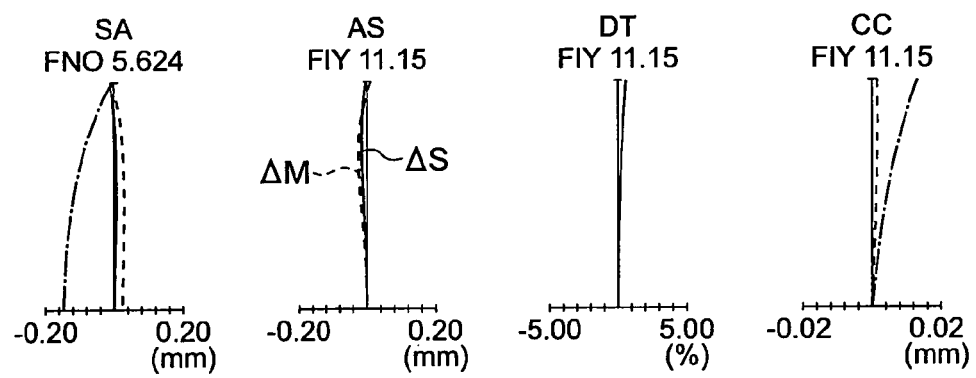
Figure 2C:
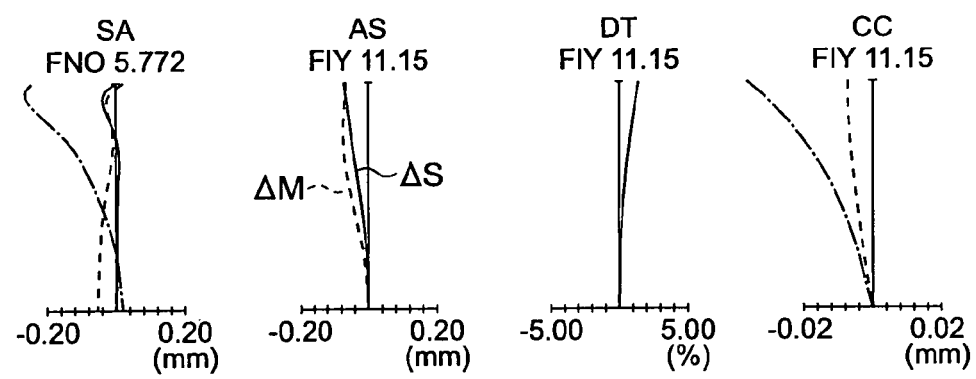

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the image forming optical system according to the first embodiment, where FIG. 2A shows a state at the wide angle end, FIG. 2B shows an intermediate focal length state, and FIG. 2C shows a state at the telephoto end. Moreover, FIY denotes an image height. Symbols in aberration diagrams are same in all embodiments which will be described below.

The image forming optical system according to the first embodiment, as shown in FIG. 1A, FIG. 1B, and FIG. 1C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power. In all the embodiments which will be described below, in lens cross-sectional views, CG denotes a cover glass, and I denotes an image pickup surface of an electronic image pickup element.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order from the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to seven surfaces namely, both surfaces of the biconcave negative lens L4 on the object side in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 in the fifth lens group G5.

Figure 3A:
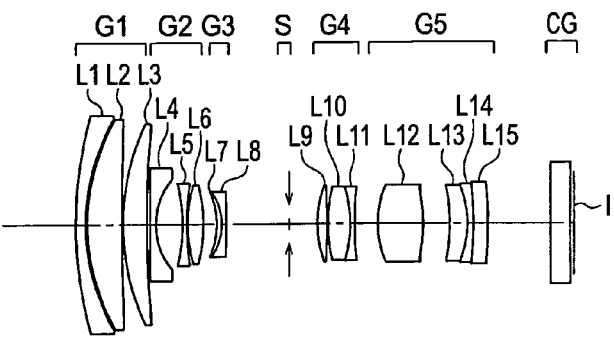
FIG. 3A, FIG. 3B, and FIG. 3C are cross-sectional views along an optical axis showing an optical arrangement at the time of infinite object point focusing of an image forming optical system according to a second embodiment of the present invention, where.
Figure 3B:
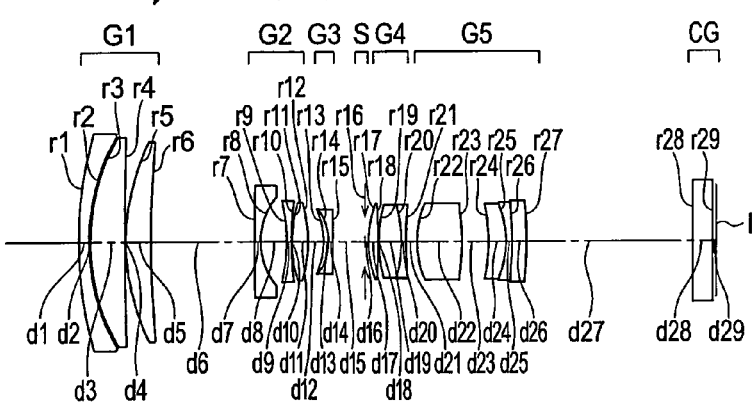
Figure 3C:
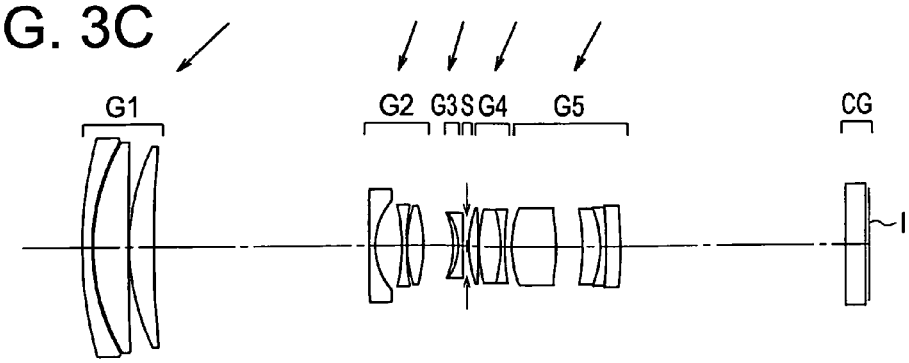

Next, an image forming optical system according to a second embodiment of the present invention will be described below. FIG. 3A, FIG. 3B, and FIG. 3C are cross-sectional views along an optical axis showing an optical arrangement at the time of infinite object point focusing of the image forming optical system according to the second embodiment of the present invention, where, FIG. 3A shows a state at a wide angle end, FIG. 3B shows an intermediate focal length state, and FIG. 3C shows a state at a telephoto end.

Figure 4A:
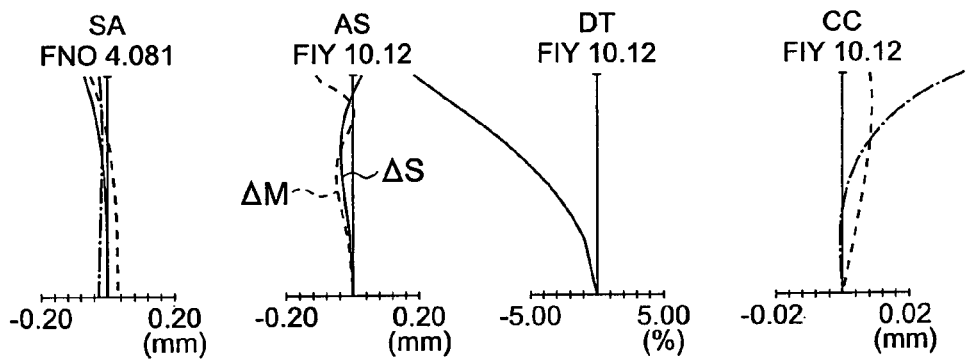
FIG. 4A, FIG. 4B, and FIG. 4C are diagrams showing a spherical aberration, an astigmatism, a distortion, and a chromatic aberration of magnification at the time of infinite object point focusing of the image forming optical system according to the second embodiment, where.
Figure 4B:
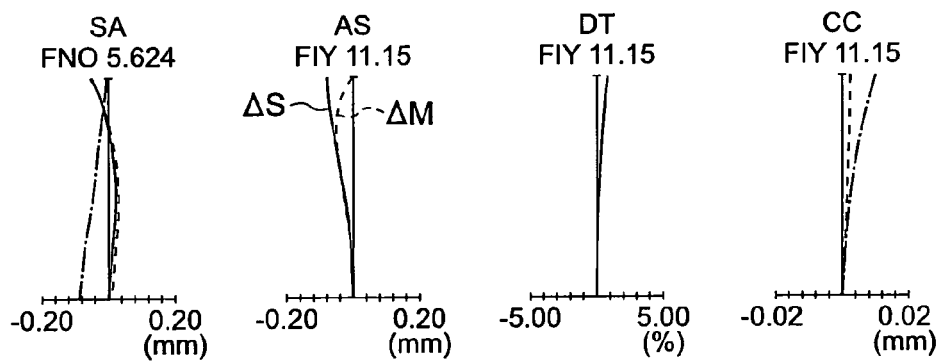
Figure 4C:
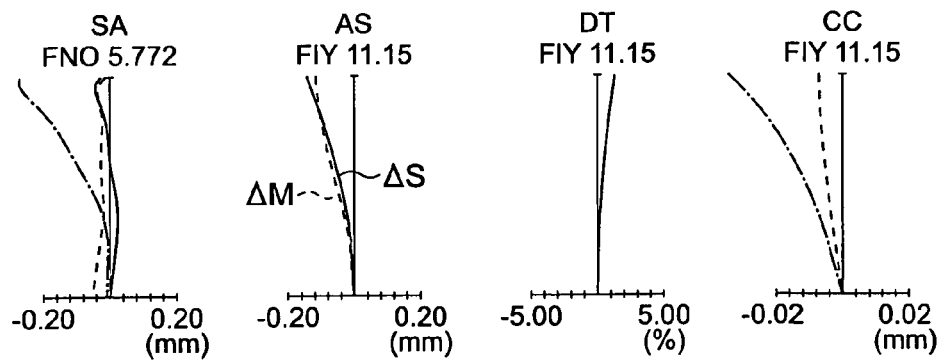

FIG. 4A, FIG. 4B, and FIG. 4C are diagrams showing a spherical aberration, an astigmatism, a distortion, and a chromatic aberration of magnification at the time of infinite object point focusing of the image forming optical system according to the second embodiment, where, FIG. 4A shows a state at the wide angle end, FIG. 4B shows an intermediate focal lengths state, and FIG. 4C shows a state at the telephoto end.

The image forming optical system according to the second embodiment, as shown in FIG. 3A, FIG. 3B, and FIG. 3C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the object side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order from the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to seven surfaces namely, both surfaces of the biconcave negative lens L4 on the object side in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 in the fifth lens group G5.

Figure 5A:
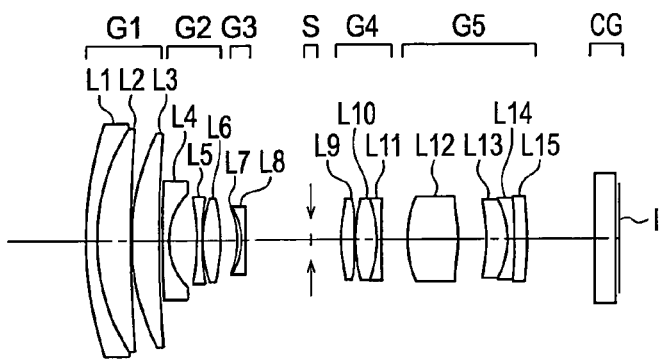
FIG. 5A, FIG. 5B, and FIG. 5C are cross-sectional views along an optical axis showing an optical arrangement at the time of infinite object point focusing of an image forming optical system according to a third embodiment of the present invention, where.
Figure 5B:
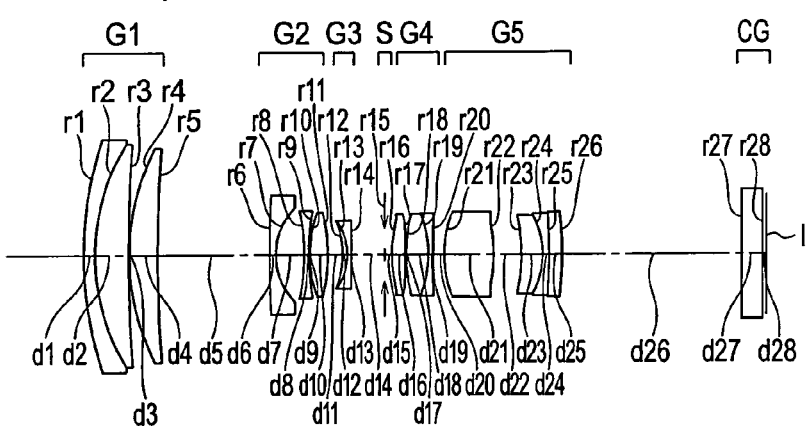
Figure 5C:
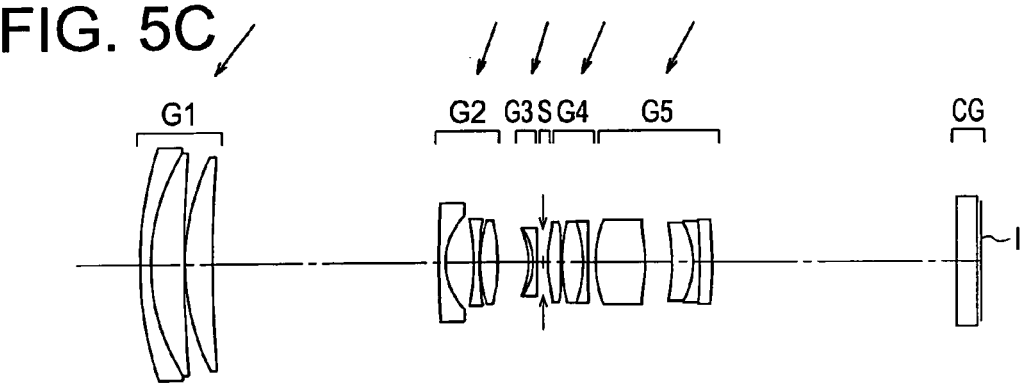

Next, an image forming optical system according to a third embodiment of the present invention will be described below. FIG. 5A, FIG. 5B, and FIG. 5C are cross-sectional views along an optical axis showing an optical arrangement at the time of infinite object point focusing of the image forming optical system according to the third embodiment of the present invention, where, FIG. 5A shows a state at a wide angle end, FIG. 5B shows an intermediate focal length state, and FIG. 5C shows a state at a telephoto end.

Figure 6A:
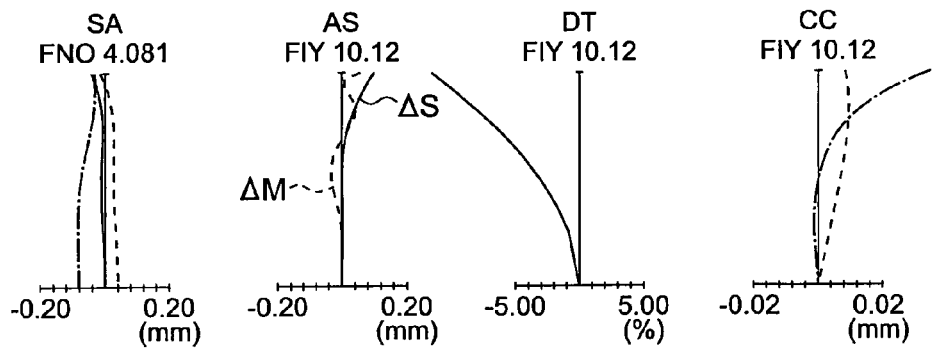
FIG. 6A, FIG. 6B, and FIG. 6C are diagrams showing a spherical aberration, an astigmatism, a distortion, and a chromatic aberration of magnification at the time of infinite object point focusing of the image forming optical system according to the third embodiment, where.
Figure 6B:
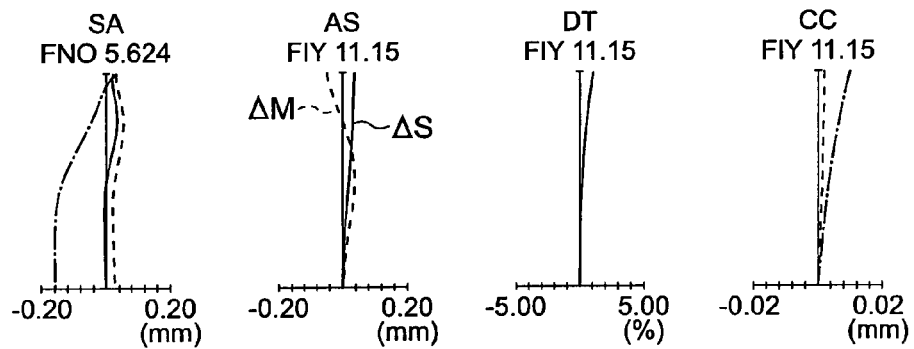
Figure 6C:
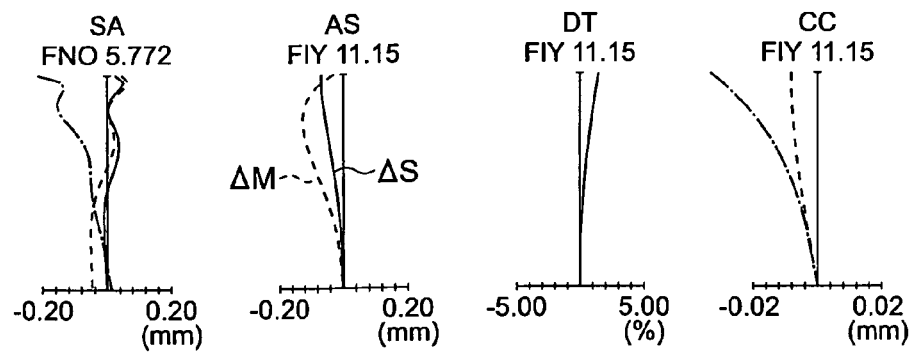

FIG. 6A, FIG. 6B, and FIG. 6C are diagrams showing a spherical aberration, an astigmatism, a distortion, and a chromatic aberration of magnification at the time of infinite object point focusing of the image forming optical system according to the third embodiment, where, FIG. 6A shows a state at the wide angle end, FIG. 6B shows an intermediate focal length state, and FIG. 6C shows a state at the telephoto end.

The image forming optical system according to the third embodiment, as shown in FIG. 5A, FIG. 5B, and FIG. 5C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power.

The first lens group G1 includes in order from the object side, a cemented lens of a negative meniscus lens L1 having a convex surface directed toward the object side and a positive meniscus lens L2 having a convex surface directed toward the object side, and a positive meniscus lens L3 having a convex surface directed toward the object side, and has a positive refractive power as a whole.

The second lens group G2 includes in order from the object side, a negative meniscus lens L4 having a convex surface directed toward the object side, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order from the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to seven surfaces namely, both surfaces of the negative meniscus lens L4 in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 in the fifth lens group G5.

Figure 7A:
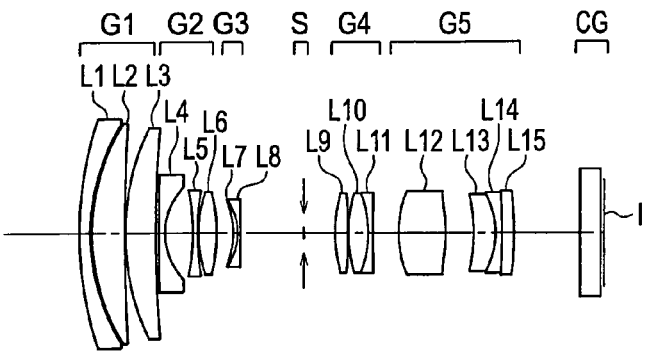
FIG. 7A, FIG. 7B, and FIG. 7C are cross-sectional views along an optical axis showing an optical arrangement at the time of infinite object point focusing of an image forming optical system according to a fourth embodiment of the present invention, where.
Figure 7B:
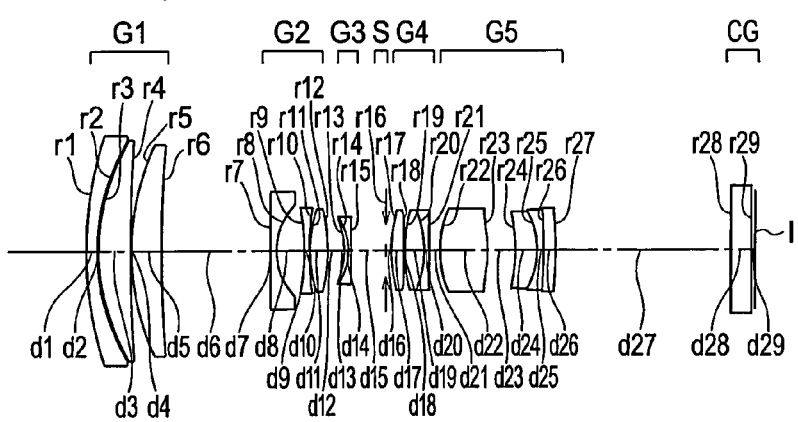
Figure 7C:
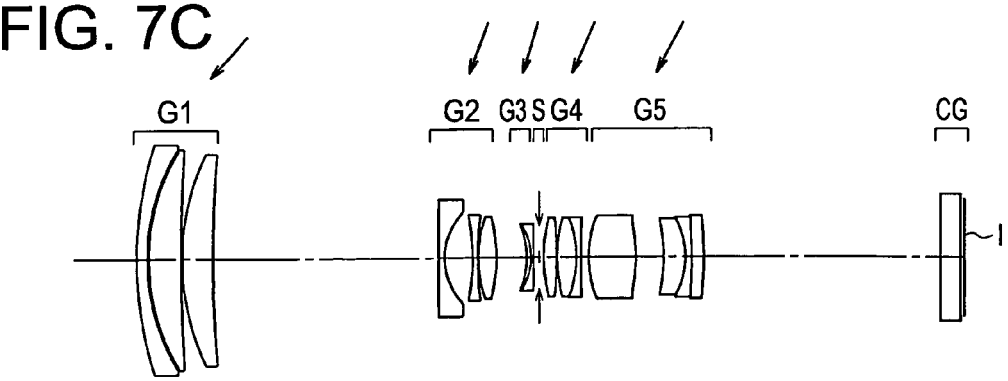

Next, an image forming optical system according to a fourth embodiment of the present invention will be described below. FIG. 7A, FIG. 7B, and FIG. 7C are cross-sectional views along an optical axis showing an optical arrangement at the time of infinite object point focusing of the image forming optical system according to the fourth embodiment of the present invention, where, FIG. 7A shows a state at a wide angle end, FIG. 7B shows an intermediate focal length state, and FIG. 7C shows a state at a telephoto end.

Figure 8A:
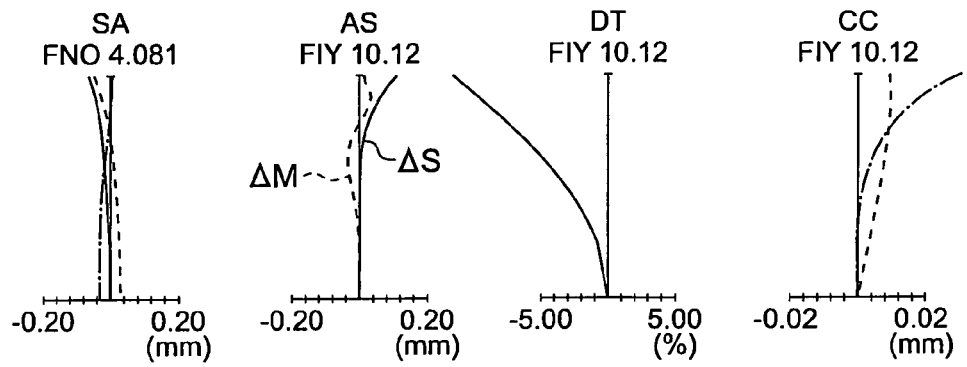
FIG. 8A, FIG. 8B, and FIG. 8C are diagrams showing a spherical aberration, an astigmatism, a distortion, and a chromatic aberration of magnification at the time of infinite object point focusing of the image forming optical system according to the fourth embodiment, where.
Figure 8B:
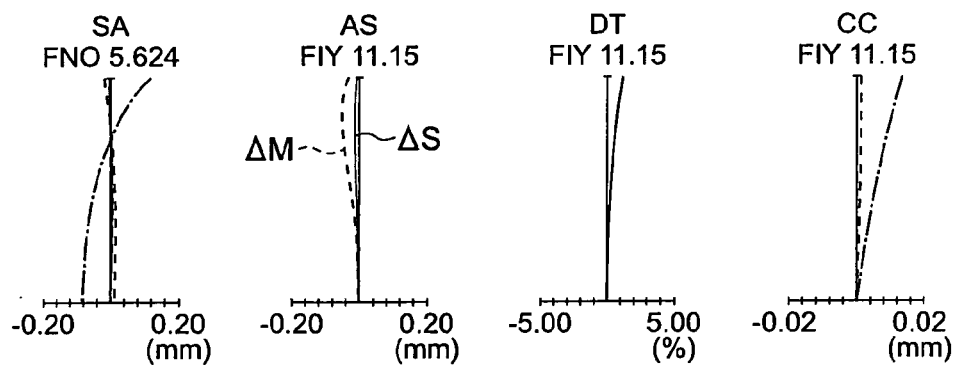
Figure 8C:
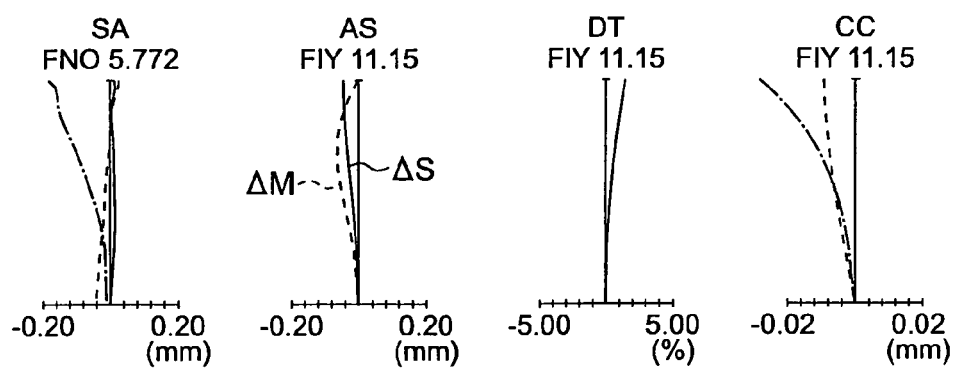

FIG. 8A, FIG. 8B, and FIG. 8C are diagrams showing a spherical aberration, an astigmatism, a distortion, and a chromatic aberration of magnification at the time of infinite object point focusing of the image forming optical system according to the fourth embodiment, where, FIG. 8A shows a state at the wide angle end, FIG. 8B shows an intermediate focal length state, and FIG. 8C shows a state at the telephoto end.

The image forming optical system according to the fourth embodiment, as shown in FIG. 7A, FIG. 7B, and FIG. 7C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order from the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to eight surfaces namely, both surfaces of the biconcave negative lens L4 on the object side in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 and a surface on the object side of the positive meniscus lens L13 on the object side in the fifth lens group G5.

Figure 9A:
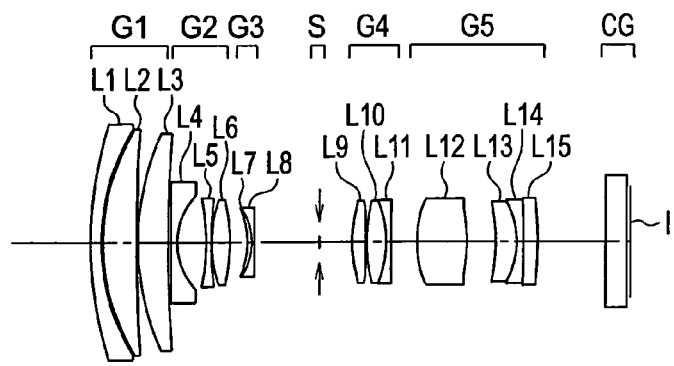
FIG. 9A, FIG. 9B, and FIG. 9C are cross-sectional views along an optical axis showing an optical arrangement at the time of infinite object point focusing of an image forming optical system according to a fifth embodiment of the present invention, where.
Figure 9B:
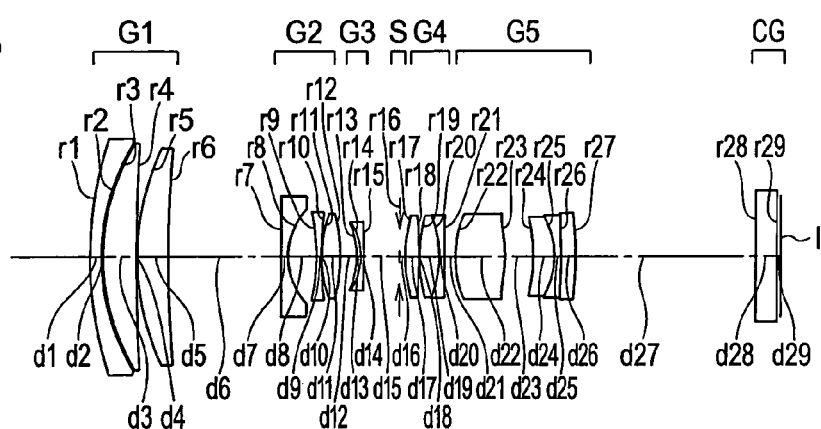
Figure 9C:
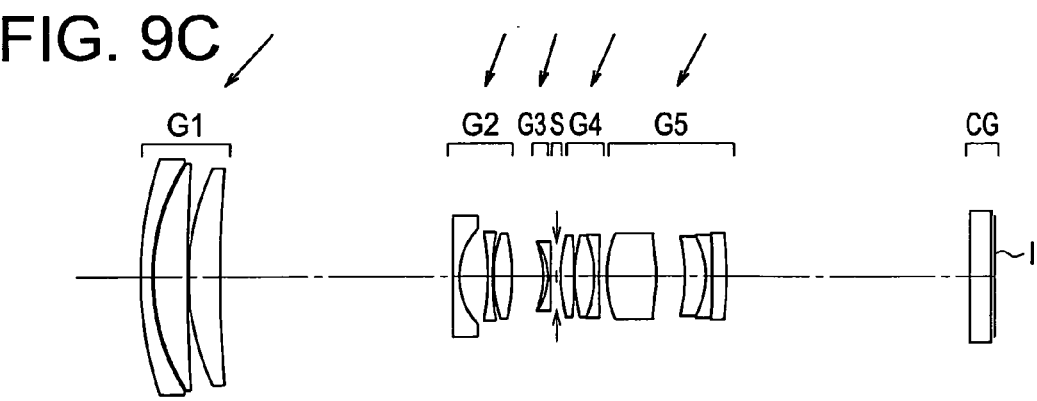

Next, an image forming optical system according to a fifth embodiment of the present invention will be described below. FIG. 9A, FIG. 9B, and FIG. 9C are cross-sectional views along an optical axis showing an optical arrangement at the time of infinite object point focusing of the image forming optical system according to the fifth embodiment of the present invention, where, FIG. 9A shows a state at a wide angle end, FIG. 9B shows an intermediate focal length state, and FIG. 9C shows a state at a telephoto end.

Figure 10A:
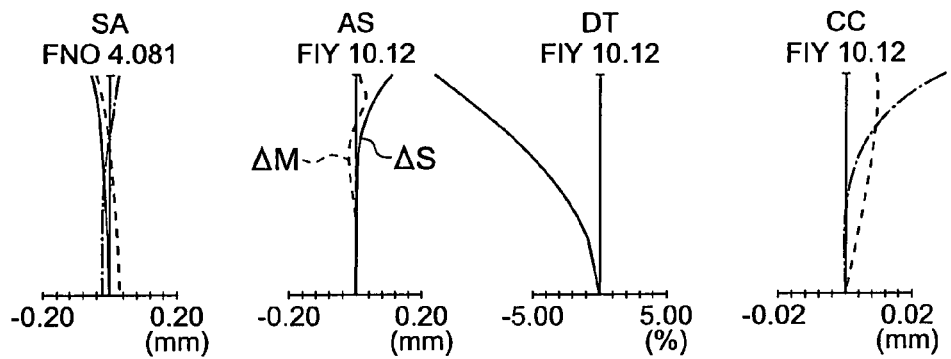
FIG. 10A, FIG. 10B, and FIG. 10C are diagrams showing a spherical aberration, an astigmatism, a distortion, and a chromatic aberration of magnification at the time of infinite object point focusing of the image forming optical system according to the fifth embodiment, where.
Figure 10B:
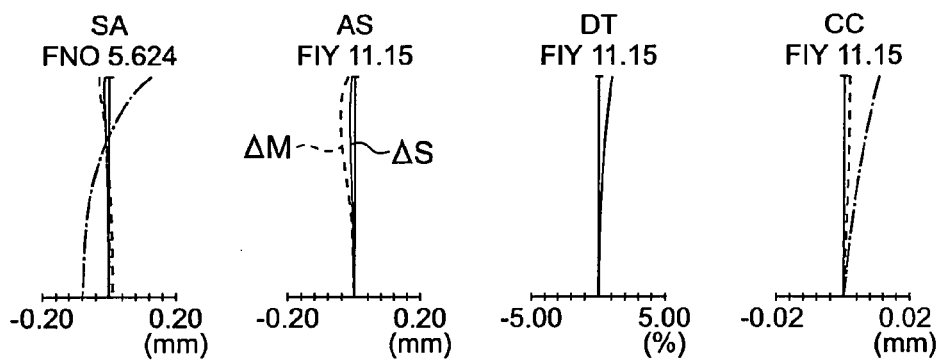
Figure 10C:
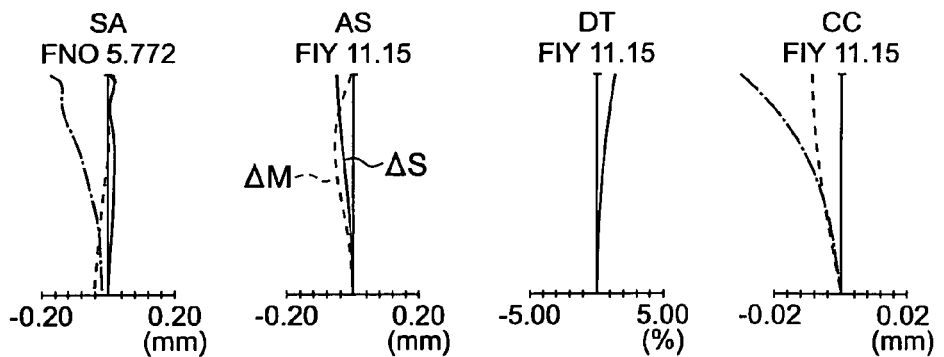

FIG. 10A, FIG. 10B, and FIG. 100 are diagrams showing a spherical aberration, an astigmatism, a distortion, and a chromatic aberration of magnification at the time of infinite object point focusing of the image forming optical system according to the fifth embodiment, where, FIG. 10A shows a state at the wide angle end, FIG. 10B shows an intermediate focal length state, and FIG. 10C shows a state at the telephoto end.

The image forming optical system according to the fifth embodiment, as shown in FIG. 9A, FIG. 9B, and FIG. 9C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order form the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to eight surfaces namely, both surfaces of the biconcave negative lens L4 on the object side in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 and a surface on the image of the positive meniscus lens L15 on the image side in the fifth lens group G5.

Figure 11A:
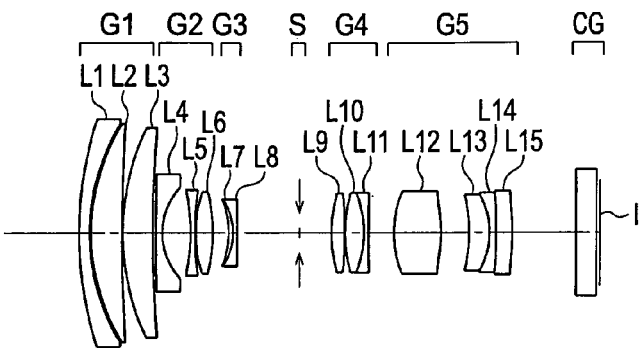
FIG. 11A, FIG. 11B, and FIG. 11C are cross-sectional views along an optical axis showing an optical arrangement at the time of infinite object point focusing of an image forming optical system according to a sixth embodiment of the present invention, where.
Figure 11B:
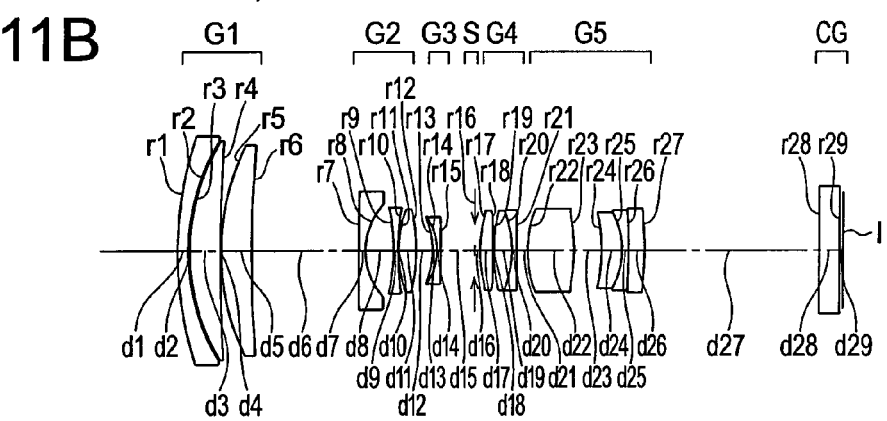
Figure 11C:
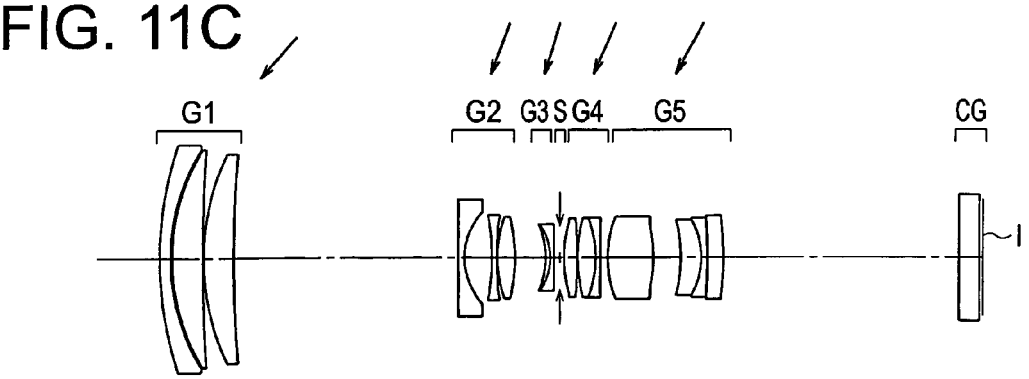

Next, an image forming optical system according to a sixth embodiment of the present invention will be described below. FIG. 11A, FIG. 11B, and FIG. 11C are cross-sectional views along an optical axis showing an optical arrangement at the time of infinite object point focusing of an image forming optical system according to the sixth embodiment of the present invention, where, FIG. 11A shows a state at a wide angle end, FIG. 11B shows an intermediate focal length state, and FIG. 11C shows a state at a telephoto end.

Figure 12A:
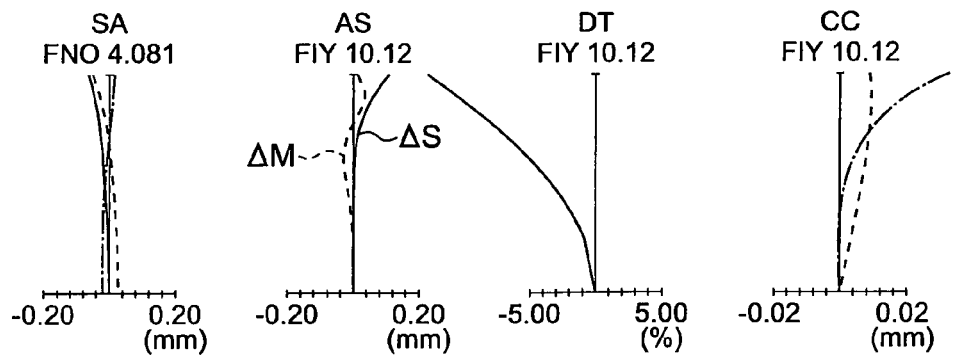
FIG. 12A, FIG. 12B, and FIG. 12C are diagrams showing a spherical aberration, an astigmatism, a distortion, and a chromatic aberration of magnification at the time of infinite object point focusing of the image forming optical system according to the sixth embodiment, where.
Figure 12B:
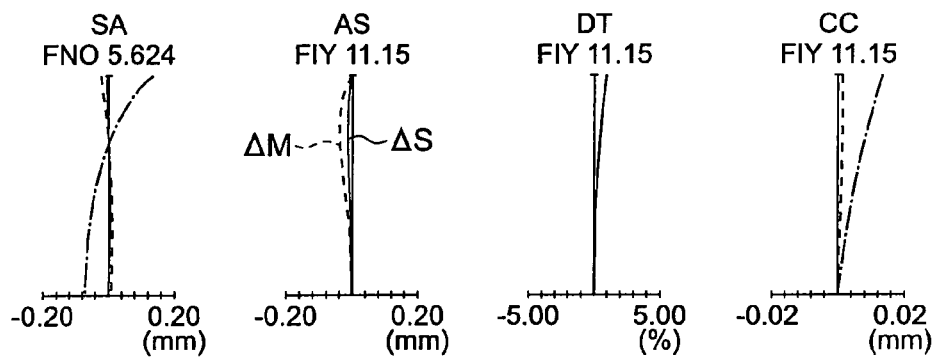
Figure 12C:
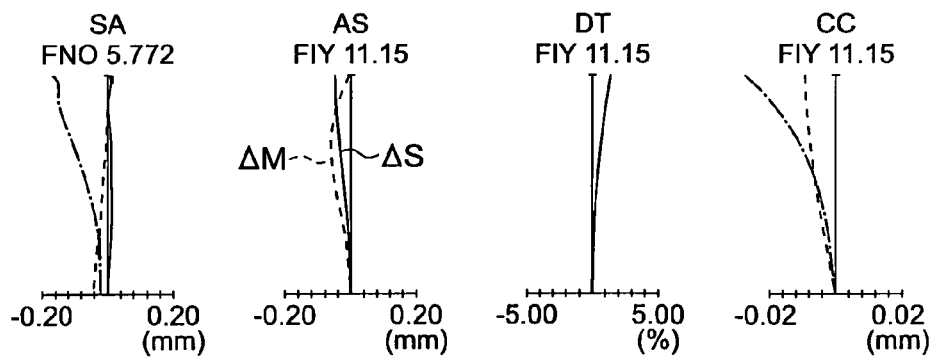

FIG. 12A, FIG. 12B, and FIG. 12C are diagrams showing a spherical aberration, an astigmatism, a distortion, and a chromatic aberration of magnification at the time of infinite object point focusing of the image forming optical system according to the sixth embodiment, where, FIG. 12A shows a state at the wide angle end, FIG. 12B shows an intermediate focal length state, and FIG. 12C shows a state at the telephoto end.

The image forming optical system according to the sixth embodiment, as shown in FIG. 11A, FIG. 11B, and FIG. 11C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order from the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to nine surfaces namely, both surfaces of the biconcave negative lens L4 on the object side in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 and both surfaces on the image side of the positive meniscus lens L13 on the object side in the fifth lens group G5.

Figure 13A:
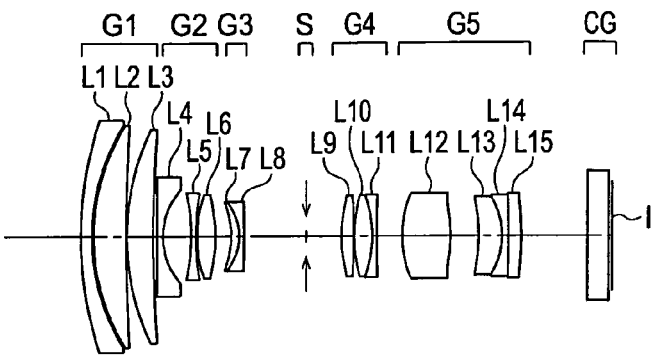
FIG. 13A, FIG. 13B, and FIG. 13C are cross-sectional views along an optical axis showing an optical arrangement at the time of infinite object point focusing of an image forming optical system according to a seventh embodiment of the present invention, where.
Figure 13B:
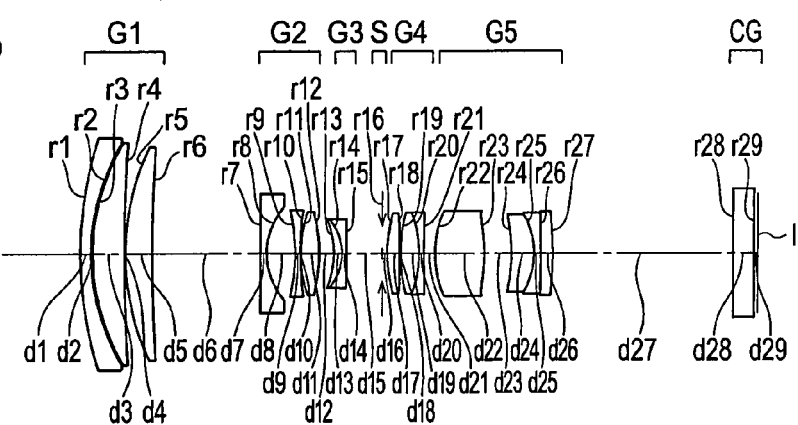
Figure 13C:
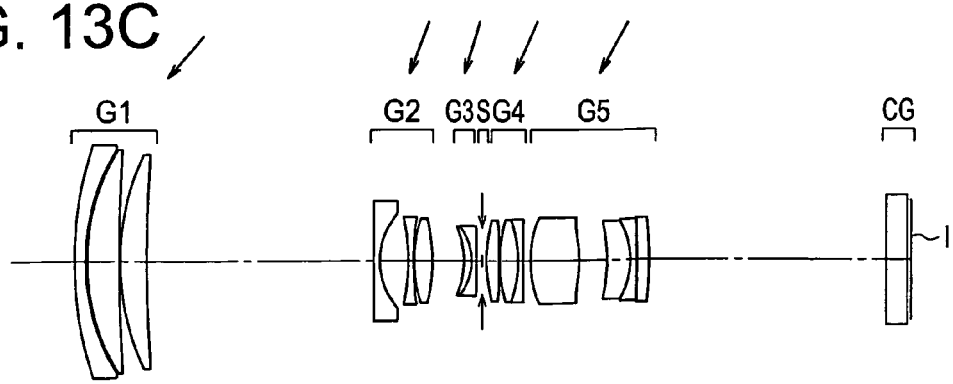

Next, an image forming optical system according to a seventh embodiment of the present invention will be described below. FIG. 13A, FIG. 13B, and FIG. 13C are cross-sectional views along an optical axis showing an optical arrangement at the time of infinite object point focusing of the image forming optical system according to the seventh embodiment of the present invention, where, FIG. 13A shows as state at a wide angle end, FIG. 13B shows an intermediate focal length state, and FIG. 13C shows a state at a telephoto end.

Figure 14A:
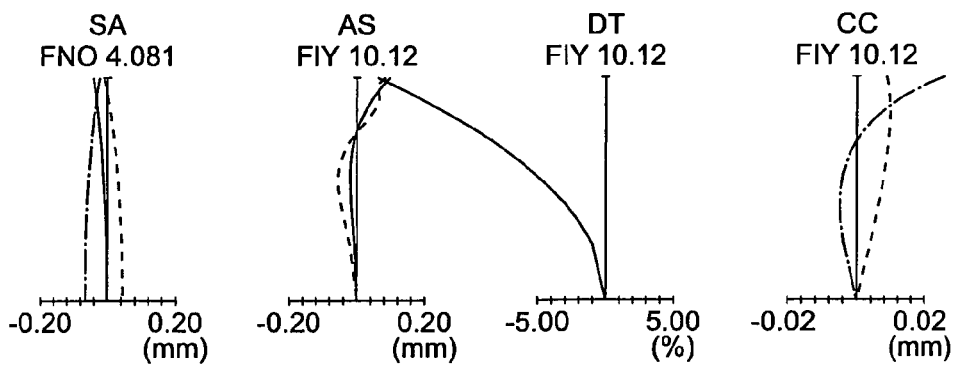
FIG. 14A, FIG. 14B, and FIG. 14C are diagrams showing a spherical aberration, an astigmatism, a distortion, and a chromatic aberration of magnification at the time of infinite object point focusing of the image forming optical system according to the seventh embodiment, where.
Figure 14B:
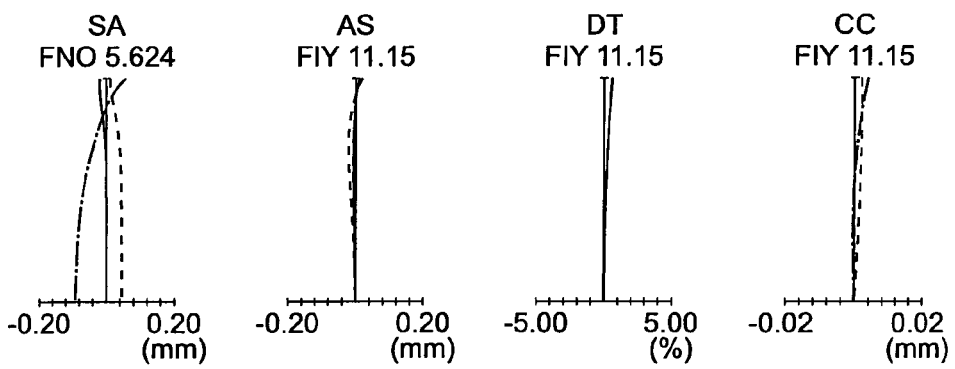
Figure 14C:
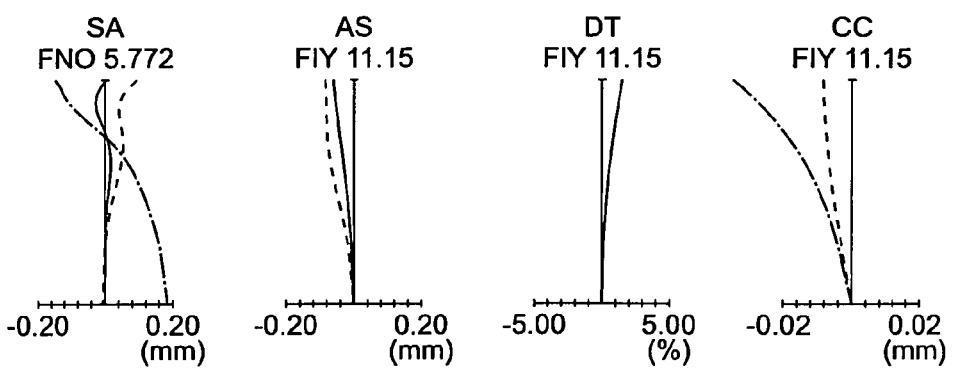

FIG. 14A, FIG. 14B, and FIG. 14C are diagrams showing a spherical aberration, an astigmatism, a distortion, and a chromatic aberration of magnification at the time of infinite object point focusing of the image forming optical system according to the seventh embodiment, where, FIG. 14A shows a state at the wide angle end, FIG. 14B shows an intermediate focal length state, and FIG. 14C shows a state at the telephoto end.

The image forming optical system according to the seventh embodiment, as shown in FIG. 13A, FIG. 13B, and FIG. 13C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order from the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to seven surfaces namely, both surfaces of the biconcave negative lens L4 on the object side in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 in the fifth lens group G5.

Figure 15A:
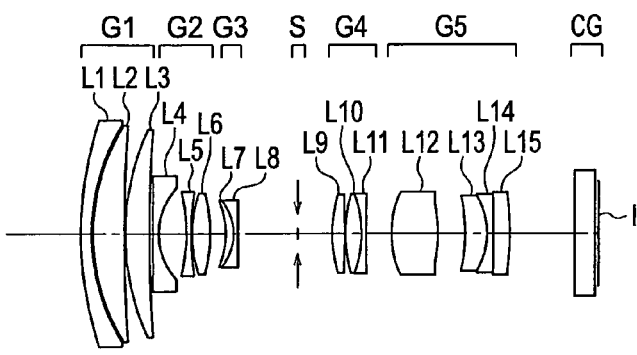
FIG. 15A, FIG. 15B, and FIG. 15C are cross-sectional views along an optical axis showing an optical arrangement at the time of infinite object point focusing of an image forming optical system according to an eighth embodiment of the present invention, where.
Figure 15B:
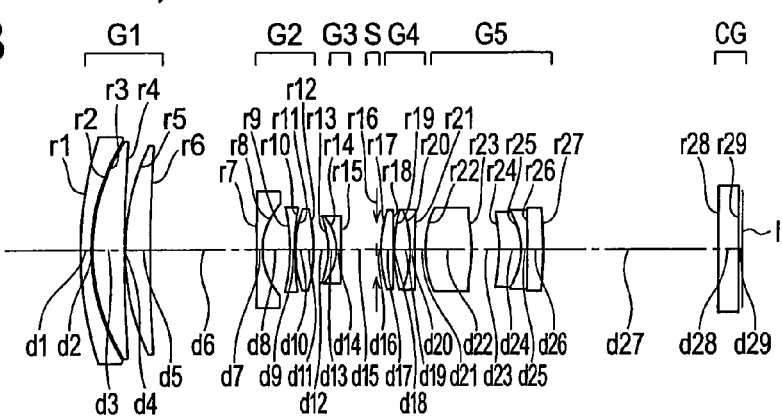
Figure 15C:
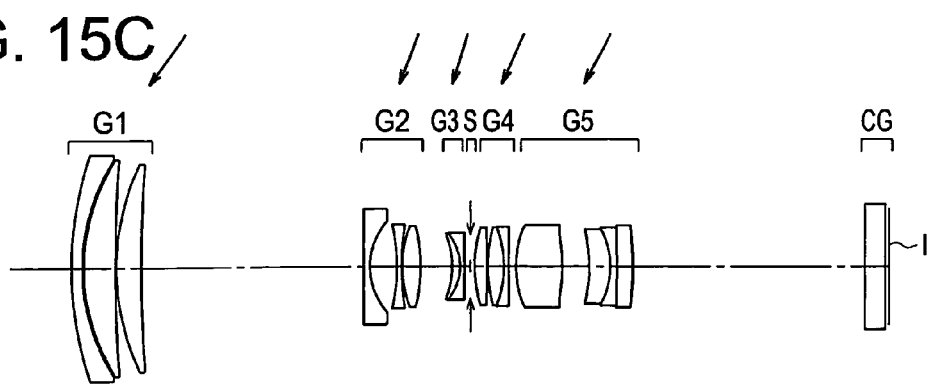

Next, an image forming optical system according to an eighth embodiment of the present invention will be described below. FIG. 15A, FIG. 15B, and FIG. 15C are cross-sectional views along an optical axis showing an optical arrangement at the time of infinite object point focusing of the image forming optical system according to the eighth embodiment of the present invention, where, FIG. 15A shows a state at a wide angle end, FIG. 15B shows an intermediate focal length state, and FIG. 15C shows a state at a telephoto end.

Figure 16A:
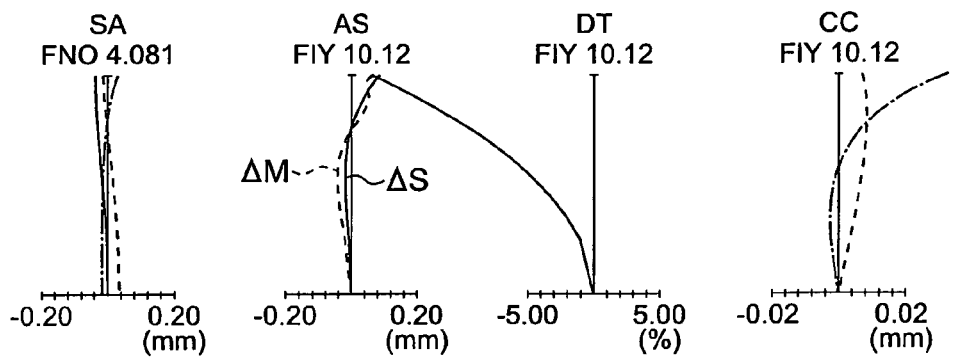
FIG. 16A, FIG. 16B, and FIG. 16C are diagrams showing a spherical aberration, an astigmatism, a distortion, and a chromatic aberration of magnification at the time of infinite object point focusing of the image forming optical system according to the eighth embodiment, where.
Figure 16B:
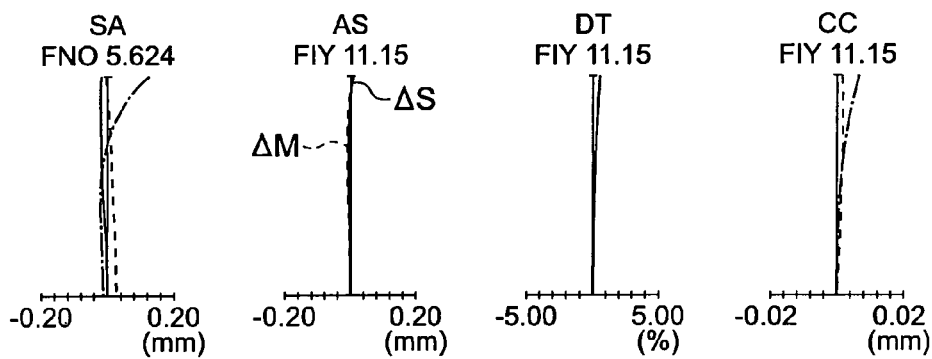
Figure 16C:
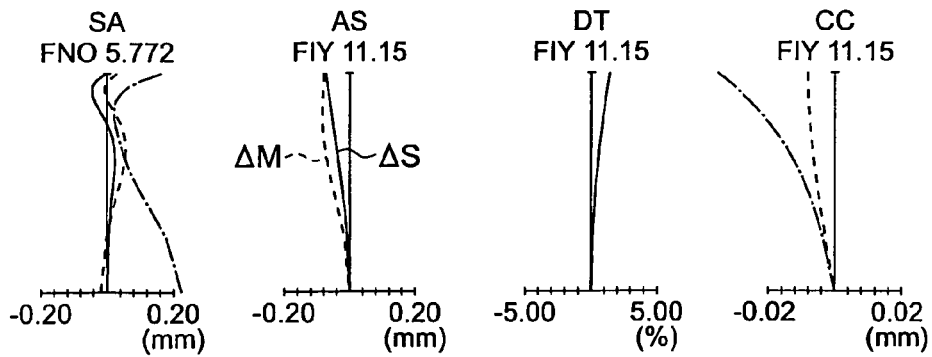

FIG. 16A, FIG. 16B, and FIG. 16C are diagrams showing a spherical aberration, an astigmatism, a distortion, and a chromatic aberration of magnification at the time of infinite object point focusing of the image forming optical system according to the eighth embodiment, where, FIG. 16A shows a state at the wide angle end, FIG. 16B shows an intermediate focal lengths state, and FIG. 16C shows as state at the telephoto end.

The image forming optical system according to the eighth embodiment, as shown in FIG. 15A, FIG. 15B, and FIG. 15C, includes in order from an object side, a first lens group G1 having a positive refractive power, a second lens group G2 having a negative refractive power, a third lens group G3 having a negative refractive power, an aperture stop S, a fourth lens group G4 having a positive refractive power, and a fifth lens group G5 having a positive refractive power.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order form the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes in order from the object side, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The aperture stop S moves toward the object side.

An aspheric surface is provided to eight surfaces namely, both surfaces of the biconcave negative lens L4 on the object side in the second lens group G2, both surfaces of the positive meniscus lens L7 in the third lens group G3, both surfaces of the biconvex positive lens L9 on the object side in the fourth lens group G4, and both surfaces of the biconvex positive lens L12 in the fifth lens group G5.

Figure 17A:
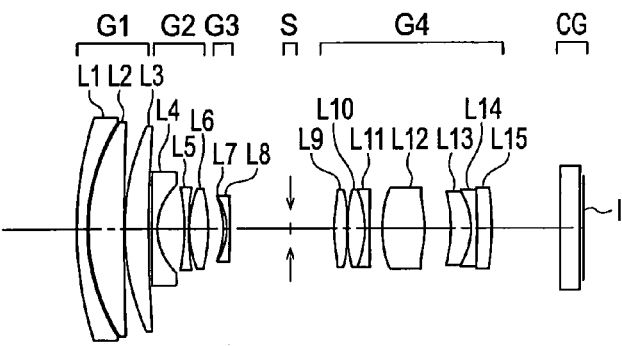
FIG. 17A, FIG. 17B, and FIG. 17C are cross-sectional views along an optical axis showing an optical arrangement at the time of infinite object point focusing of an image forming optical system according to a ninth embodiment of the present invention, where.
Figure 17B:
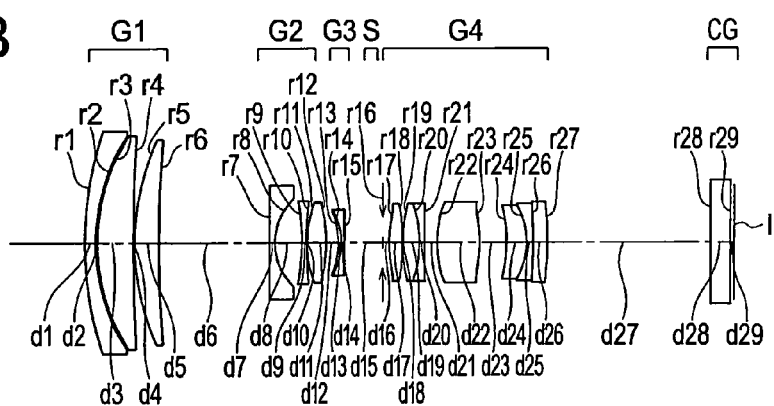
Figure 17C:
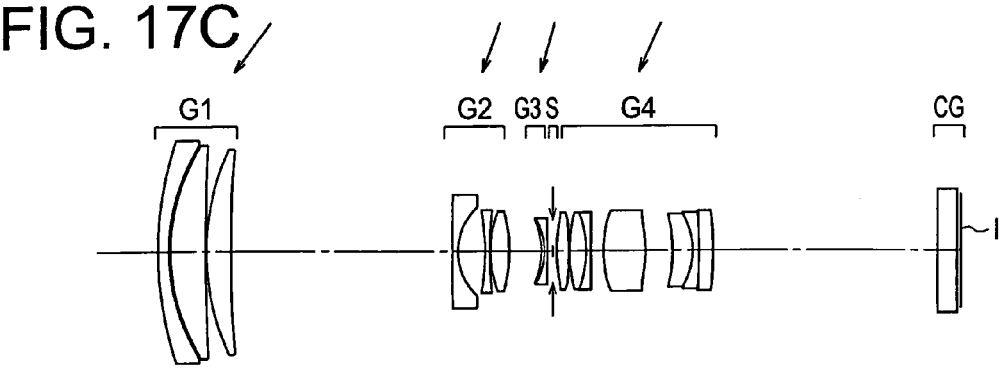

Next, an image forming optical system according to a ninth embodiment of the present invention will be described below. FIG. 17A, FIG. 17B, and FIG. 17C are cross-sectional views along an optical axis showing an optical arrangement at the time of infinite object point focusing of the image forming optical system according to the ninth embodiment of the present invention, where, FIG. 17A shows a state at a wide angle end, FIG. 17B shows an intermediate focal length state, and FIG. 17C shows a state at a telephoto end.

Figure 18A:
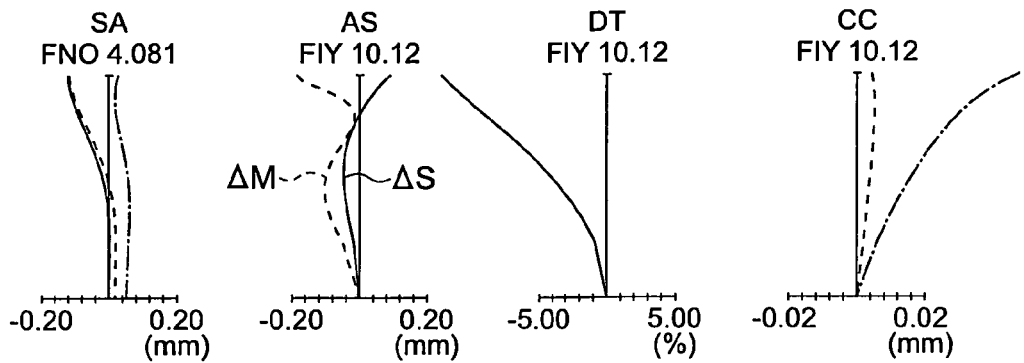
FIG. 18A, FIG. 18B, and FIG. 18C are diagrams showing a spherical aberration, an astigmatism, a distortion, and a chromatic aberration of magnification at the time of infinite object point focusing of the image forming optical system according to the ninth embodiment, where.
Figure 18B:
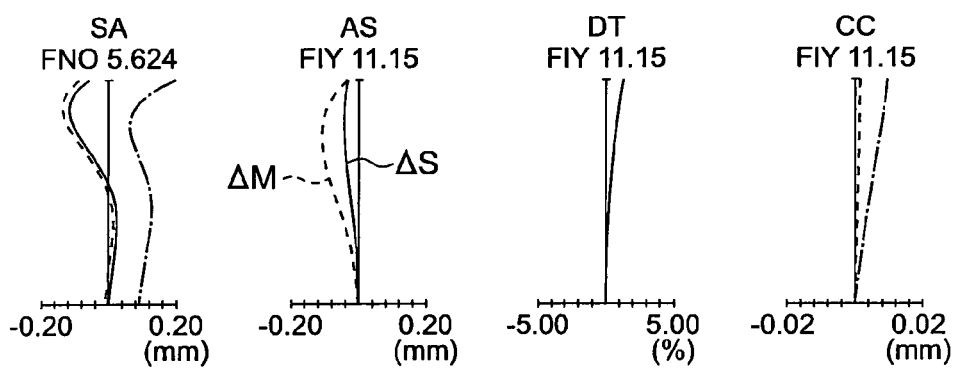
Figure 18C:
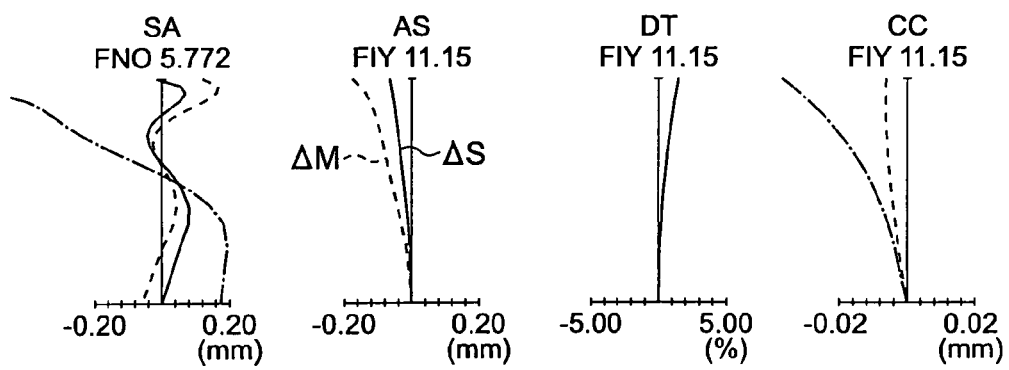

FIG. 18A, FIG. 18B, and FIG. 18C are diagrams showing a spherical aberration, an astigmatism, a distortion, and a chromatic aberration of magnification at the time of infinite object point focusing of the image forming optical system according to the ninth embodiment, where, FIG. 18A shows a state at the wide angle end, FIG. 18B shows an intermediate focal length state, and FIG. 18C shows a state at the telephoto end.

The image forming optical system according to the ninth embodiment, as shown in FIG. 17A, FIG. 17B, and FIG. 17C, includes in order from an object side, a first lens group G1 having a positive refractive power, a second lens group G2 having a negative refractive power, a third lens group G3 having a negative refractive power, an aperture stop S, and a fourth lens group G4 having a positive refractive power.

The first lens group G1 includes in order from the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, a cemented lens of a biconvex positive lens L10 and a biconcave negative lens L11, a biconvex positive lens L12, and a cemented lens of a positive meniscus lens L13 having a convex surface directed toward the image side, a negative meniscus lens L14 having a convex surface directed toward the image side, and a positive meniscus lens L15 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The aperture stop S moves toward the object side.

An aspheric surface is provided to seven surfaces namely, both surfaces of the biconcave negative lens L4 on the object side in the second lens group G2, a surface on the object side of the positive meniscus lens L7 in the third lens group G3, and both surfaces of the biconvex positive lens L9 nearest to the object side and both surfaces of the biconvex positive lens L12 nearest to the image side in the fourth lens group G4.

Figure 19A:
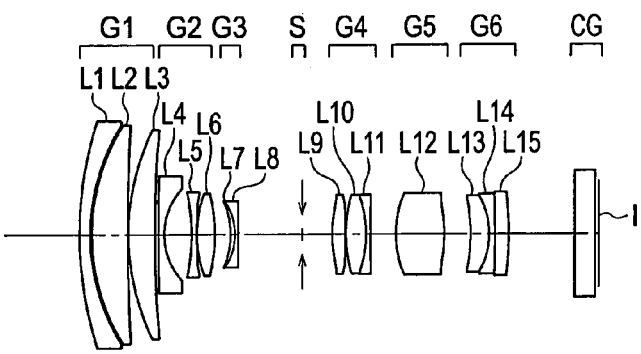
FIG. 19A, FIG. 19B, and FIG. 19C are cross-sectional views along an optical axis showing an optical arrangement at the time of infinite object point focusing of an image forming optical system according to a tenth embodiment of the present invention, where.
Figure 19B:
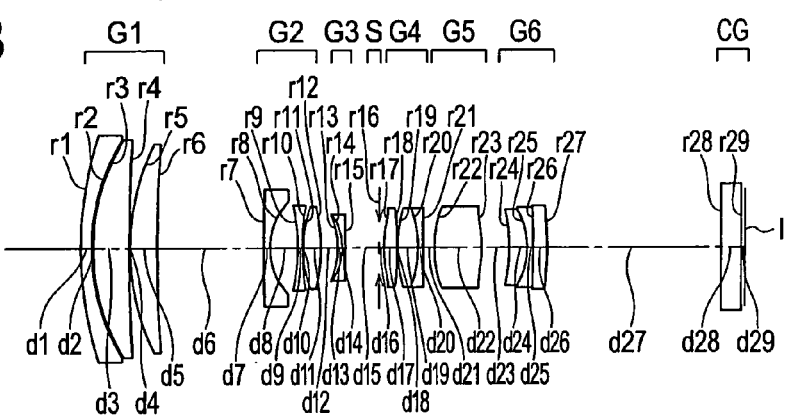
Figure 19C:
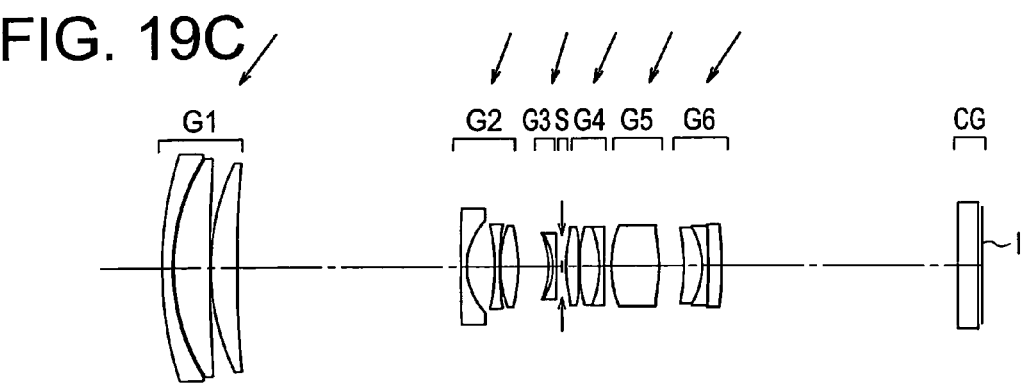

Next, an image forming optical system according to a tenth embodiment of the present invention will be described below. FIG. 19A, FIG. 19B, and FIG. 19C are cross-sectional views along an optical axis showing an optical arrangement at the time of infinite object point focusing of the image forming optical system according to the tenth embodiment of the present invention, where, FIG. 19A shows a state at a wide angle end, FIG. 19B shows an intermediate focal length state, and FIG. 19C shows a state at a telephoto end.

Figure 20A:
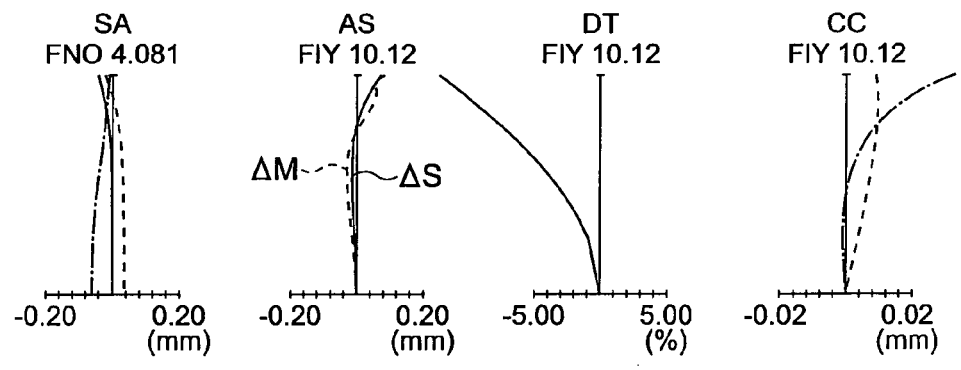
FIG. 20A, FIG. 20B, and FIG. 20C are diagrams showing a spherical aberration, an astigmatism, a distortion, and a chromatic aberration of magnification at the time of infinite object point focusing of the image forming optical system according to the tenth embodiment, where.
Figure 20B:
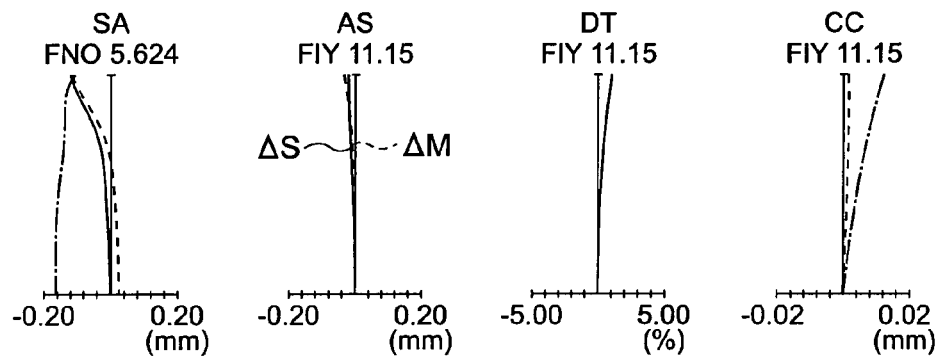
Figure 20C:
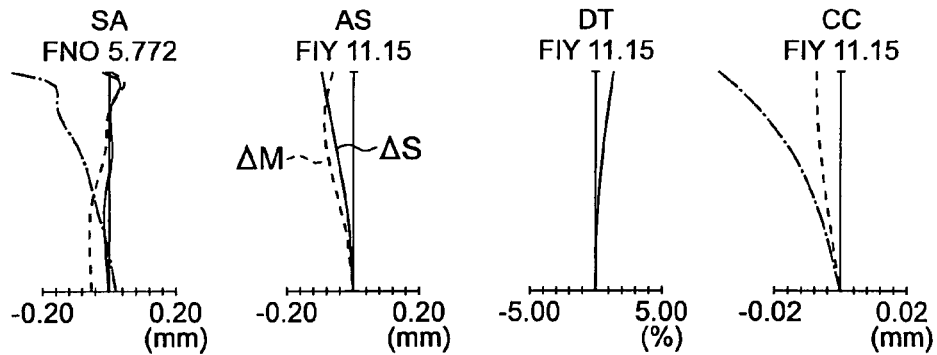

FIG. 20A, FIG. 20B, and FIG. 20C are diagrams showing a spherical aberration, an astigmatism, a distortion, and a chromatic aberration of magnification at the time of infinite object point focusing of the image forming optical system according to the tenth embodiment, where, FIG. 20A shows a state at the wide angle end, FIG. 20B shows an intermediate focal length state, and FIG. 20C shows a state at the telephoto end.

The image forming optical system according to the tenth embodiment, as shown in FIG. 19A, FIG. 19B, and FIG. 19C, includes in order from an object side, a first lens group G1 having a positive refractive power, a second lens group G2 having a negative refractive power, a third lens group G3 having a negative refractive power, an aperture stop, a fourth lens group G4 having a positive refractive power, a fifth lens group G5 having a positive refractive power, and a sixth lens group G6 having a negative refractive power.

The first lens group G1 includes in order form the object side, a negative meniscus lens L1 having a convex surface directed toward the object side, a positive meniscus lens L2 having a convex surface directed toward the object side, and a positive meniscus lens L3 having a convex surface directed toward the object side, and has a positive refractive power as a whole.

The second lens group G2 includes in order from the object side, a biconcave negative lens L4, a biconcave negative lens L5, and a biconvex positive lens L6, and has a negative refractive power as a whole.

The third lens group G3 includes a cemented lens of a positive meniscus lens L7 having a convex surface directed toward an image side and a negative meniscus lens L8 having a convex surface directed toward the image side, in order from the object side, and has a negative refractive power as a whole.

The fourth lens group G4 includes in order from the object side, a biconvex positive lens L9, and a cemented lens of a biconvex positive lens L10 and a biconcave negative lens L11, and has a positive refractive power as a whole.

The fifth lens group G5 includes a biconvex positive lens L12, and has a positive refractive power as a whole.

The sixth lens group G6 includes a cemented lens of a positive meniscus lens L13 having a convex surface directed toward the image side, a negative meniscus lens L14 having a convex surface directed toward the image side, and a positive meniscus lens L15 having a convex surface directed toward the image side, and has a negative refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the object side. The fifth lens group G5 moves toward the object side. The sixth lens group G6 moves toward the object side. The aperture stop S moves toward the object side.

An aspheric surface is provided to seven surfaces namely, both surfaces of the biconcave negative lens L4 on the object side in the second lens group G2, a surface on the object side of the positive meniscus lens L7 in the third lens group G3, both surfaces of the biconvex positive lens L9 on the object side in the fourth lens group G4, and both surfaces of the biconvex positive lens L12 in the fifth lens group G5.

The image forming optical systems in the abovementioned embodiments from the first embodiment to the tenth embodiment are all zooming optical systems. However, the present invention is not restricted to the zooming optical system, and is also applicable to a single focus optical system. The present invention, when applied to a zooming optical system in particular, gives highly desirable effect.

Numerical data of each embodiment described above is shown below. Each of r1, r2, . . . denotes radius of curvature of each lens surface, each of d1, d2, . . . denotes lens thickness or an air distance between two lenses, each of nd1, nd2, . . . denotes a refractive index of each lens for a d-line, each of vd1, vd2, . . . denotes an Abbe's number for each lens, $F_{NO}$ denotes an F number, f denotes a focal length of the entire zoom lens system, and D0 denotes a distance from the object to the first surface of the lens system.

When z is let to be in an optical axis direction, y is let to be in a direction orthogonal to the optical axis, K denotes aconical coefficient, A4, A6, A8, and A10 denote aspherical surface coefficients, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}+A_{12}y^{12} \quad (I)$$

where e indicates '$10^{-n}$'. These reference signs are common in numeral data of after-mentioned each embodiment.

Example 1

Unit mm
Surface data

| Surface no. | r | d | nd | vd | effective radius |
|---|---|---|---|---|---|
| Object plane | ∞ | ∞ | | | |
| 1 | 74.6204 | 2.1000 | 1.80000 | 29.84 | 22.000 |
| 2 | 41.7491 | 0.3000 | | | 21.055 |
| 3 | 41.5162 | 6.6415 | 1.49700 | 81.54 | 21.081 |
| 4 | 357.8580 | 0.1500 | | | 20.868 |
| 5 | 48.9188 | 4.9283 | 1.61800 | 63.33 | 20.200 |
| 6 | 288.9110 | Variable | | | 19.913 |
| 7* | −687.6047 | 1.2000 | 1.80610 | 40.73 | 11.056 |
| 8* | 13.9780 | 5.4900 | | | 8.685 |
| 9 | −38.2514 | 0.9000 | 1.80610 | 40.92 | 7.950 |
| 10 | 50.4870 | 0.1500 | | | 7.669 |
| 11 | 25.2338 | 3.4509 | 1.80518 | 25.42 | 7.600 |
| 12 | −34.3682 | Variable | | | 7.379 |
| 13* | −16.9874 | 0.9108 | 1.63387 | 23.38 | 6.069 |
| 14 | −11.6414 | 0.8640 | 1.69680 | 55.53 | 6.028 |
| 15 | −1425.5553 | Variable | | | 6.107 |
| 16(stop) | ∞ | 5.9791 | | | (Variable) |
| 17* | 24.0151 | 2.5198 | 1.58913 | 61.25 | 6.990 |
| 18* | −327.8187 | 0.1500 | | | 7.300 |
| 19 | 29.8587 | 4.0523 | 1.61800 | 63.33 | 7.322 |
| 20 | −22.7427 | 0.9000 | 1.90366 | 31.32 | 7.308 |
| 21 | 422.9147 | Variable | | | 7.405 |
| 22* | 23.8537 | 9.0733 | 1.49700 | 81.61 | 7.698 |
| 23* | −25.9203 | 5.3800 | | | 7.100 |
| 24 | −34.4275 | 3.7999 | 1.53172 | 48.84 | 6.894 |
| 25 | −15.9013 | 1.2000 | 1.88300 | 40.76 | 7.025 |
| 26 | −144.2313 | 2.9352 | 1.69895 | 30.13 | 7.360 |
| 27 | −81.4366 | Variable | | | 7.732 |
| 28 | ∞ | 4.0000 | 1.51633 | 64.14 | 12.000 |
| 29 | ∞ | 0.7450 | | | 12.000 |
| Image plane (Light receiving surface) | ∞ | | | | |

Aspherical surface data

7th surface k = 3235.153, A4 = 1.84275e−05, A6 = −1.54575e−07,
A8 = 5.69972e−10

8th surface k = −0.635, A4 = 3.66362e−05, A6 = 3.64581e−08,
A8 = −1.24416e−09

13th surface k = 0.000, A4 = 3.93878e−06

17th surface k = −0.916, A4 = 4.59734e−06, A6 = −3.83798e−07,
A8 = 8.50881e−09, A10 = −1.29452e−10

18th surface k = −9.237, A4 = 1.13787e−05, A6 = −3.88271e−07,
A8 = 8.80566e−09, A10 = −1.34973e−10

22nd surface k = 3.131, A4 = −3.46075e−06, A6 = 2.00582e−07,
A8 = 1.72429e−09, A10 = −1.34137e−11

23rd surface k = −0.832, A4 = 9.49678e−05, A6 = 4.91843e−07,
A8 = 1.81060e−09, A10 = 5.03223e−11

Various data
Zoom ratio 10.219

|  | Wide angle | Intermediate | Telephoto |
|---|---|---|---|
| Focal length | 14.332 | 46.261 | 146.459 |
| Fno. | 4.081 | 5.624 | 5.772 |
| Angle of field 2ω | 80.000 | 26.941 | 8.584 |
| Image height | 11.150 | 11.150 | 11.150 |
| Back focus | 16.123 | 37.408 | 49.081 |
| Lens total length | 100.361 | 128.830 | 159.642 |
| Object distance | ∞ | ∞ | ∞ |
| d6 | 0.600 | 21.258 | 44.066 |
| d12 | 3.213 | 3.013 | 5.931 |
| d15 | 12.313 | 6.895 | 1.174 |
| d21 | 5.036 | 2.189 | 1.494 |
| d27 | 12.740 | 34.025 | 45.699 |
| Radius of aperture stop | 4.042 | 5.319 | 6.330 |
| Entrance pupil position | 24.451 | 70.633 | 231.228 |
| Exit pupil position | −30.271 | −20.193 | −19.399 |
| Front side principal point position | 34.355 | 79.741 | 64.457 |
| Back side principal point position | −13.587 | −45.516 | −145.714 |

| Lens | Initial surface | Focal length |
|---|---|---|
| L1 | 1 | −121.929 |
| L2 | 3 | 93.842 |
| L3 | 5 | 94.550 |
| L4 | 7 | −16.982 |
| L5 | 9 | −26.876 |
| L6 | 11 | 18.550 |
| L7 | 13 | 54.740 |
| L8 | 14 | −16.849 |

Zoom lens group data

| Group | Initial surface | Focal length | group structure length | Front side principal point position | Back side principal point position |
|---|---|---|---|---|---|
| G1 | 1 | 79.319 | 14.120 | 3.552 | −5.635 |
| G2 | 7 | −34.284 | 11.191 | −5.453 | −17.377 |
| G3 | 13 | −23.628 | 1.775 | 0.059 | −1.007 |
| G4 | 16 | 29.644 | 7.622 | −0.686 | −5.188 |
| G5 | 22 | 51.217 | 22.388 | −9.570 | −22.031 |

Group magnification

|  | Wide angle | Intermediate | Telephoto |
|---|---|---|---|
| G1 | 0.000 | 0.000 | 0.000 |
| G2 | −0.775 | −1.453 | −43.484 |
| G3 | 0.225 | 0.184 | 0.015 |
| G4 | −4.068 | 13.564 | 7.273 |
| G5 | 0.255 | −0.161 | −0.388 |

Example 2

Unit mm

Surface data

| Surface no. | r | d | nd | vd | effective radius |
|---|---|---|---|---|---|
| Object plane | ∞ | ∞ |  |  |  |
| 1 | 82.3897 | 2.1000 | 1.80000 | 29.84 | 22.000 |
| 2 | 44.3575 | 0.3000 |  |  | 21.154 |
| 3 | 44.0796 | 7.0885 | 1.49700 | 81.54 | 21.184 |
| 4 | 882.6874 | 0.1500 |  |  | 20.947 |
| 5 | 47.7796 | 5.0286 | 1.61800 | 63.33 | 20.200 |
| 6 | 224.4121 | Variable |  |  | 19.862 |
| 7* | −685.7007 | 1.2000 | 1.80610 | 40.73 | 11.119 |
| 8* | 14.3941 | 5.4900 |  |  | 8.730 |
| 9 | −35.6461 | 0.9000 | 1.80610 | 40.92 | 7.957 |
| 10 | 56.7029 | 0.1500 |  |  | 7.674 |
| 11 | 28.1342 | 3.3187 | 1.80518 | 25.42 | 7.600 |
| 12 | −30.4471 | Variable |  |  | 7.406 |
| 13* | −16.5668 | 1.0178 | 1.63387 | 23.38 | 6.254 |
| 14 | −11.4759 | 0.9588 | 1.69680 | 55.53 | 6.205 |
| 15 | −468.0874 | Variable |  |  | 6.115 |
| 16(stop) | ∞ | 5.7327 |  | (Variable) |  |
| 17* | 21.0015 | 2.0097 | 1.58913 | 61.25 | 6.859 |
| 18* | −132.0931 | 0.1500 |  |  | 7.300 |
| 19 | 30.6052 | 4.5398 | 1.61800 | 63.33 | 7.078 |
| 20 | −26.7347 | 0.9000 | 1.90366 | 31.32 | 7.033 |
| 21 | 69.6493 | Variable |  |  | 7.093 |
| 22* | 22.6589 | 9.0605 | 1.49700 | 81.61 | 7.446 |
| 23* | −29.0955 | 5.3800 |  |  | 7.100 |
| 24 | −39.6822 | 3.6041 | 1.53172 | 48.84 | 7.104 |
| 25 | −20.7670 | 1.2000 | 1.88300 | 40.76 | 7.289 |
| 26 | −93.0030 | 2.8648 | 1.69895 | 30.13 | 7.555 |
| 27 | −90.7097 | Variable |  |  | 7.907 |
| 28 | ∞ | 4.0000 | 1.51633 | 64.14 | 12.000 |
| 29 | ∞ | 0.7450 |  |  | 12.000 |
| Image plane (Light receiving surface) | ∞ |  |  |  |  |

Aspherical surface data

7th surface k = 3235.296, A4 = 1.29998e−05, A6 = −4.33275e−08,
A8 = 2.70798e−10

8th surface k = −0.632, A4 = 2.42753e−05, A6 = 4.25746e−08, A8 = 7.73020e−10

13th surface k = 0.000, A4 = 3.12761e−06

17th surface k = −0.906, A4 = −1.89094e−07, A6 = −4.47423e−07,
A8 = 2.05060e−08, A10 = −2.80321e−10

18th surface k = −9.232, A4 = −1.79345e−06, A6 = −4.02420e−07,
A8 = 2.09141e−08, A10 = −2.97477e−10

22nd surface k = 3.173, A4 = −2.61272e−05, A6 = 3.69490e−07, A8 = −9.66544e−10,
A10 = −1.63856e−11

23rd surface k = −0.846, A4 = 9.50088e−05, A6 = 4.79662e−07, A8 = 5.02353e−09,
A10 = 3.53529e−12

Various data
Zoom ratio 10.271

|  | Wide angle | Intermediate | Telephoto |
|---|---|---|---|
| Focal length | 14.366 | 45.847 | 147.554 |
| Fno. | 4.081 | 5.624 | 5.772 |
| Angle of field 2ω | 78.509 | 27.124 | 8.531 |
| Image height | 11.150 | 11.150 | 11.150 |
| Back focus | 16.285 | 37.243 | 49.327 |
| Lens total length | 100.361 | 128.831 | 159.638 |
| Object distance | ∞ | ∞ | ∞ |
| d6 | 0.600 | 21.147 | 43.998 |
| d12 | 2.825 | 3.219 | 6.234 |
| d15 | 12.781 | 6.808 | 0.794 |
| d21 | 4.727 | 2.287 | 1.399 |

-continued

Unit mm

|  |  |  |  |
|---|---|---|---|
| d27 | 12.902 | 33.860 | 45.944 |
| Radius of aperture stop | 4.038 | 5.224 | 6.266 |
| Entrance pupil position | 24.875 | 70.951 | 230.176 |
| Exit pupil position | −32.234 | −21.395 | −20.196 |
| Front side principal point position | 34.987 | 80.952 | 64.565 |
| Back side principal point position | −13.621 | −45.102 | −146.809 |

| Lens | Initial surface | Focal length |
|---|---|---|
| L1 | 1 | −123.137 |
| L2 | 3 | 93.092 |
| L3 | 5 | 97.170 |
| L4 | 7 | −17.476 |
| L5 | 9 | −27.034 |
| L6 | 11 | 18.631 |
| L7 | 13 | 54.675 |
| L8 | 14 | −16.898 |

Zoom lens group data

| Group | Initial surface | Focal length | group structure length | Front side principal point position | Back side principal point position |
|---|---|---|---|---|---|
| G1 | 1 | 79.540 | 14.667 | 3.905 | −5.628 |
| G2 | 7 | −36.573 | 11.059 | −6.058 | −18.186 |
| G3 | 13 | −23.633 | 1.977 | 0.039 | −1.149 |
| G4 | 16 | 30.558 | 7.599 | −2.126 | −6.289 |
| G5 | 22 | 43.373 | 22.109 | −4.979 | −19.023 |

Group magnification

| | Wide angle | Intermediate | Telephoto |
|---|---|---|---|
| G1 | 0.000 | 0.000 | 0.000 |
| G2 | −0.855 | −1.644 | 60.746 |
| G3 | 0.210 | 0.167 | −0.011 |
| G4 | −5.411 | 7.076 | 4.795 |
| G5 | 0.186 | −0.297 | −0.576 |

Example 3

Unit mm

Surface data

| Surface no. | r | d | nd | vd | effective radius |
|---|---|---|---|---|---|
| Object plane | ∞ | ∞ | | | |
| 1 | 73.2639 | 2.1000 | 1.80000 | 29.84 | 22.000 |
| 2 | 41.2944 | 6.4532 | 1.49700 | 81.54 | 21.045 |
| 3 | 296.9163 | 0.1500 | | | 20.857 |
| 4 | 46.7013 | 5.2826 | 1.61800 | 63.33 | 20.200 |
| 5 | 266.4079 | Variable | | | 19.865 |
| 6* | 4838.2155 | 1.2000 | 1.80610 | 40.73 | 11.031 |
| 7* | 13.1344 | 5.4900 | | | 8.570 |
| 8 | −39.1369 | 0.9000 | 1.80610 | 40.92 | 7.940 |
| 9 | 49.4738 | 0.1500 | | | 7.666 |
| 10 | 24.7428 | 3.4696 | 1.80518 | 25.42 | 7.600 |
| 11 | −34.8680 | Variable | | | 7.378 |
| 12* | −16.8921 | 0.8678 | 1.63387 | 23.38 | 6.040 |
| 13 | −11.6019 | 0.7543 | 1.69680 | 55.53 | 6.004 |
| 14 | −990.2231 | Variable | | | 6.098 |
| 15(stop) | ∞ | 5.6292 | | | (Variable) |
| 16* | 24.0601 | 2.5783 | 1.58913 | 61.25 | 6.907 |
| 17* | −356.0431 | 0.1500 | | | 7.300 |
| 18 | 30.1941 | 4.1848 | 1.61800 | 63.33 | 7.367 |
| 19 | −22.8766 | 0.9000 | 1.90366 | 31.32 | 7.345 |
| 20* | 397.4948 | Variable | | | 7.435 |
| 21* | 23.2483 | 9.4400 | 1.49700 | 81.61 | 7.712 |
| 22* | −26.7076 | 5.3800 | | | 7.100 |
| 23 | −36.6080 | 4.0195 | 1.53172 | 48.84 | 6.933 |
| 24 | −16.1292 | 1.2000 | 1.88300 | 40.76 | 7.074 |
| 25 | −143.5063 | 2.4285 | 1.69895 | 30.13 | 7.408 |
| 26 | −81.5548 | Variable | | | 7.711 |
| 27 | ∞ | 4.0000 | 1.51633 | 64.14 | 12.000 |
| 28 | ∞ | 0.7450 | | | 12.000 |
| Image plane (Light receiving surface) | ∞ | | | | |

Aspherical surface data

6th surface k = 75074.254, A4 = 4.90169e−05, A6 = −5.79896e−07,
A8 = 3.24726e−09, A10 = −7.40253e−12

7th surface k = −0.625, A4 = 7.80556e−05, A6 = −3.33202e−07, A8 = −5.05024e−11

12th surface k = 0.000, A4 = 6.17235e−06

16th surface k = −0.779, A4 = −1.24534e−05, A6 = −2.26222e−06,
A8 = 4.31183e−08, A10 = −6.02542e−10

18th surface k = −99.124, A4 = −1.08635e−05, A6 = −2.08419e−06,
A8 = 3.39056e−08, A10 = −4.73623e−10

21st surface k = 1.929, A4 = −4.12169e−06, A6 = 2.28614e−07, A8 = −1.16894e−10,
A10 = 1.20047e−11

22nd surface k = −0.715, A4 = 9.53346e−05, A6 = 5.87390e−07, A8 = −1.69336e−09,
A10 = 6.79074e−11

Various data
Zoom ratio 10.343

| | Wide angle | Intermediate | Telephoto |
|---|---|---|---|
| Focal length | 14.200 | 46.132 | 146.868 |
| Fno. | 4.081 | 5.624 | 5.772 |
| Angle of field 2ω | 77.677 | 26.890 | 8.556 |
| Image height | 11.150 | 11.150 | 11.150 |
| Back focus | 16.309 | 37.454 | 49.776 |
| Lens total length | 100.365 | 128.826 | 159.642 |
| Object distance | ∞ | ∞ | ∞ |
| d5 | 0.600 | 21.256 | 43.361 |
| d11 | 3.279 | 2.862 | 5.858 |
| d14 | 12.542 | 6.568 | 1.206 |
| d20 | 4.907 | 2.237 | 1.492 |
| d26 | 12.926 | 34.071 | 46.393 |
| Radius of aperture stop | 4.068 | 5.212 | 6.331 |
| Entrance pupil position | 24.351 | 71.286 | 231.955 |
| Exit pupil position | −29.922 | −20.815 | −19.625 |
| Front side principal point position | 34.189 | 80.895 | 68.014 |
| Back side principal point position | −13.455 | −45.387 | −146.123 |

| Lens | Initial surface | Focal length |
|---|---|---|
| L1 | 1 | −121.849 |
| L2 | 2 | 95.708 |
| L3 | 4 | 90.798 |
| L4 | 6 | −16.340 |
| L5 | 8 | −26.985 |
| L6 | 10 | 18.454 |
| L7 | 12 | 54.947 |
| L8 | 13 | −16.853 |

-continued

Unit mm

Zoom lens group data

| Group | Initial surface | Focal length | group structure length | Front side principal point position | Back side principal point position |
|---|---|---|---|---|---|
| G1 | 1 | 78.369 | 13.986 | 2.893 | −6.077 |
| G2 | 6 | −32.707 | 11.210 | −5.207 | −17.110 |
| G3 | 12 | −23.626 | 1.622 | 0.052 | −0.923 |
| G4 | 15 | 30.018 | 7.813 | −0.750 | −5.353 |
| G5 | 21 | 48.754 | 22.468 | −8.924 | −21.526 |

Group magnification

| | Wide angle | Intermediate | Telephoto |
|---|---|---|---|
| G1 | 0.000 | 0.000 | 0.000 |
| G2 | −0.740 | −1.390 | −22.846 |
| G3 | 0.234 | 0.194 | 0.029 |
| G4 | −4.672 | 10.412 | 6.205 |
| G5 | 0.224 | −0.210 | −0.462 |

Example 4

Unit mm

Surface data

| Surface no. | r | d | nd | vd | effective radius |
|---|---|---|---|---|---|
| Object plane | ∞ | ∞ | | | |
| 1 | 73.2593 | 2.1000 | 1.80000 | 29.84 | 22.000 |
| 2 | 41.7732 | 0.3000 | | | 21.060 |
| 3 | 41.5394 | 6.3206 | 1.49700 | 81.54 | 21.085 |
| 4 | 367.6522 | 0.1500 | | | 20.916 |
| 5 | 49.0114 | 5.9170 | 1.61800 | 63.33 | 20.200 |
| 6 | 255.3981 | Variable | | | 19.661 |
| 7* | −712.1362 | 1.2000 | 1.80610 | 40.73 | 11.023 |
| 8* | 12.8567 | 5.4900 | | | 8.540 |
| 9 | −42.6572 | 0.9000 | 1.80610 | 40.92 | 7.922 |
| 10 | 52.6420 | 0.1500 | | | 7.670 |
| 11 | 24.5855 | 3.5412 | 1.80518 | 25.42 | 7.600 |
| 12 | −34.6051 | Variable | | | 7.367 |
| 13* | −16.8682 | 0.8282 | 1.63387 | 23.38 | 6.028 |
| 14 | −11.7928 | 0.4828 | 1.69680 | 55.53 | 5.993 |
| 15 | −1039.5859 | Variable | | | 6.086 |
| 16(stop) | ∞ | 5.9948 | | | (Variable) |
| 17* | 23.6715 | 2.5462 | 1.58913 | 61.25 | 6.919 |
| 18* | −345.0074 | 0.1500 | | | 7.300 |
| 19 | 29.8228 | 3.7398 | 1.61800 | 63.33 | 7.310 |
| 20 | −21.7204 | 0.9000 | 1.90366 | 31.32 | 7.289 |
| 21 | 426.0030 | Variable | | | 7.382 |
| 22* | 23.6775 | 9.1857 | 1.49700 | 81.61 | 7.655 |
| 23* | −26.2454 | 5.3800 | | | 7.100 |
| 24* | −35.2548 | 4.2102 | 1.53172 | 48.84 | 6.882 |
| 25 | −15.9375 | 1.2000 | 1.88300 | 40.76 | 7.044 |
| 26 | −142.0182 | 2.4001 | 1.69895 | 30.13 | 7.388 |
| 27 | −76.7288 | Variable | | | 7.693 |
| 28 | ∞ | 4.0000 | 1.51633 | 64.14 | 12.000 |
| 29 | ∞ | 0.7450 | | | 12.000 |
| Image plane (Light receiving surface) | ∞ | | | | |

Aspherical surface data

6th surface k = 3503.619, A4 = 2.22237e−05, A6 = −1.48836e−07,
A8 = 5.28660e−10

8th surface k = −0.703, A4 = 4.66030e−05, A6 = 4.22907e−08, A8 = −3.86806e−10

13th surface k = 0.000, A4 = 5.20241e−06

17th surface k = −1.778, A4 = 2.59794e−06, A6 = −1.28560e−06, A8 = 2.15979e−08,
A10 = −3.30605e−10

18th surface k = 2.121, A4 = −2.78535e−06, A6 = −1.28323e−06, A8 = 1.82728e−08,
A10 = −2.87151e−10

22nd surface k = 2.674, A4 = −5.45062e−07, A6 = 5.23355e−08, A8 = 9.02022e−11,
A10 = 5.93812e−12

23rd surface k = −0.781, A4 = 1.04515e−04, A6 = 2.02837e−07, A8 = 1.85174e−09,
A10 = 2.16516e−11

24th surface k = 0.000, A4 = 2.92421e−06, A6 = −2.71302e−07

Various data
Zoom ratio 10.350

| | Wide angle | Intermediate | Telephoto |
|---|---|---|---|
| Focal length | 14.207 | 46.091 | 147.039 |
| Fno. | 4.081 | 5.624 | 5.772 |
| Angle of field 2ω | 77.684 | 26.892 | 8.547 |
| Image height | 11.150 | 11.150 | 11.150 |
| Back focus | 16.138 | 37.410 | 49.233 |
| Lens total length | 100.368 | 128.827 | 159.641 |
| Object distance | ∞ | ∞ | ∞ |
| d6 | 0.600 | 21.159 | 43.868 |
| d12 | 3.260 | 3.185 | 5.982 |
| d15 | 12.323 | 6.829 | 1.149 |
| d21 | 4.960 | 2.161 | 1.518 |
| d27 | 12.756 | 34.027 | 45.850 |
| Radius of aperture stop | 4.002 | 5.279 | 6.305 |
| Entrance pupil position | 24.849 | 71.695 | 234.443 |
| Exit pupil position | −30.327 | −20.120 | −19.344 |
| Front side principal point position | 34.712 | 80.859 | 66.208 |
| Back side principal point position | −13.462 | −45.346 | −146.294 |

| Lens | Initial surface | Focal length |
|---|---|---|
| L1 | 1 | −125.204 |
| L2 | 3 | 93.624 |
| L3 | 5 | 97.077 |
| L4 | 7 | −15.655 |
| L5 | 9 | −29.109 |
| L6 | 11 | 18.341 |
| L7 | 13 | 58.151 |
| L8 | 14 | −17.122 |

Zoom lens group data

| Group | Initial surface | Focal length | group structure length | Front side principal point position | Back side principal point position |
|---|---|---|---|---|---|
| G1 | 1 | 79.469 | 14.788 | 3.102 | −6.449 |
| G2 | 7 | −34.824 | 11.281 | −6.234 | −18.777 |
| G3 | 13 | −23.627 | 1.311 | 0.051 | −0.739 |

-continued

Unit mm

| | | | | | |
|---|---|---|---|---|---|
| G4 | 16 | 29.932 | 7.336 | −0.678 | −5.017 |
| G5 | 22 | 49.536 | 22.376 | −9.025 | −21.605 |

Group magnification

| | Wide angle | Intermediate | Telephoto |
|---|---|---|---|
| G1 | 0.000 | 0.000 | 0.000 |
| G2 | −0.795 | −1.496 | −61.939 |
| G3 | 0.218 | 0.178 | 0.011 |
| G4 | −4.329 | 11.365 | 6.587 |
| G5 | 0.238 | −0.191 | −0.430 |

Example 5

Unit mm

Surface data

| Surface no. | r | d | nd | vd | effective radius |
|---|---|---|---|---|---|
| Object plane | ∞ | ∞ | | | |
| 1 | 73.3366 | 2.1000 | 1.80000 | 29.84 | 22.000 |
| 2 | 41.8069 | 0.3000 | | | 21.061 |
| 3 | 41.5406 | 6.3243 | 1.49700 | 81.54 | 21.086 |
| 4 | 383.8002 | 0.1500 | | | 20.920 |
| 5 | 49.1466 | 5.8080 | 1.61800 | 63.33 | 20.200 |
| 6 | 254.2510 | Variable | | | 19.681 |
| 7* | −700.7803 | 1.2000 | 1.80610 | 40.73 | 11.017 |
| 8* | 12.8607 | 5.4900 | | | 8.548 |
| 9 | −42.5744 | 0.9000 | 1.80610 | 40.92 | 7.920 |
| 10 | 53.5012 | 0.1500 | | | 7.671 |
| 11 | 24.7181 | 3.4835 | 1.80518 | 25.42 | 7.600 |
| 12 | −34.4999 | Variable | | | 7.377 |
| 13* | −16.9000 | 0.8110 | 1.63387 | 23.38 | 5.996 |
| 14 | −11.7885 | 0.4985 | 1.69680 | 55.53 | 5.961 |
| 15 | −1152.3238 | Variable | | | 6.079 |
| 16(stop) | ∞ | 6.1447 | | | (Variable) |
| 17* | 23.6438 | 2.5344 | 1.58913 | 61.25 | 6.919 |
| 18* | −348.4591 | 0.1500 | | | 7.300 |
| 19 | 29.8830 | 3.7125 | 1.61800 | 63.33 | 7.310 |
| 20 | −21.6873 | 0.9000 | 1.90366 | 31.32 | 7.291 |
| 21 | 392.8662 | Variable | | | 7.388 |
| 22* | 23.6570 | 9.3089 | 1.49700 | 81.61 | 7.675 |
| 23* | −25.9667 | 5.3800 | | | 7.100 |
| 24 | −35.9883 | 3.9867 | 1.53172 | 48.84 | 6.922 |
| 25 | −15.9710 | 1.2000 | 1.88300 | 40.76 | 7.061 |
| 26 | −191.6172 | 2.6864 | 1.69895 | 30.13 | 7.405 |
| 27* | −77.0742 | Variable | | | 7.737 |
| 28 | ∞ | 4.0000 | 1.51633 | 64.14 | 12.000 |
| 29 | ∞ | 0.7450 | | | 12.000 |
| Image plane (Light receiving surface) | ∞ | | | | |

Aspherical surface data

7th surface k = 3309.998, A4 = 1.55574e−05, A6 = −1.02019e−07,
A8 = 4.01846e−10
8th surface k = −0.770, A4 = 4.30227e−05, A6 = 4.73960e−08,
A8 = −1.33928e−10
13th surface k = 0.000, A4 = 5.08661e−06

17th surface k = −1.781, A4 = 2.41364e−06, A6 = −1.16990e−06,
A8 = 2.06488e−08, A10 = −3.47989e−10
18th surface k = 658.555, A4 = −1.02181e−06, A6 = −1.08461e−06,
A8 = 1.67956e−08, A10 = −3.03913e−10
22nd surface k = 2.803, A4 = 7.30987e−10, A6 = 2.25867e−07, A8 = 2.15579e−11,
A10 = −1.13078e−12
23rd surface k = −0.800, A4 = 1.07110e−04, A6 = 4.45392e−07, A8 = 3.34020e−09,
A10 = 2.53116e−11
27th surface k = 0.000, A4 = −3.54324e−06, A6 = 3.40959e−08

Various data
Zoom ratio 10.337

| | Wide angle | Intermediate | Telephoto |
|---|---|---|---|
| Focal length | 14.228 | 46.128 | 147.079 |
| Fno. | 4.081 | 5.624 | 5.772 |
| Angle of field 2ω | 78.140 | 26.911 | 8.552 |
| Image height | 11.150 | 11.150 | 11.150 |
| Back focus | 16.205 | 37.312 | 49.184 |
| Lens total length | 100.365 | 128.827 | 159.640 |
| Object distance | ∞ | ∞ | ∞ |
| d6 | 0.600 | 21.296 | 43.887 |
| d12 | 3.321 | 3.136 | 6.038 |
| d15 | 12.192 | 6.797 | 1.147 |
| d21 | 4.828 | 2.143 | 1.509 |
| d27 | 12.822 | 33.929 | 45.801 |
| Radius of aperture stop | 3.990 | 5.254 | 6.297 |
| Entrance pupil position | 24.746 | 71.891 | 234.436 |
| Exit pupil position | −30.693 | −20.335 | −19.488 |
| Front side principal point position | 34.658 | 81.109 | 66.507 |
| Back side principal point position | −13.483 | −45.383 | −146.334 |

| Lens | Initial surface | Focal length |
|---|---|---|
| L1 | 1 | −125.259 |
| L2 | 3 | 93.156 |
| L3 | 5 | 97.526 |
| L4 | 7 | −15.655 |
| L5 | 9 | −29.289 |
| L6 | 11 | 18.367 |
| L7 | 13 | 57.923 |
| L8 | 14 | −17.096 |

Zoom lens group data

| Group | Initial surface | Focal length | group structure length | Front side principal point position | Back side principal point position |
|---|---|---|---|---|---|
| G1 | 1 | 79.391 | 14.682 | 3.116 | −6.372 |
| G2 | 7 | −34.951 | 11.223 | −6.260 | −18.770 |
| G3 | 13 | −23.629 | 1.310 | 0.051 | −0.738 |
| G4 | 16 | 30.117 | 7.297 | −0.706 | −5.017 |
| G5 | 22 | 49.093 | 22.562 | −8.779 | −21.556 |

Group magnification

| | Wide angle | Intermediate | Telephoto |
|---|---|---|---|
| G1 | 0.000 | 0.000 | 0.000 |
| G2 | −0.799 | −1.517 | −79.291 |
| G3 | 0.217 | 0.177 | 0.008 |

-continued

Unit mm

| | | | |
|---|---|---|---|
| G4 | −4.467 | 10.871 | 6.402 |
| G5 | 0.231 | −0.199 | −0.441 |

Example 6

Unit mm
Surface data

| Surface no. | r | d | nd | vd | effective radius |
|---|---|---|---|---|---|
| Object plane | ∞ | ∞ | | | |
| 1 | 72.8298 | 2.1000 | 1.80000 | 29.84 | 22.000 |
| 2 | 41.6724 | 0.3000 | | | 21.049 |
| 3 | 41.4242 | 6.0222 | 1.49700 | 81.54 | 21.073 |
| 4 | 357.8105 | 0.1500 | | | 20.943 |
| 5 | 49.0698 | 5.8669 | 1.61800 | 63.33 | 20.200 |
| 6 | 255.1984 | Variable | | | 19.671 |
| 7* | −687.9791 | 1.2000 | 1.80610 | 40.73 | 11.067 |
| 8* | 13.0915 | 5.4900 | | | 8.587 |
| 9 | −41.8724 | 0.9000 | 1.80610 | 40.92 | 7.938 |
| 10 | 52.3232 | 0.1500 | | | 7.674 |
| 11 | 24.7148 | 3.4240 | 1.80518 | 25.42 | 7.600 |
| 12 | −34.7274 | Variable | | | 7.381 |
| 13* | −16.8851 | 0.8612 | 1.63387 | 23.38 | 6.078 |
| 14 | −11.6934 | 0.7499 | 1.69680 | 55.53 | 6.041 |
| 15 | −1031.1238 | Variable | | | 6.105 |
| 16(stop) | ∞ | 6.1927 | | (Variable) | |
| 17* | 23.6085 | 2.5330 | 1.58913 | 61.25 | 6.952 |
| 18* | −368.9345 | 0.1500 | | | 7.300 |
| 19 | 29.7700 | 3.6178 | 1.61800 | 63.33 | 7.329 |
| 20 | −21.8683 | 0.9000 | 1.90366 | 31.32 | 7.309 |
| 21 | 416.6196 | Variable | | | 7.401 |
| 22* | 23.6824 | 9.0649 | 1.49700 | 81.61 | 7.670 |
| 23* | −26.1603 | 5.3800 | | | 7.100 |
| 24* | −34.7411 | 3.9622 | 1.53172 | 48.84 | 6.861 |
| 25* | −15.7371 | 1.2000 | 1.88300 | 40.76 | 7.006 |
| 26 | −151.7533 | 3.1463 | 1.69895 | 30.13 | 7.351 |
| 27 | −75.5582 | Variable | | | 7.754 |
| 28 | ∞ | 4.0000 | 1.51633 | 64.14 | 12.000 |
| 29 | ∞ | 0.7450 | | | 12.000 |
| Image plane (Light receiving surface) | ∞ | | | | |

Aspherical surface data

7th surface k = 3194.054, A4 = 2.00900e−05, A6 = −1.35328e−07,
A8 = 4.88771e−10
8th surface k = −0.740, A4 = 4.53722e−05, A6 = 4.58905e−08,
A8 = −4.75492e−10
13th surface k = 0.000, A4 = 4.59445e−06
17th surface k = −1.710, A4 = 3.08157e−06, A6 = −1.09994e−06, A8 = 2.00617e−08,
A10 = −3.16199e−10
18th surface k = 32.506, A4 = −1.49099e−06, A6 = −1.08239e−06,
A8 = 1.71551e−08, A10 = −2.81766e−10

-continued

Unit mm

22nd surface k = 2.753, A4 = −3.63208e−07, A6 = 1.08356e−07, A8 = 8.32948e−12,
A10 = 2.88447e−12
23rd surface k = −0.727, A4 = 1.04239e−04, A6 = 2.31580e−07, A8 = 2.45927e−09,
A10 = 1.86709e−11
24th surface k = 0.000, A4 = 1.54870e−06, A6 = −2.59516e−07
25th surface k = 0.000, A4 = 2.47610e−07, A6 = 2.85360e−09

Various data
Zoom ratio 10.349

| | Wide angle | Intermediate | Telephoto |
|---|---|---|---|
| Focal length | 14.211 | 46.104 | 147.070 |
| Fno. | 4.081 | 5.624 | 5.772 |
| Angle of field 2ω | 78.429 | 26.936 | 8.551 |
| Image height | 11.150 | 11.150 | 11.150 |
| Back focus | 15.985 | 37.319 | 49.183 |
| Lens total length | 100.367 | 128.827 | 159.640 |
| Object distance | ∞ | ∞ | ∞ |
| d6 | 0.600 | 21.169 | 43.856 |
| d12 | 3.191 | 3.172 | 6.006 |
| d15 | 12.275 | 6.800 | 1.147 |
| d21 | 4.954 | 2.132 | 1.479 |
| d27 | 12.602 | 33.936 | 45.800 |
| Radius of aperture stop | 3.997 | 5.281 | 6.323 |
| Entrance pupil position | 24.644 | 71.550 | 234.572 |
| Exit pupil position | −30.975 | −20.453 | −19.596 |
| Front side principal point position | 34.555 | 80.861 | 67.164 |
| Back side principal point position | −13.466 | −45.359 | −146.325 |

| Lens | Initial surface | Focal length |
|---|---|---|
| L1 | 1 | −125.520 |
| L2 | 3 | 93.670 |
| L3 | 5 | 97.246 |
| L4 | 7 | −15.925 |
| L5 | 9 | −28.731 |
| L6 | 11 | 18.405 |
| L7 | 13 | 56.370 |
| L8 | 14 | −16.979 |

Zoom lens group data

| Group | Initial surface | Focal length | group structure length | Front side principal point position | Back side principal point position |
|---|---|---|---|---|---|
| G1 | 1 | 79.453 | 14.439 | 2.940 | −6.375 |
| G2 | 7 | −34.648 | 11.164 | −6.009 | −18.301 |
| G3 | 13 | −23.626 | 1.611 | 0.052 | −0.917 |
| G4 | 16 | 29.951 | 7.201 | −0.647 | −4.912 |
| G5 | 22 | 50.395 | 22.753 | −9.026 | −21.961 |

Group magnification

| | Wide angle | Intermediate | Telephoto |
|---|---|---|---|
| G1 | 0.000 | 0.000 | 0.000 |
| G2 | −0.790 | −1.489 | −59.594 |
| G3 | 0.220 | 0.180 | 0.011 |
| G4 | −4.157 | 12.292 | 6.857 |
| G5 | 0.247 | −0.176 | −0.412 |

Example 7

Unit mm

Surface data

| Surface no. | r | d | nd | vd | effective radius |
|---|---|---|---|---|---|
| Object plane | ∞ | ∞ | | | |
| 1 | 73.5901 | 2.1000 | 1.80000 | 29.84 | 22.000 |
| 2 | 41.6355 | 0.3000 | | | 21.051 |
| 3 | 41.3881 | 6.2057 | 1.49700 | 81.54 | 21.077 |
| 4 | 356.5805 | 0.1500 | | | 20.925 |
| 5 | 49.2645 | 5.0812 | 1.61800 | 63.33 | 20.200 |
| 6 | 291.2036 | Variable | | | 19.871 |
| 7* | −649.7285 | 1.2000 | 1.80610 | 40.73 | 11.053 |
| 8* | 13.6906 | 5.4900 | | | 8.624 |
| 9 | −37.1757 | 0.9000 | 1.80610 | 40.92 | 7.931 |
| 10 | 51.1540 | 0.1500 | | | 7.664 |
| 11 | 24.9634 | 3.5401 | 1.80518 | 25.42 | 7.600 |
| 12 | −33.1285 | Variable | | | 7.378 |
| 13* | −17.6831 | 1.5574 | 1.68893 | 31.07 | 6.118 |
| 14 | −10.5246 | 0.8337 | 1.72916 | 54.68 | 6.037 |
| 15 | −1295.2616 | Variable | | | 6.199 |
| 16(stop) | ∞ | 6.5483 | | | (Variable) |
| 17* | 24.4495 | 2.4628 | 1.58913 | 61.25 | 7.029 |
| 18* | −373.9580 | 0.1500 | | | 7.300 |
| 19 | 29.8785 | 3.5160 | 1.61800 | 63.33 | 7.401 |
| 20 | −23.5453 | 0.9000 | 1.90366 | 31.32 | 7.389 |
| 21 | 451.3541 | Variable | | | 7.479 |
| 22* | 23.9802 | 9.2575 | 1.49700 | 81.61 | 7.756 |
| 23* | −26.5373 | 5.3800 | | | 7.100 |
| 24 | −34.6912 | 4.3773 | 1.53172 | 48.84 | 6.885 |
| 25 | −15.5255 | 1.2000 | 1.88300 | 40.76 | 7.033 |
| 26 | −355.9891 | 2.3980 | 1.69895 | 30.13 | 7.391 |
| 27 | −75.7553 | Variable | | | 7.682 |
| 28 | ∞ | 4.0000 | 1.51633 | 64.14 | 12.000 |
| 29 | ∞ | 0.7450 | | | 12.000 |
| Image plane (Light receiving surface) | ∞ | | | | |

Aspherical surface data

7th surface k = 2961.503, A4 = 1.91792e−05, A6 = −1.74334e−07, A8 = 6.55379e−10

8th surface k = −0.649, A4 = 4.22418e−05, A6 = 2.38759e−08, A8 = −9.65725e−10

13th surface k = 0.000, A4 = 3.86819e−06

17th surface k = −1.970, A4 = 2.34813e−06, A6 = −4.57924e−07, A8 = 7.39018e−09, A10 = −1.98059e−10

18th surface k = 18.912, A4 = −3.68821e−08, A6 = −4.27789e−07, A8 = 6.55770e−09, A10 = −1.88865e−10

22nd surface k = 1.969, A4 = 8.24441e−06, A6 = 3.19108e−07, A8 = 7.28388e−10, A10 = −1.45104e−12

23rd surface k = −0.590, A4 = 9.73179e−05, A6 = 5.50685e−07, A8 = 1.25607e−09, A10 = 5.00731e−11

Various data
Zoom ratio 10.380

| | Wide angle | Intermediate | Telephoto |
|---|---|---|---|
| Focal length | 14.147 | 46.304 | 146.840 |
| Fno. | 4.081 | 5.624 | 5.772 |
| Angle of field 2ω | 81.434 | 26.914 | 8.555 |
| Image height | 11.150 | 11.150 | 11.150 |
| Back focus | 16.104 | 37.880 | 49.116 |
| Lens total length | 100.363 | 128.830 | 159.641 |
| Object distance | ∞ | ∞ | ∞ |
| d6 | 0.600 | 20.940 | 43.909 |
| d12 | 3.043 | 2.838 | 6.014 |
| d15 | 12.008 | 6.952 | 1.158 |
| d21 | 4.910 | 2.170 | 1.495 |
| d27 | 12.721 | 34.497 | 45.733 |
| Radius of aperture stop | 4.003 | 5.444 | 6.419 |
| Entrance pupil position | 24.114 | 69.616 | 233.827 |
| Exit pupil position | −30.027 | −19.525 | −18.853 |
| Front side principal point position | 33.922 | 78.570 | 63.431 |
| Back side principal point position | −13.402 | −45.559 | −146.095 |

| Lens | Initial surface | Focal length |
|---|---|---|
| L1 | 1 | −123.462 |
| L2 | 3 | 93.599 |
| L3 | 5 | 95.185 |
| L4 | 7 | −16.620 |
| L5 | 9 | −26.587 |
| L6 | 11 | 18.175 |
| L7 | 13 | 34.661 |
| L8 | 14 | −14.556 |

Zoom lens group data

| Group | Initial surface | Focal length | group structure length | Front side principal point position | Back side principal point position |
|---|---|---|---|---|---|
| G1 | 1 | 78.905 | 13.837 | 3.275 | −5.704 |
| G2 | 7 | −34.681 | 11.280 | −5.821 | −18.075 |
| G3 | 13 | −23.627 | 2.391 | 0.065 | −1.338 |
| G4 | 16 | 30.011 | 7.029 | −0.508 | −4.696 |
| G5 | 22 | 53.167 | 22.613 | −10.918 | −22.944 |

Group magnification

| | Wide angle | Intermediate | Telephoto |
|---|---|---|---|
| G1 | 0.000 | 0.000 | 0.000 |
| G2 | −0.793 | −1.482 | −80.411 |
| G3 | 0.221 | 0.181 | 0.008 |
| G4 | −3.856 | 15.209 | 7.915 |
| G5 | 0.266 | −0.144 | −0.355 |

Example 8

Unit mm

Surface data

| Surface no. | r | d | nd | vd | effective radius |
|---|---|---|---|---|---|
| Object plane | ∞ | ∞ | | | |
| 1 | 72.4565 | 2.1000 | 1.80000 | 29.84 | 22.000 |
| 2 | 41.1185 | 0.3000 | | | 21.034 |

-continued

Unit mm

| | | | | | |
|---|---|---|---|---|---|
| 3 | 40.9224 | 6.1848 | 1.49700 | 81.54 | 21.061 |
| 4 | 320.4688 | 0.1500 | | | 20.911 |
| 5 | 48.8237 | 4.9113 | 1.61800 | 63.33 | 20.200 |
| 6 | 291.7290 | Variable | | | 19.919 |
| 7* | −646.5767 | 1.2000 | 1.80610 | 40.73 | 11.065 |
| 8* | 13.6760 | 5.4900 | | | 8.609 |
| 9 | −36.7175 | 0.9000 | 1.80610 | 40.92 | 7.936 |
| 10 | 52.4486 | 0.1500 | | | 7.670 |
| 11 | 24.2470 | 3.5558 | 1.80518 | 25.42 | 7.600 |
| 12 | −34.2058 | Variable | | | 7.368 |
| 13* | −17.7415 | 1.5854 | 1.68893 | 31.07 | 6.129 |
| 14* | −10.2856 | 0.8532 | 1.72916 | 54.68 | 6.048 |
| 15 | −1373.0337 | Variable | | | 6.187 |
| 16(stop) | ∞ | 6.7347 | | | (Variable) |
| 17* | 24.6873 | 2.4399 | 1.58913 | 61.25 | 7.014 |
| 18* | −368.8963 | 0.1500 | | | 7.300 |
| 19 | 30.2530 | 3.1460 | 1.61800 | 63.33 | 7.355 |
| 20 | −23.0699 | 0.9000 | 1.90366 | 31.32 | 7.351 |
| 21 | 438.5839 | Variable | | | 7.452 |
| 22* | 23.4072 | 9.1342 | 1.49700 | 81.61 | 7.767 |
| 23* | −25.6241 | 5.3800 | | | 7.100 |
| 24 | −34.6912 | 4.2304 | 1.53172 | 48.84 | 6.845 |
| 25 | −15.1642 | 1.2000 | 1.88300 | 40.76 | 6.969 |
| 26 | −386.4639 | 3.1186 | 1.69895 | 30.13 | 7.323 |
| 27 | −78.0172 | Variable | | | 7.708 |
| 28 | ∞ | 4.0000 | 1.51633 | 64.14 | 12.000 |
| 29 | ∞ | 0.7450 | | | 12.000 |
| Image plane (Light receiving surface) | ∞ | | | | |

Aspherical surface data

7th surface k = 2957.111, A4 = 2.74897e−05, A6 = −2.31031e−07,
A8 = 7.95684e−10

8th surface k = −0.644, A4 = 5.22147e−05, A6 = 5.10310e−08,
A8 = −1.57179e−09

13th surface k = 0.000, A4 = 4.88971e−06, A6 = −1.14353e−07

14th surface k = 0.000, A4 = −5.60472e−05, A6 = 2.18529e−06

17th surface k = −1.257, A4 = 4.80756e−06, A6 = −2.60055e−07,
A8 = 3.00456e−09, A10 = −1.02819e−10

18th surface k = −2195.350, A4 = 5.38982e−06, A6 = −2.15912e−07,
A8 = 3.28750e−09, A10 = −1.09911e−10

22nd surface k = 1.755, A4 = 1.54149e−05, A6 = 3.03258e−07,
A8 = 1.72256e−09, A10 = −2.02999e−12

23rd surface k = −0.358, A4 = 1.01498e−04, A6 = 6.06222e−07,
A8 = −2.38187e−11, A10 = 7.96386e−11

Various data
Zoom ratio 10.327

| | Wide angle | Intermediate | Telephoto |
|---|---|---|---|
| Focal length | 14.188 | 46.281 | 146.527 |
| Fno. | 4.081 | 5.624 | 5.772 |
| Angle of field 2ω | 81.235 | 26.955 | 8.580 |
| Image height | 11.150 | 11.150 | 11.150 |
| Back focus | 16.200 | 37.749 | 48.866 |
| Lens total length | 100.363 | 128.830 | 159.642 |
| Object distance | ∞ | ∞ | ∞ |
| d6 | 0.600 | 21.034 | 43.881 |
| d12 | 3.029 | 2.912 | 6.323 |
| d15 | 11.864 | 7.062 | 1.172 |
| d21 | 4.855 | 2.146 | 1.521 |
| d27 | 12.817 | 34.366 | 45.483 |
| Radius of aperture stop | 3.993 | 5.451 | 6.406 |
| Entrance pupil position | 23.952 | 69.904 | 235.025 |
| Exit pupil position | −30.504 | −19.579 | −18.998 |
| Front side principal point position | 33.830 | 78.822 | 65.183 |
| Back side principal point position | −13.443 | −45.536 | −145.782 |

| Lens | Initial surface | Focal length |
|---|---|---|
| L1 | 1 | −122.486 |
| L2 | 3 | 93.704 |
| L3 | 5 | 94.155 |
| L4 | 7 | −16.601 |
| L5 | 9 | −26.673 |
| L6 | 11 | 18.114 |
| L7 | 13 | 32.690 |
| L8 | 14 | −14.216 |

Zoom lens group data

| Group | Initial surface | Focal length | group structure length | Front side principal point position | Back side principal point position |
|---|---|---|---|---|---|
| G1 | 1 | 78.764 | 13.646 | 3.254 | −5.609 |
| G2 | 7 | −34.960 | 11.296 | −5.888 | −18.162 |
| G3 | 13 | −23.628 | 2.439 | 0.069 | −1.361 |
| G4 | 16 | 30.824 | 6.636 | −0.477 | −4.443 |
| G5 | 22 | 51.243 | 23.063 | −10.553 | −22.935 |

Group magnification

| | Wide angle | Intermediate | Telephoto |
|---|---|---|---|
| G1 | 0.000 | 0.000 | 0.000 |
| G2 | −0.804 | −1.517 | −173.625 |
| G3 | 0.219 | 0.178 | 0.004 |
| G4 | −4.332 | 11.814 | 6.955 |
| G5 | 0.236 | −0.184 | −0.401 |

Example 9

Unit mm

Surface data

| Surface no. | r | d | nd | vd | effective radius |
|---|---|---|---|---|---|
| Object plane | ∞ | ∞ | | | |
| 1 | 73.9302 | 2.1000 | 1.80000 | 29.84 | 22.000 |
| 2 | 40.9035 | 0.3000 | | | 21.062 |
| 3 | 40.4114 | 7.1510 | 1.49700 | 81.54 | 21.103 |
| 4 | 495.9819 | 0.1500 | | | 20.884 |
| 5 | 50.1867 | 4.8618 | 1.61800 | 63.33 | 20.200 |
| 6 | 262.5220 | Variable | | | 19.884 |
| 7* | −698.1634 | 1.2000 | 1.80610 | 40.73 | 11.001 |
| 8* | 12.2640 | 5.4900 | | | 8.411 |
| 9 | −45.3052 | 0.9000 | 1.80610 | 40.92 | 7.894 |
| 10 | 62.3258 | 0.1500 | | | 7.683 |
| 11 | 22.5487 | 3.8729 | 1.80518 | 25.42 | 7.600 |
| 12 | −32.3052 | Variable | | | 7.328 |
| 13* | −16.5286 | 0.5943 | 1.63387 | 23.38 | 6.024 |
| 14 | −13.3269 | 0.5808 | 1.69680 | 55.53 | 5.983 |
| 15 | −932.4168 | Variable | | | 6.179 |
| 16(stop) | ∞ | 8.5943 | | | (Variable) |
| 17* | 24.9410 | 2.4958 | 1.58913 | 61.25 | 6.867 |

-continued

Unit mm

| | | | | | |
|---|---|---|---|---|---|
| 18* | −365.2368 | 0.1500 | | | 7.300 |
| 19 | 30.9852 | 3.4724 | 1.61800 | 63.33 | 7.291 |
| 20 | −21.9888 | 0.9000 | 1.90366 | 31.32 | 7.267 |
| 21 | 433.4589 | 2.5363 | | | 7.349 |
| 22* | 24.3808 | 8.3921 | 1.49700 | 81.61 | 7.679 |
| 23* | −25.6069 | 5.3800 | | | 7.100 |
| 24 | −31.6370 | 3.9973 | 1.53172 | 48.84 | 6.798 |
| 25 | −14.8445 | 1.2000 | 1.88300 | 40.76 | 6.918 |
| 26 | −130.7616 | 2.8597 | 1.69895 | 30.13 | 7.264 |
| 27 | −72.2106 | Variable | | | 7.624 |
| 28 | ∞ | 4.0000 | 1.51633 | 64.14 | 12.000 |
| 29 | ∞ | 0.7450 | | | 12.000 |
| Image plane (Light receiving surface) | ∞ | | | | |

Aspherical surface data

7th surface k = 3425.930, A4 = 2.18362e−05, A6 = −9.80298e−08,
A8 = 3.60665e−10

8th surface k = −0.517, A4 = 3.70362e−05, A6 = 1.83910e−07,
A8 = 7.64526e−10

13th surface k = 0.000, A4 = 5.65472e−07

17th surface k = −7.988, A4 = 7.93184e−07, A6 = −1.85356e−06,
A8 = 5.92816e−09, A10 = −4.61679e−11

18th surface k = 1411.903, A4 = −7.04577e−05, A6 = −2.03179e−06,
A8 = 2.08230e−08, A10 = −1.45959e−10

22nd surface k = 0.124, A4 = −1.31349e−05, A6 = −2.77725e−07,
A8 = 2.08564e−08, A10 = −8.59325e−11

23rd surface k = −0.769, A4 = 7.81838e−05, A6 = 3.16953e−07,
A8 = 2.67421e−09, A10 = 1.20019e−10

Various data
Zoom ratio 10.154

| | Wide angle | Intermediate | Telephoto |
|---|---|---|---|
| Focal length | 14.492 | 46.229 | 147.155 |
| Fno. | 4.081 | 5.624 | 5.772 |
| Angle of field 2ω | 77.092 | 26.790 | 8.542 |
| Image height | 11.150 | 11.150 | 11.150 |
| Back focus | 17.280 | 36.215 | 48.364 |
| Lens total length | 100.361 | 128.822 | 159.639 |
| Object distance | ∞ | ∞ | ∞ |
| d6 | 0.600 | 22.224 | 44.058 |
| d12 | 3.037 | 2.538 | 6.540 |
| d15 | 12.115 | 7.852 | 1.143 |
| d27 | 13.897 | 32.832 | 44.981 |
| Radius of aperture stop | 3.891 | 5.238 | 6.371 |
| Entrance pupil position | 24.422 | 73.406 | 226.649 |
| Exit pupil position | −30.643 | −19.911 | −19.495 |
| Front side principal point position | 34.532 | 81.558 | 54.695 |
| Back side principal point position | −13.747 | −45.484 | −146.410 |

| Lens | Initial surface | Focal length |
|---|---|---|
| L1 | 1 | −117.781 |
| L2 | 3 | 88.065 |
| L3 | 5 | 99.532 |
| L4 | 7 | −14.940 |
| L5 | 9 | −32.424 |
| L6 | 11 | 17.029 |
| L7 | 13 | 101.246 |
| L8 | 14 | −19.408 |

Zoom lens group data

| Group | Initial surface | Focal length | group structure length | Front side principal point position | Back side principal point position |
|---|---|---|---|---|---|
| G1 | 1 | 80.039 | 14.563 | 3.715 | −5.778 |
| G2 | 7 | −50.707 | 11.613 | −12.142 | −28.176 |
| G3 | 13 | −23.602 | 1.175 | 0.028 | −0.678 |
| G4 | 16 | 19.432 | 31.384 | −1.974 | −20.602 |

Group magnification

| | Wide angle | Intermediate | Telephoto |
|---|---|---|---|
| G1 | 0.000 | 0.000 | 0.000 |
| G2 | −1.445 | −3.764 | 6.064 |
| G3 | 0.132 | 0.080 | −0.119 |
| G4 | −0.949 | −1.924 | −2.549 |

Example 10

Unit mm

Surface data

| Surface no. | r | d | nd | vd | effective radius |
|---|---|---|---|---|---|
| Object plane | ∞ | ∞ | | | |
| 1 | 74.1392 | 2.1000 | 1.80000 | 29.84 | 22.000 |
| 2 | 41.6572 | 0.3000 | | | 21.088 |
| 3 | 41.5173 | 6.9930 | 1.49700 | 81.54 | 21.120 |
| 4 | 365.8490 | 0.1500 | | | 20.880 |
| 5 | 47.8538 | 5.2111 | 1.61800 | 63.33 | 20.200 |
| 6 | 257.2915 | Variable | | | 19.847 |
| 7* | −697.3993 | 1.2000 | 1.80610 | 40.73 | 11.076 |
| 8* | 13.4466 | 5.4900 | | | 8.597 |
| 9 | −38.1980 | 0.9000 | 1.80610 | 40.92 | 7.947 |
| 10 | 52.2749 | 0.1500 | | | 7.676 |
| 11 | 23.9867 | 3.5113 | 1.80518 | 25.42 | 7.600 |
| 12 | −35.4412 | Variable | | | 7.364 |
| 13* | −16.9814 | 0.8750 | 1.63387 | 23.38 | 6.111 |
| 14 | −11.7380 | 0.6282 | 1.69680 | 55.53 | 6.073 |
| 15 | −1530.6501 | Variable | | | 6.020 |
| 16 (stop) | ∞ | 5.8379 | | | (Variable) |
| 17* | 23.6463 | 2.5536 | 1.58913 | 61.25 | 6.821 |
| 18* | −338.1657 | 0.1500 | | | 7.300 |
| 19 | 29.7937 | 3.9559 | 1.61800 | 63.33 | 7.251 |
| 20 | −22.2012 | 0.9000 | 1.90366 | 31.32 | 7.226 |
| 22* | 23.7925 | 9.3091 | 1.49700 | 81.61 | 7.578 |
| 23* | −25.9316 | Variable | | | 7.100 |
| 24 | −36.0761 | 3.5595 | 1.53172 | 48.84 | 6.922 |
| 25 | −15.6757 | 1.2000 | 1.88300 | 40.76 | 7.039 |
| 26 | −167.5830 | 2.6847 | 1.69895 | 30.13 | 7.386 |
| 27 | −76.0919 | Variable | | | 7.723 |
| 28 | ∞ | 4.0000 | 1.51633 | 64.14 | 12.000 |

-continued

Unit mm

| | | | |
|---|---|---|---|
| 29 | ∞ | 0.7450 | 12.000 |
| Image plane (Light receiving surface) | ∞ | | |

Aspherical surface data

7th surface k = 3450.136, A4 = 3.71156e−05, A6 = −2.55911e−07, A8 = 8.00286e−10

8th surface k = −0.560, A4 = 5.29422e−05, A6 = 8.60412e−08, A8 = −1.90633e−09

13th surface k = 0.000, A4 = 1.38659e−06

17th surface k = −3.856, A4 = 1.15243e−06, A6 = −9.76216e−07, A8 = 1.25498e−08, A10 = −3.81068e−10

18th surface k = 23.671, A4 = −2.49829e−05, A6 = −8.89116e−07, A8 = 8.68373e−09, A10 = −3.13067e−10

22nd surface k = 2.157, A4 = −4.70467e−06, A6 = 2.48265e−07, A8 = 3.84260e−10, A10 = −6.63639e−13

23rd surface k = −0.768, A4 = 9.55429e−05, A6 = 5.31512e−07, A8 = 5.35369e−10, A10 = 4.15475e−11

Various data
Zoom ratio 10.356

| | Wide angle | Intermediate | Telephoto |
|---|---|---|---|
| Focal length | 14.174 | 46.072 | 146.788 |
| Fno. | 4.081 | 5.624 | 5.772 |
| Angle of field 2ω | 78.222 | 26.937 | 8.570 |
| Image height | 11.150 | 11.150 | 11.150 |
| Back focus | 16.243 | 37.386 | 49.713 |
| Lens total length | 100.368 | 128.830 | 159.643 |
| Object distance | ∞ | ∞ | ∞ |
| d6 | 0.600 | 21.018 | 43.803 |
| d12 | 3.105 | 3.349 | 5.992 |
| d15 | 12.502 | 6.720 | 1.160 |
| d21 | 5.007 | 2.222 | 1.476 |
| d23 | 5.252 | 5.406 | 4.878 |
| d27 | 12.860 | 34.003 | 46.330 |
| Radius of aperture stop | 4.007 | 5.263 | 6.234 |
| Entrance pupil position | 24.856 | 71.193 | 234.841 |
| Exit pupil position | −30.315 | −20.194 | −19.200 |
| Front side principal point position | 34.714 | 80.401 | 68.963 |
| Back side principal point position | −13.429 | −45.327 | 146.043 |

| Lens | Initial surface | Focal length |
|---|---|---|
| L1 | 1 | −122.368 |
| L2 | 3 | 93.559 |
| L3 | 5 | 94.230 |
| L4 | 7 | −16.353 |
| L5 | 9 | −27.259 |
| L6 | 11 | 18.247 |
| L7 | 13 | 56.326 |
| L8 | 14 | −16.979 |

-continued

Unit mm

Zoom lens group data

| Group | Initial surface | Focal length | group structure length | Front side principal point position | Back side principal point position |
|---|---|---|---|---|---|
| G1 | 1 | 78.784 | 14.754 | 3.630 | −5.964 |
| G2 | 7 | −34.285 | 11.251 | −5.722 | −17.882 |
| G3 | 13 | −23.627 | 1.503 | 0.058 | −0.847 |
| G4 | 16 | 29.582 | 7.559 | −0.693 | −5.157 |
| G5 | 22 | 26.620 | 9.309 | 3.173 | −3.458 |
| G6 | 24 | −37.739 | 7.444 | 0.229 | −4.396 |

Group magnification

| | Wide angle | Intermediate | Telephoto |
|---|---|---|---|
| G1 | 0.000 | 0.000 | 0.000 |
| G2 | −0.785 | −1.475 | −75.655 |
| G3 | 0.223 | 0.182 | 0.009 |
| G4 | −4.071 | 11.953 | 7.304 |
| G5 | 0.163 | −0.086 | −0.157 |
| G6 | 1.547 | 2.107 | 2.434 |

Next, parameter and values of conditional expressions in each embodiments described above are described.

| Conditional expression | Example 1 | Example 2 | Example 3 | Example 4 |
|---|---|---|---|---|
| (1) $SF_{3p} = (r1_{3p} + r2_{3p})/(r1_{3p} - r2_{3p})$ | 5.355 | 5.508 | 5.386 | 5.647 |
| (2) $SF_{3n} = (r1_{3n} + r2_{3n})/(r1_{3n} - r2_{3n})$ | −1.016 | −1.050 | −1.024 | −1.023 |
| (3) ASP31/ER | 0.00090 | 0.00079 | 0.00136 | 0.00114 |
| (4) $P_{er}/P_0$ | — | — | — | — |
| (5) $|f3|/ft$ | 0.161 | 0.160 | 0.161 | 0.161 |
| (6) $SF_{4p} = (r1_{4p} + r2_{4p})/(r1_{4p} - r2_{4p})$ | −0.863 | −0.726 | −0.873 | −0.872 |

| Conditional expression | Example 5 | Example 6 | Example 7 |
|---|---|---|---|
| (1) $SF3p = (r1_{3p} + r2_{3p})/(r1_{3p} - r2_{3p})$ | 5.613 | 5.505 | 3.940 |
| (2) $SF_{3n} = (r1_{3n} + r2_{3n})/(r1_{3n} - r2_{3n})$ | 5.613 | −1.023 | −1.016 |
| (3) ASP31/ER | 0.00110 | 0.00103 | 0.00084 |
| (4) $P_{er}/P_0$ | — | — | — |
| (5) $|f3|/ft$ | 0.161 | 0.161 | 0.161 |
| (6) $SF_{4p} = (r1_{4p} + r2_{4p})/(r1_{4p} - r2_{4p})$ | −0.873 | −0.880 | −0.877 |

| Conditional expression | Example 8 | Example 9 | Example 10 |
|---|---|---|---|
| (1) $SF_{3p} = (r1_{3p} + r2_{3p})/(r1_{3p} - r2_{3p})$ | 3.759 | 9.325 | 5.477 |
| (2) $SF_{3n} = (r1_{3n} + r2_{3n})/(r1_{3n} - r2_{3n})$ | −1.015 | −1.029 | −1.015 |
| (3) ASP31/ER | 0.00016 | 0.00012 | 0.00032 |
| (4) $P_{er}/P_0$ | 0.950 | — | — |
| (5) $|f3|/ft$ | 0.161 | 0.160 | 0.161 |
| (6) $SF_{4p} = (r1_{4p} + r2_{4p})/(r1_{4p} - r2_{4p})$ | −0.875 | −0.872 | −0.869 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 21:
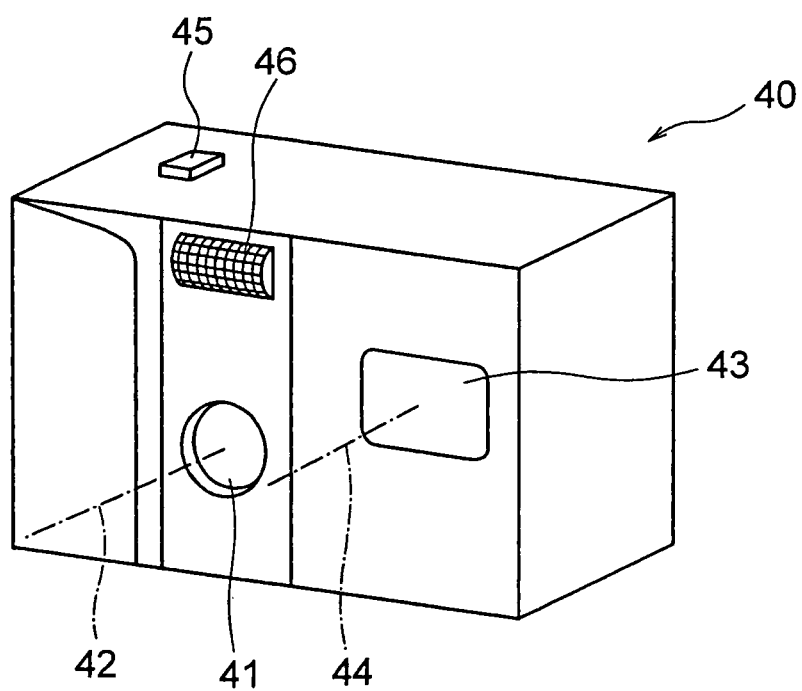
FIG. 21 is a front perspective view showing an appearance of a digital camera 40 in which, an image forming optical system according to the present invention is incorporated.
Figure 22:
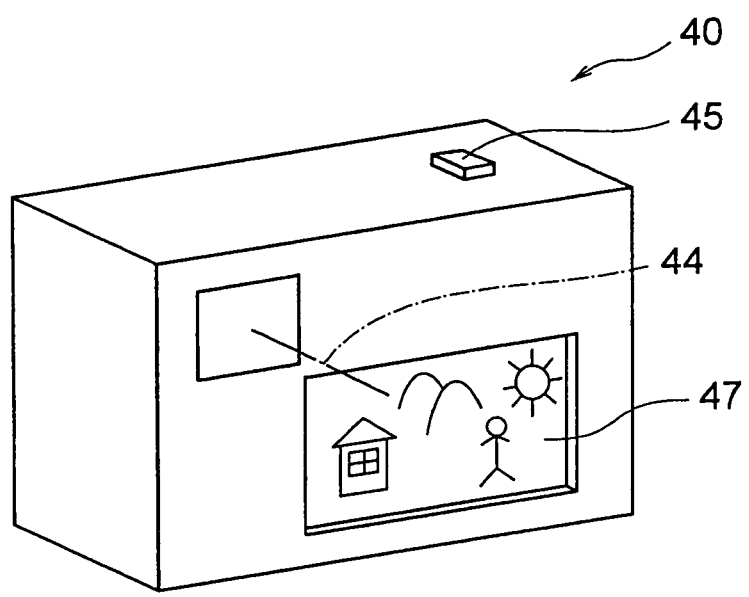
FIG. 22 is a rear perspective view of the digital camera 40.
Figure 23:
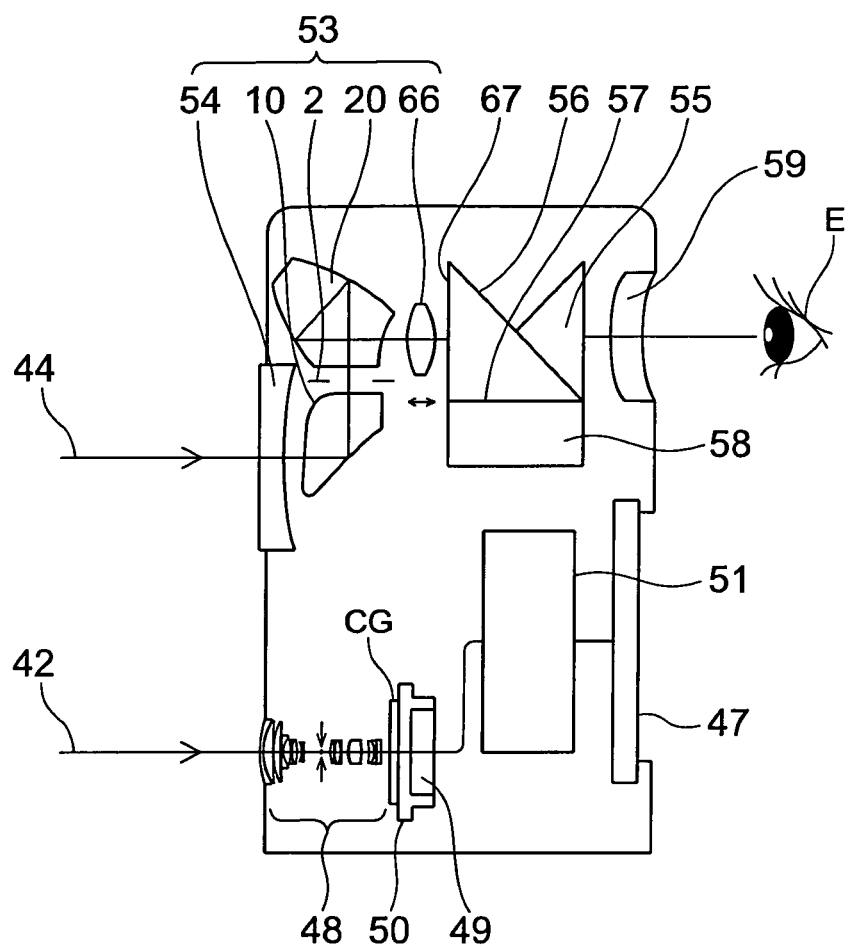
FIG. 23 is a cross-sectional view showing an optical arrangement of the digital camera 40.

In FIG. 21 to FIG. 23 show conceptual diagrams of structures in which the image forming optical system according to the present invention is incorporated in a photographic optical system 41 of a digital camera. FIG. 21 is a frontward perspective view showing an appearance of a digital camera 40, FIG. 22 is a rearward perspective view of the same, and FIG. 23 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Incidentally, the present invention could be applied to a bending type digital camera having a bending optical system, in addition to the above-mentioned collapsible type digital camera.

Figure 24:
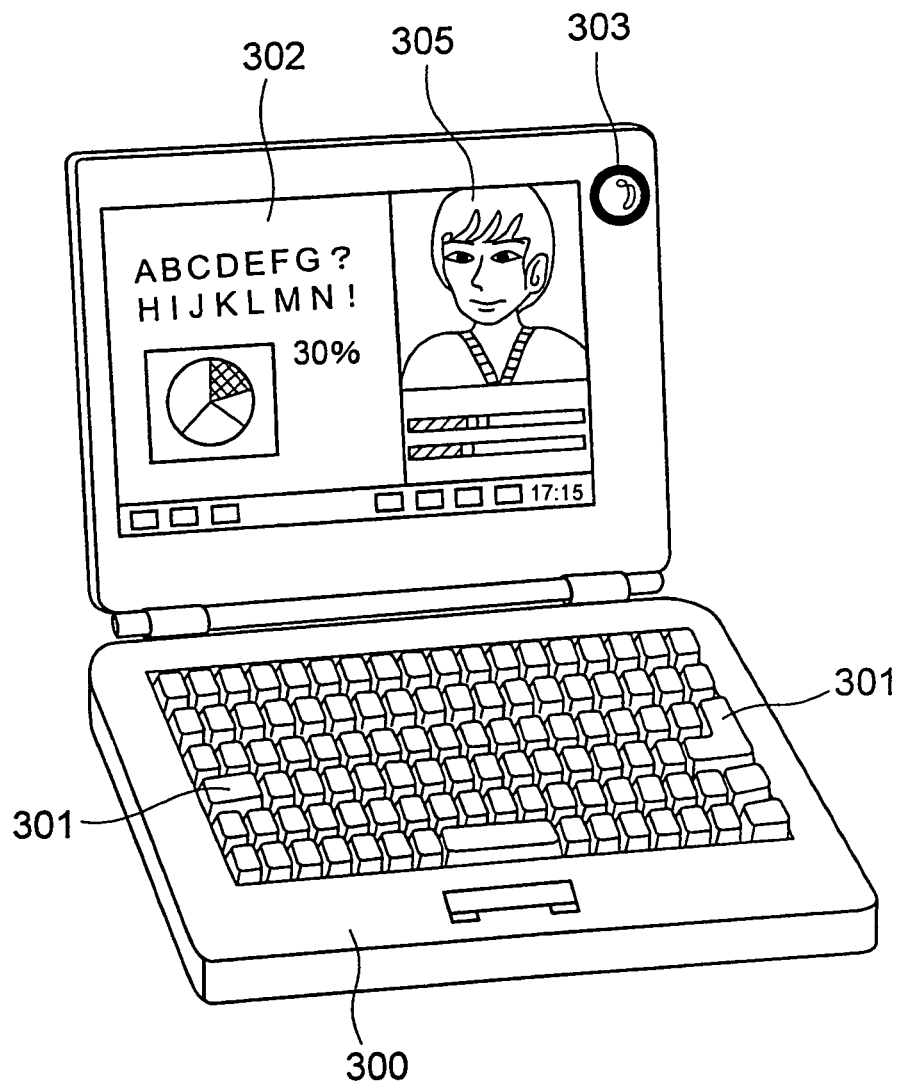
FIG. 24 is a front perspective view of a state in which, a cover of a personal computer 300 which is an example of an information processing apparatus in which, the image forming optical system of the present invention is built-in as an objective optical system, is opened.
Figure 25:
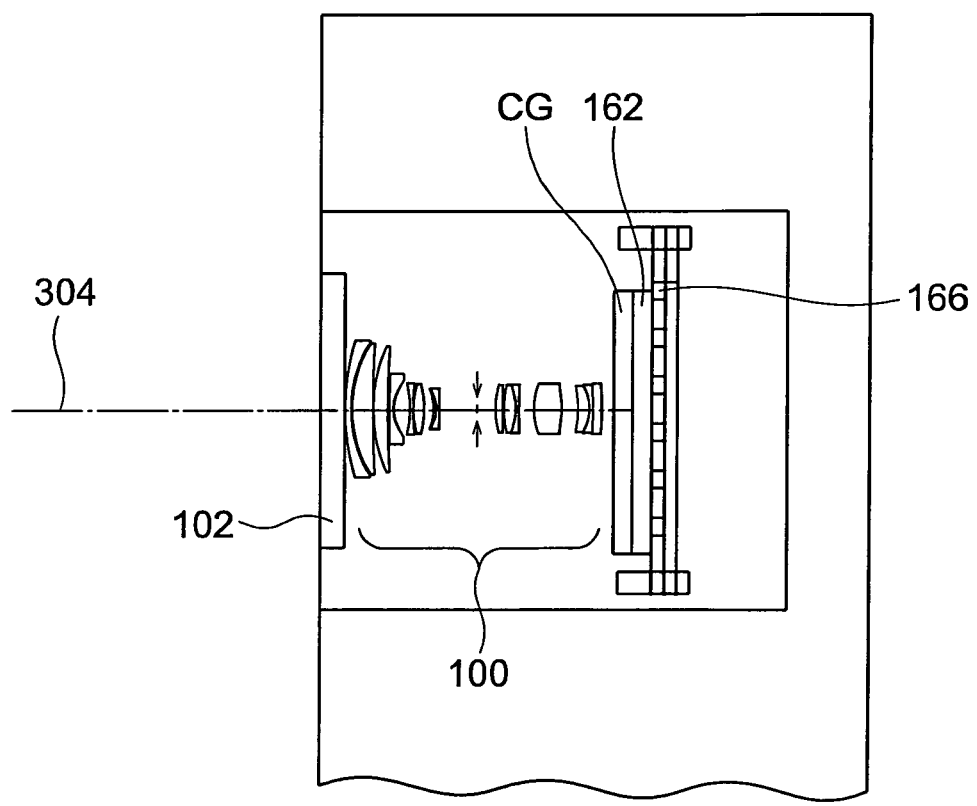
FIG. 25 is a cross-sectional view of a photographic optical system 303 of the personal computer 300.
Figure 26:
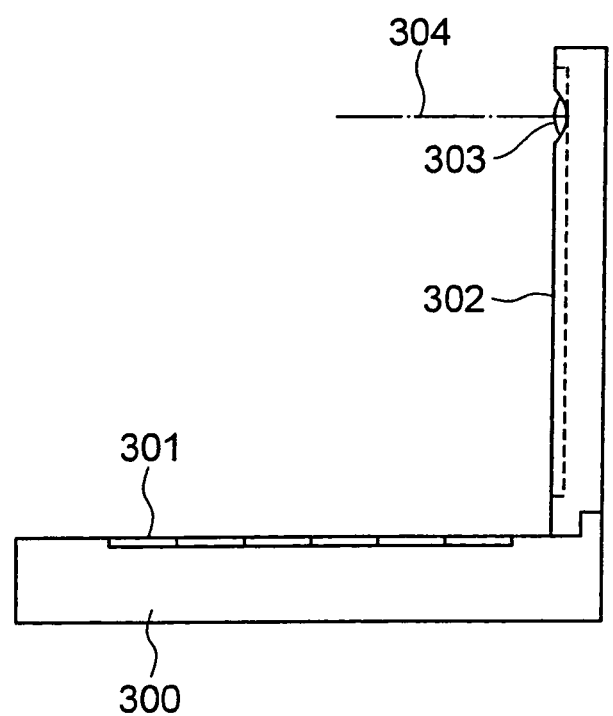
FIG. 26 is a side view of the personal computer 300.

Next, a personal computer which is an example of an information processing apparatus with a built-in image forming system as an objective optical system is shown in FIG. 24 to FIG. 26. FIG. 24 is a frontward perspective view of a personal computer 300 with its cover opened, FIG. 25 is a cross-sectional view of a photographic optical system 303 of the personal computer 300, and FIG. 26 is a side view of FIG. 24. As it is shown in FIG. 24 to FIG. 26, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 40, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Next, a telephone which is an example of an information processing apparatus in which the image forming optical system of the present invention is built-in as a photographic optical system, particularly a portable telephone which is easy to carry is shown in FIG. 27A, FIG. 27B, and FIG. 27C. FIG. 27A is a front view of a portable telephone 400, FIG. 27B is a side view of the portable telephone 400, and FIG. 27C is a cross-sectional view of a photographic optical system 405. As shown in FIG. 27A to FIG. 27C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 whichreceives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

The image forming optical system and the electronic image pickup apparatus in which the image forming optical system is used, according to the present invention, having a comparatively shorter overall length of the optical system shows an effect that it is possible to realize a high zooming with a zoom factor of about 10 times while correcting various aberrations favorably.

What is claimed is:

1. An image forming optical system comprising in order from an object side:
   a first lens group having a positive refractive power;
   a second lens group having a negative refractive power;
   a third lens group having a negative refractive power; and
   a subsequent lens group having a positive refractive power as a whole, wherein
   the third lens group comprises only a cemented lens having a negative refractive power, which comprises a positive lens and a negative lens in order from the object side, and
   the positive lens in the cemented lens of the third lens group is a meniscus lens having a convex surface directed toward an image side.

2. The image forming optical system according to claim 1, wherein a shaping factor $SF_{3p}$ of the positive lens in the cemented lens of the third lens group satisfies conditional expression (1)

$$2 \leq SF_{3p} \leq 12 \tag{1}$$

where, $$SF_{3p} = (r1_{3p} + r2_{3p})/(r1_{3p} - r2_{3p}),$$

where, $r1_{3p}$ denotes a radius of curvature of a surface on the object side of the positive lens in the cemented lens of the third lens group, and $r2_{3p}$ denotes a radius of curvature of a surface on an image side of the positive lens in the cemented lens of the third lens group.

3. The image forming optical system according to claim 1, wherein all surfaces of the cemented lens in the third lens group are convex toward an image side.

4. The image forming optical system according to claim 1, wherein a refractive index of the positive lens in the cemented lens of the third lens group is lower than a refractive index of the negative lens in the cemented lens of the third lens group.

5. The image forming optical system according to claim 1, wherein focusing to an object at a close distance is carried out by moving the third lens group along an optical axis.

6. An electronic image pickup apparatus comprising:
   an image forming optical system according to claim 1.

7. An image forming optical system comprising in order from an object side;
   a first lens group having a positive refractive power;
   a second lens group having a negative refractive power;
   a third lens group having a negative refractive power; and
   a subsequent lens group having a positive refractive power as a whole,
   wherein the third lens group comprises only a cemented lens having a negative refractive power, which comprises a positive lens and a negative lens in order from the object side, and
   the negative lens in the cemented lens of the third lens group is a meniscus lens having a convex surface directed toward an image side.

8. The image forming optical system according to claim 7, wherein a shaping factor $SF_{3n}$ of the negative lens in the cemented lens of the third lens group satisfies conditional expression (2)

$$-5 \leq SF_{3n} < -1 \tag{2}$$

where, $$SF_{3n} = (r1_{3n} + r2_{3n})/(r1_{3n} - r2_{3n}),$$

where, $r1_{3n}$ denotes a radius of curvature of a surface on the object side of the negative lens in the cemented lens of the third lens group, and $r2_{3n}$ denotes a radius of curvature of a surface on an image side of the negative lens in the cemented lens of the third lens group.

9. The image forming optical system according to claim 7, wherein a refractive index of the positive lens in the cemented lens of the third lens group is lower than a refractive index of the negative lens in the cemented lens of the third lens group.

10. The image forming optical system according to claim 7, wherein focusing to an object at a close distance is carried out by moving the third lens group along an optical axis.

11. An electronic image pickup apparatus comprising:
    an image forming optical system according to claim 7.

12. The image forming optical system according to claim 7, wherein all surfaces of the cemented lens in the third lens group are convex toward an image side.

13. An image forming optical system comprising in order from an object side;
    a first lens group having a positive refractive power;
    a second lens group having a negative refractive power;
    a third lens group having a negative refractive power; and
    a subsequent lens group having a positive refractive power as a whole,
    wherein the third lens group comprises only a cemented lens having a negative refractive power, which comprises a positive lens and a negative lens in order from the object side, and
    a surface nearest to the object side of the cemented lens in the third lens group is an aspheric surface.

14. The image forming optical system according to claim 13, wherein the surface nearest to the object side of the cemented lens satisfies conditional expression (3)

$$0.0001 < ASP31/ER < 0.003 \tag{3}$$

where,

ASP31 denotes an aspheric-surface amount in an effective diameter of the aspheric surface, and ER denotes the effective radius of the aspheric surface.

15. An image forming optical system comprising in order from an object side;
    a first lens group having a positive refractive power;
    a second lens group having a negative refractive power;
    a third lens group having a negative refractive power; and
    a subsequent lens group having a positive refractive power as a whole, wherein the third lens group comprises only a cemented lens having a negative refractive power, which comprises a positive lens and a negative lens in order from the object side, and the cemented surface of the cemented lens of the third lens group is an aspheric surface.

16. The image forming optical system according to claim 15, wherein the cemented surface of the cemented lens satisfies conditional expression (4)

$$0.9 < P_{er}/P_0 < 0.99 \qquad (4)$$

where, $P_{er}$ denotes a local refractive power in an effective diameter of the aspheric surface, and $P_0$ denotes a refractive power on an optical axis of the aspheric surface.

17. An image forming optical system comprising in order from an object side;

a first lens group having a positive refractive power;
a second lens group having a negative refractive power;
a third lens group having a negative refractive power; and
a subsequent lens group having a positive refractive power as a whole, wherein the third lens group comprises only a cemented lens having a negative refractive power, which comprises a positive lens and a negative lens in order from the object side, and and the image forming optical system satisfies the following conditional expression (5)

$$0.05 \leq |f3|/ft \leq 0.25 \qquad (5)$$

where, f3 denotes a focal length of the third lens group, and
ft denotes a focal length of the overall image forming optical system at a telephoto end.

* * * * *